United States Patent [19]

Coleman et al.

[11] 4,441,165

[45] Apr. 3, 1984

[54] REAL-TIME ORDINAL-VALUE FILTERS UTILIZING COMPLETE INTRA-DATA COMPARISONS

[75] Inventors: Guy B. Coleman, Northridge; James W. Henderson, Woodland Hills; Jacob M. Sacks, Thousand Oaks, all of Calif.

[73] Assignee: Hughes Aircraft Company, El Segundo, Calif.

[21] Appl. No.: 306,251

[22] Filed: Sep. 28, 1981

[51] Int. Cl.³ .......................... G06F 7/06; G06K 9/64
[52] U.S. Cl. ...................................... 364/900; 382/34; 382/36
[58] Field of Search ... 364/200 MS File, 900 MS File; 382/33, 34, 36, 37; 340/146.2

[56] References Cited

U.S. PATENT DOCUMENTS

| | | | |
|---|---|---|---|
| 2,987,705 | 6/1961 | van Mechelen | 364/900 |
| 3,336,580 | 8/1967 | Armstrong | 364/900 |
| 3,428,946 | 2/1969 | Batcher | 364/900 |
| 3,444,523 | 5/1969 | Dirks | 364/900 |
| 3,505,653 | 4/1970 | Kautz | 364/900 |
| 3,587,057 | 6/1971 | Armstrong | 364/900 |
| 3,636,519 | 1/1972 | Heath | 364/900 |
| 4,016,549 | 4/1977 | Hutner | 364/900 |
| 4,101,968 | 7/1978 | Florence | 364/900 |
| 4,110,837 | 8/1978 | Chen | 364/900 |
| 4,209,845 | 6/1980 | Berger et al. | 364/900 |

*Primary Examiner*—Leo H. Boudreau
*Attorney, Agent, or Firm*—Gerald J. Woloson; Lawrence V. Link; A. W. Karambelas

[57] ABSTRACT

Operating at real-time data rates, the disclosed hardware apparatus determine which one of a set of R input data signals is the Mth-largest. Mutual comparisons between the data values themselves provides the basis for the mechanized determination schemes.

After every data signal is pair-wise compared (112-167) with every other data signal, each subset of results (C12-C17, C12-C27, C13-C37, C14-C47, C15-C57, C16-C67), consistng of the outcome of the comparisons between a given data signal and all other data signals, is tested (210-260) to determine whether the results indicate that (M-1) of the other data signals are greater than the given signal. That data signal whose result set satisfies this (M-1) condition is the Mth-largest and is used (270, 280) as the network output (285).

For data that is serially-presented (490,400) a network simplification makes set-testing possible after only one data value, that most-recently-presented, is compared (412-417) to all other (R-1) signals of the set. The simplification entails reducing the number of comparators utilized, while employing storage elements (512-567) to preserve for set-testing purposes the appropriate ones of the results of comparisons made prior to the presentation of the most-recent serial data element.

When the number R of inputs is odd and M is made equal to (R+1)/2, the networks become real-time median filters.

27 Claims, 11 Drawing Figures

REAL-TIME ORDINAL-VALUE FILTERS UTILIZING COMPLETE INTRA-DATA COMPARISONS

CROSS-REFERENCE TO RELATED APPLICATIONS

Here incorporated by reference are the disclosures of the following related, co-pending, common-assignee patent applications: "Real-Time Ordinal-Value Filters Utilizing Partial Intra-Data Comparisons," "Real-Time Ordinal-Value Filter Utilizing Reference-Function Comparison" and "Real-Time Ordinal-Value Filter Utilizing Half-Interval Ranking."

BACKGROUND OF THE INVENTION

1. Field of the Invention

The invention relates in general to signalprocessing apparatus and in particular to networks for determining the Mth-largest of an input data set. The invention has special relevance in those environments, such as image processing, where it is advantageous to perform this value determination in real time.

2. Description of the Prior Art

Presented here is the concept of an ordinal-value filter which determines which one of a set of R applied data values is the Mth-largest. When R is odd and M is made equal to $(R+1)/2$, the Mth-largest becomes the "middle" value of the data set, having in general an equal number of other data values both larger than and smaller than itself. Such a middle value is designated the median. A median filter is one which determines or selects this median value from an input data set.

Although both the basic concept of the median filter and its use in the field of image processing are well known, many prior realizations have depended upon timeconsuming software routines.

Prior-art network concepts which are capable of being mechanized as hardware-economical, ordinal-value filters which perform their Mth-largest determination at the incoming data rate are presented by D. Knuth in Vol. 3 of his book *The Art of Computer Programming: Sorting and Searching* (1973). See especially the odd-even transposition sorting networks given in Knuth's FIG. 58 on page 241.

It should be noted, however, that the inventions claimed in this specification are considered to be patentably different from Knuth's concepts, as well as from the network concepts and mechanizations presented in the incorporated applications.

A real-time, ordinal-value-filtering capability is extremely useful, especially, for example, in those situations where the ordinal-value processing of dynamic images is of greatest value when it can be performed as the images are occurring.

SUMMARY OF THE INVENTION

It is an aim of this invention, therefore, to provide apparatus for determining the Mth-largest value of a set of input data values.

It is also an aim of this invention to provide apparatus for performing such determinations with a minimum amount of hardware.

It is another aim of this invention to provide minimum-hardware implementations which can perform such determinations efficiently in real time.

These and other objects are achieved by the disclosed invention which in one of its aspects provides an apparatus which first pair-wise compares each data value of the presented set with every other value of that set. With respect to each result subset consisting of the outcome of the comparisons between a given signal of the set and all other set signals, the inventive apparatus then determines whether the results indicate that (M-1) of the other data signals are greater than the subject signal. That data signal whose result subset satisfies this (M-1) condition is the Mth-largest and is used by the apparatus as the filter output.

For data that is serially-presented, another aspect of the invention makes set-testing possible after only one data value, the most-recently-presented, is compared to all other (R-1) signals of the set. In this aspect of the invention, storage elements are employed to preserve for set-testing purposes the appropriate ones of the results of comparisons made prior to the presentation of the most-recent serial data element.

When the number R of inputs is odd and M is made equal to $(R+1)/2$, the provided apparatus become real-time median filters.

BRIEF DESCRIPTION OF THE DRAWINGS

These and other objects and advantages will become apparent from a study of the following specification when considered in conjunction with the accompanying drawings in which.

As the second portion of an Mth-largest filter.

As the second section of the serial simplification of the FIG. 1 apparatus.

Figure 1:
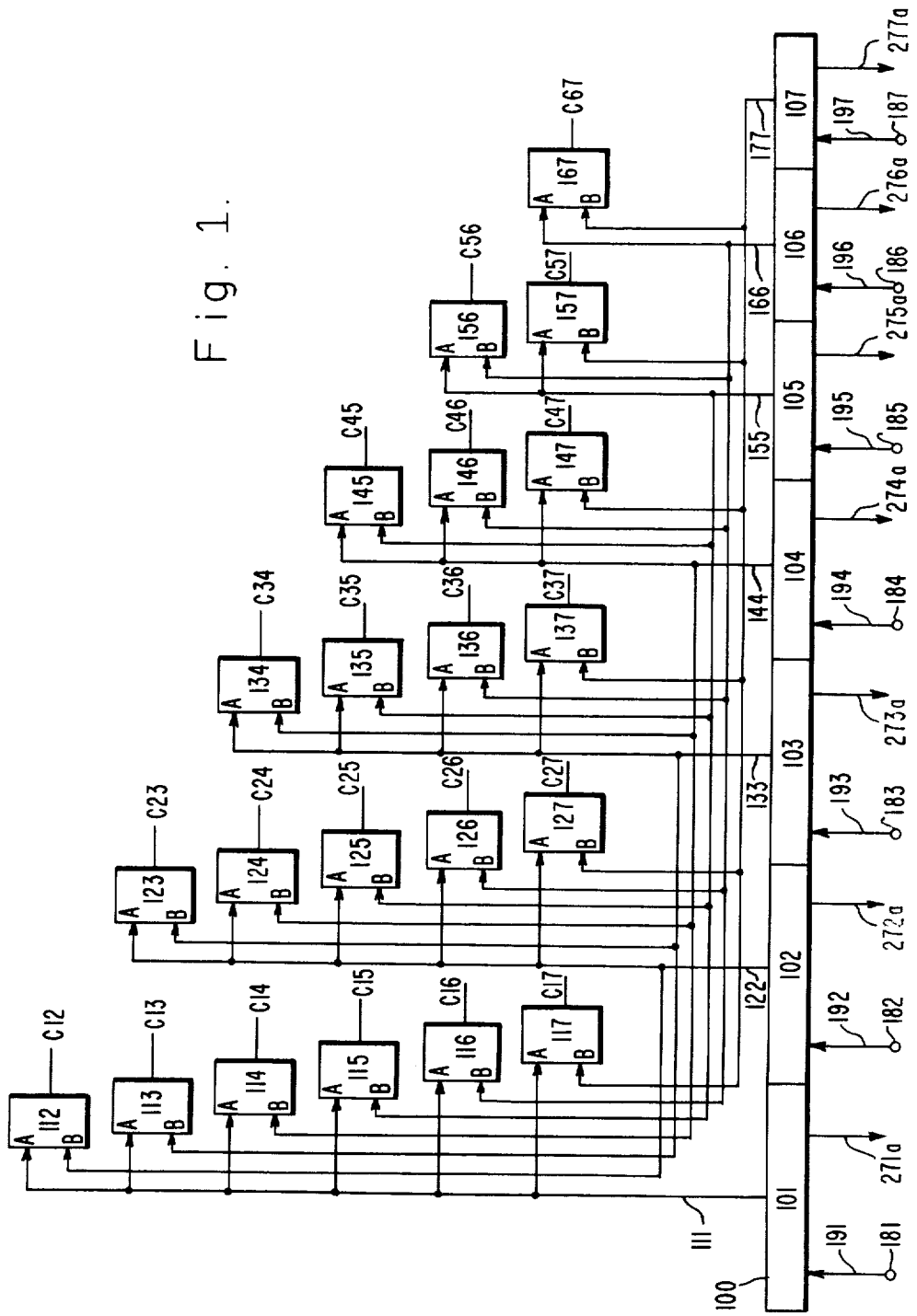
FIG. 1 presents, as the first portion of an Mth-largest ordinal-value filter, a comparator array which compares each data value of an input set to every other value of that set.
Figure 4:
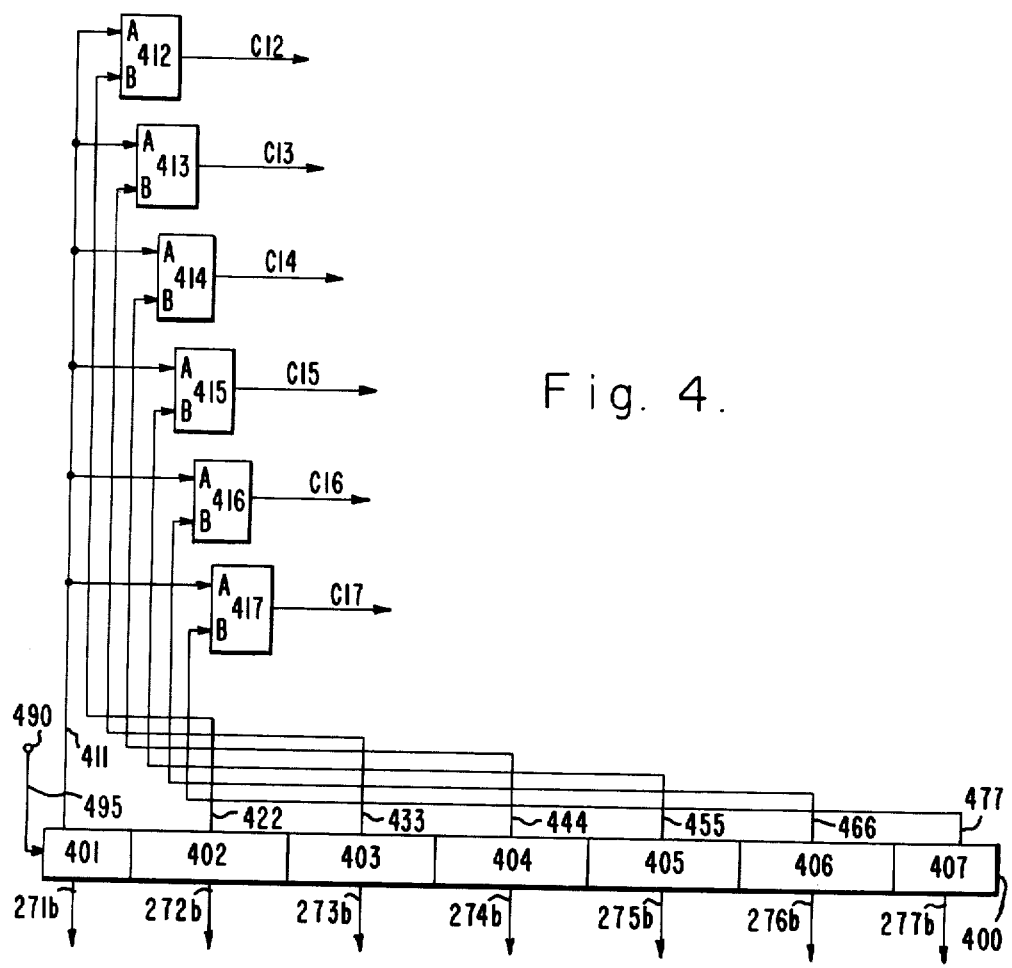
FIG. 4 shows one section of a simplification of the FIG. 1 apparatus made possible when the input signals are serially-presented.
Figure 7:
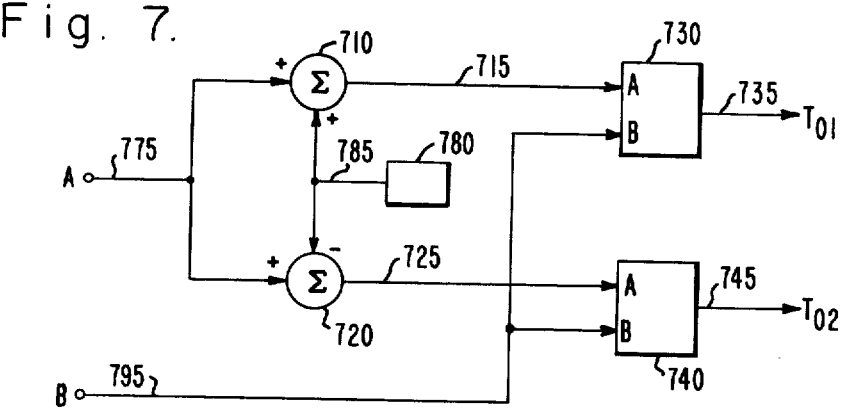
Figure 5:
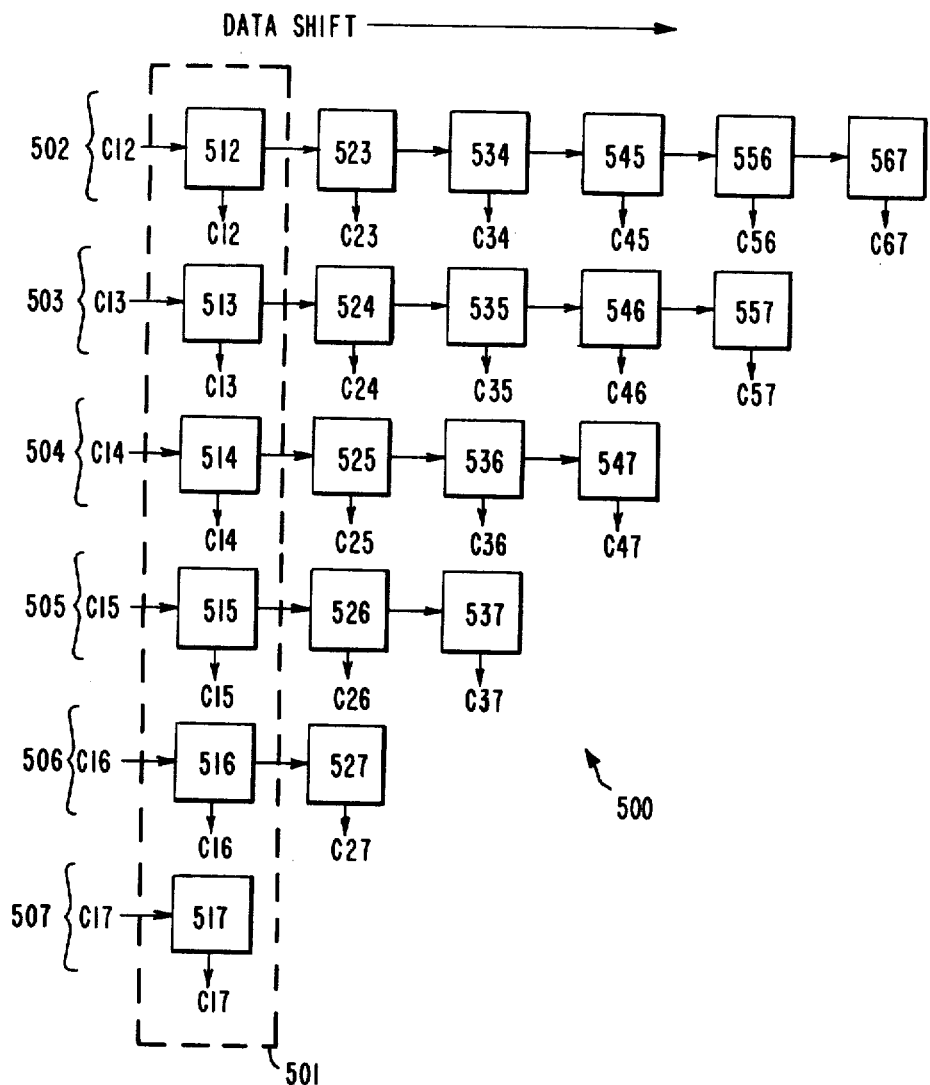
FIG. 5 shows a storage array which holds intermediately-made comparison results prior to their being processed by a Rank-Detector array such as the one shown in FIG. 2.
Figure 6:
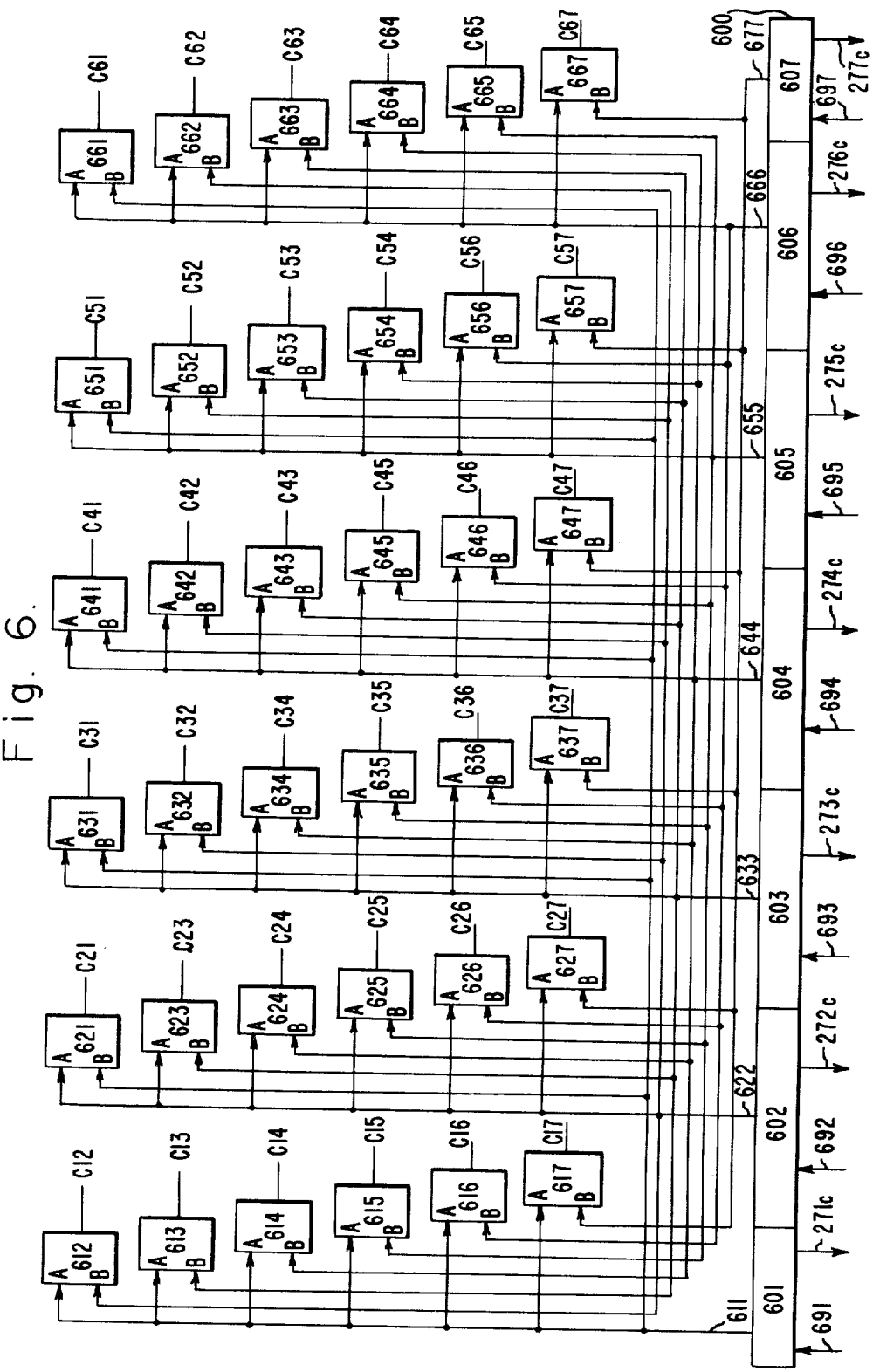
Figure 8:
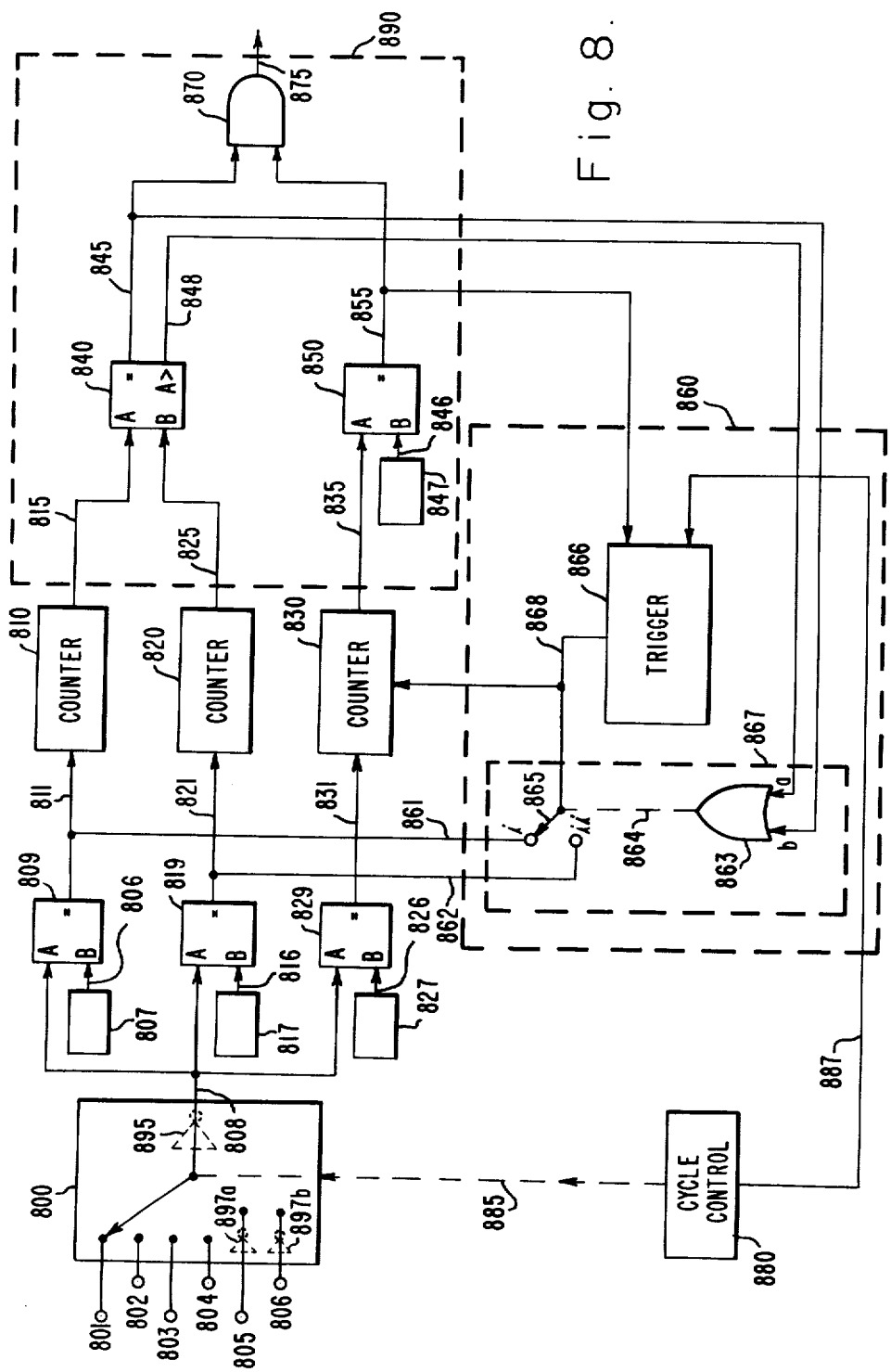
Figure 9:
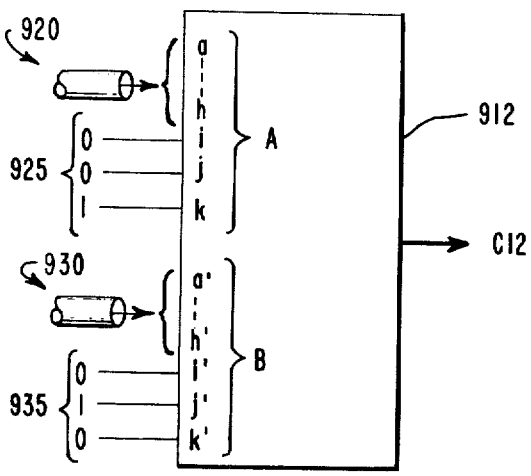
Figure 10:
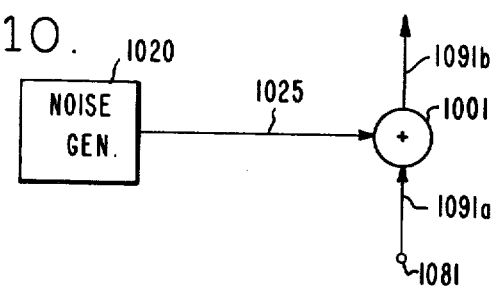
Figure 11:
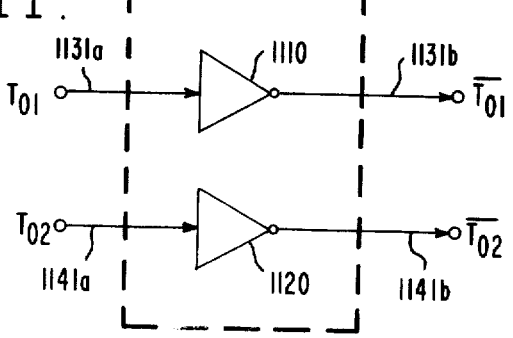

Displayed in FIG. 6 is an alternative comparator configuration in which each of all but one of the data values is separately compared to each of the other data values and in which a distinct comparison-output signal indication is generated for each pair of data values which are equal;

FIG. 7 shows an example mechanizaton for a tri-state comparison device which can be utilized in the FIG. 6 array to generate the distinct, equality-state output indication;

FIG. 8 shows an example mechanization of a tri-state Rank Detector used for processing the result subsets produced by the tri-state comparators of the FIG. 6 comparator array;

In FIGS. 9 and 10 are presented mechanisms for augmenting the presented data values so as to resolve equal-data-induced ambiguities;

FIG. 11 shows a conditioning subnetwork which may be used to convert tri-state outputs generated by the arrays of FIGS. 1, 4 and 5 into a format suitable for processing by the detector apparatus of FIG. 8.

DETAILED DESCRIPTION OF THE INVENTION

I. Network For Complete Mutual Comparisons With Parallel Data

A. Overview

Figure 2:
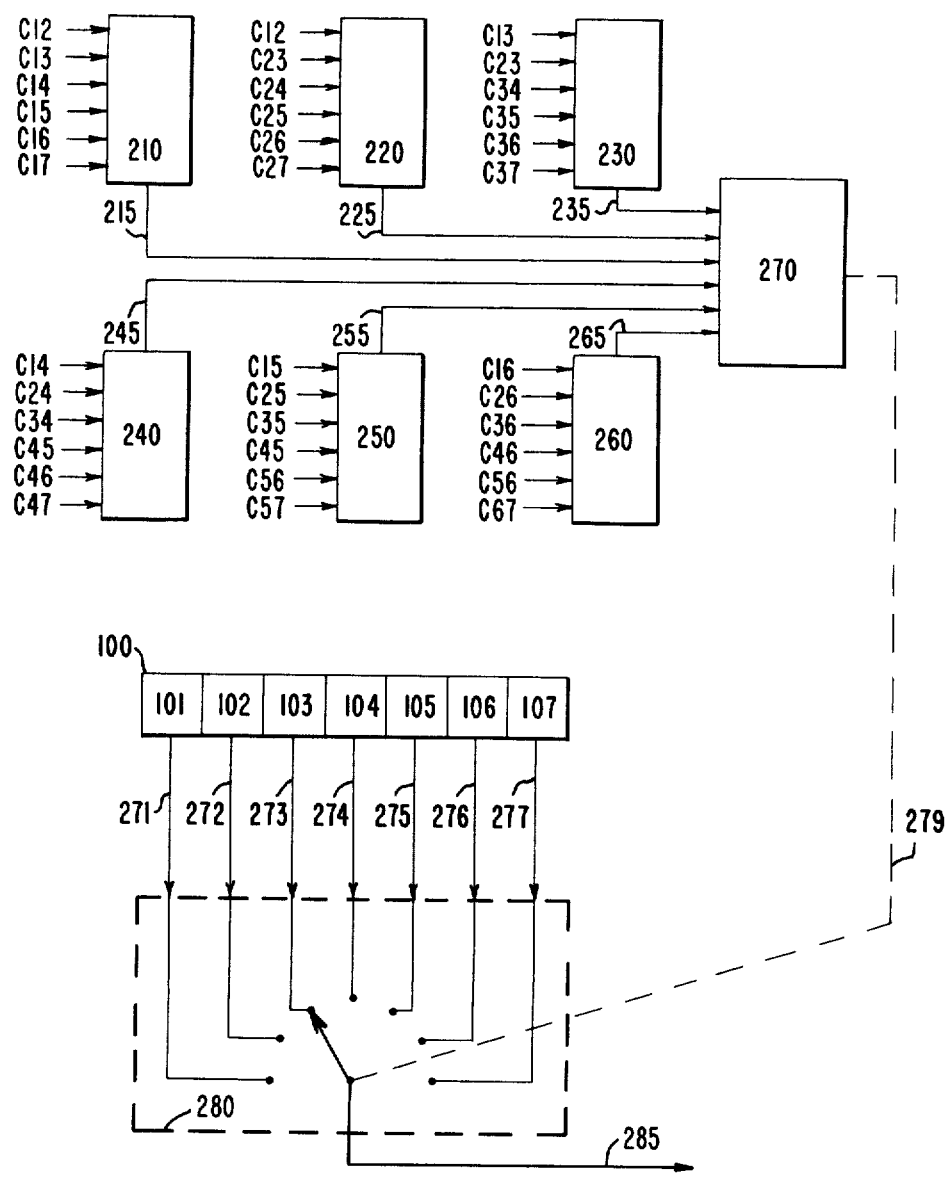
FIG. 2 presents an array in which each of a plurality of Rank Detectors collects the results of comparing one of the data values with all other values and then determines whether these collected results indicate that (M-1) of the other values are larger than the subject value.

Included within the general scope of the invention is the illustrative embodiment presented in FIGS. 1 and 2 in which an array of comparators 112-167 is used to compare each of the R (here 7) data values in register 100 with every one of the other (R-1) data values of the set. The results of these individual comparisons are used as inputs to the (R-1) Rank Detectors 210-260 of FIG. 2. Each detector receives (R-1) inputs. These consist of the outcomes of the (R-1) comparisons between a unique one of the data signals on one hand and each of the remaining (R-1 data signals on the other. A given detector's output is activated only when its associated (R-1) comparison results indicate that (M-1) of the other data signals are larger than the subject unique signal of that detector. This (M-1) relationship is a necessary condition for the subject signal to in fact be the desired Mth-largest. For a given set of R data signals, there is generally only one detector whose inputs satisfy this relative-ranking condition. Output decoder 270 determines which of the detectors has become activated in response to the (M-1) condition and then commands output-selection unit 280 to select from input register 100 the corresponding data signal as the ordinal-value output of the filter.

To reduce the amount of hardware required, the Rth data value (here stored in position 107) is not affirmatively tested by a separate, additional Rank Detector of its own. Instead, this value is selected by "default" when all of the (R-1) detectors remain inactive, thus indicating that none of the corresponding first through (R-1)st data values is the proper Mth-largest, and that the Rth value must, therefore, itself be the desired Mth-largest.

B. Implementation Details

1. Input Storage Register

Input storage register 100 receives and stores a set of R subject data signals. The individual elements of the signal set are held in subregister storage positions 101 through 107. To facilitate the susequent description of other aspects of the inventive apparatus, it is conveni@nt to apply ordinal designators to these subregister positions and to the associated data elements stored within them. The positions and elements are given the respective ordinal designations of first through Rth, thereby defining a relative positional identification order among the stored data signals, with the first data signal being the lowest-order element while the Rth data signal is the highest-order element.

In the example mechanization, the data signals are received at connections 181 through 187 from external sources not shown. As one of many alternatives still encompassed within the inventive concept, subregisters 101 through 107 could themselves be direct-sensing storage elements such as charge-coupled devices, thus eliminating the need for external source connections. Nevertheless, when in fact derived from external sources in accordance with the depicted example embodiment, the signals are carried over channels 191 through 197 into the respective subregisters.

In another alternative still encompassed within the inventive concept, input register 100 could be a shift register which would receive over channel 191 from connection 181 the individual elements of a serially-presented data stream. By means of conventional timing and control apparatus and techniques, these individual data signals would be made to shift through the successive subregisters as subsequent data-stream elements were received. In this shift-register configuration, the subject data sets whose Mth-largest value is to be formulated would be each of the successive R-unit clusters of data-stream elements as contained at a given time in the input register.

The stored data may be accessed by means of subregister output lines $271(a)$ through $277(a)$. The purpose for these lines will be further explained below.

The overall filters described in this specification are capable of processing either analog or digital data signals, with the principal differences between the two cases being the analog or digital components required for input register 100, for comparators 112 through 167, and for the associated input and interconnection channels. Special implementation requirements and advantages for example digital and analog mechanizations will be discussed in greater detail below.

2. Comparator Array

A central feature of the inventive apparatus is the provision of a comparator unit which performs a "complete" comparison in that each of the subject R data values is compared with every one of the other (R-1) data values. The depicted FIG. 1 array of comparators 112 through 167 represents a particular realization of a general configuration concept according to which the required complete comparison is performed on a pairwise basis with respect to a specially-selected grouping of unique pairs of the applied data values.

This selected grouping contains selected ones of all of the possible unique ordered pairs which can be formed from an R-member set. Each of the unique pairs selected for the subject grouping is one of the two possible ordered combinations of two given elements from the applied R-unit set. One of the main reasons why the grouping is designated a "selected" one is that only one of the two ordered combinations is utilized in any given grouping. For example, in a situation where the second data value, held in subregister storage position 102, is 187, and the fifth data value, held in subregister storage position 105, is 13, then the two possible ordered pairs of these elements are (187, 13) and (13, 187). The ordered pair chosen for comparison in the depicted preferred embodiment is the one in which the subregister-102 value appears first and is thus (187, 13).

The ordered members of each such selected unique pair are identified as a first member and a second member, where, with respect to the example, pair, 187 is designated the first pair member while 13 is the second.

In accordance with ordinary mathematical selection concepts, the total number J of unique pairs which can be selected in this manner from a set of arbitrary size R is $(R^2 - R)/2$ or equivalently ($(R)^2 - (R) - (\rightarrow(1+2+3+\ldots+(R-1)))$). Because in the depicted embodiment R=7, these stated relations yield a selected unique pair count of 21.

A corresponding number J, here 21, of discreet comparators is utilized in the preferred embodiment to perform the complete comparisons by way of individual pair-wise comparisons between the members of each selected unique pair. Each of the J comparators thus receives a unique one of these selected pairs and compares the first member of that pair to the second pair member. As the indicator of the result of each of these comparisons, each comparator generates a distinct comparison-output signal. Thus, in a continuation of the above example, the pair (187, 13) from subregisters 102 and 105 is received by comparator 125 which then compares the value 187 to the value 13 and generates the distinct comparison-output signal C25.

In comparing the first pair member to the second, each comparator is deemed to be treating the first member as a "tested" value and the second as a "reference" value, with the resulting distinct comparison-output signal becoming more generally an indication of the relative magnitude of a particular tested value with respect to a particular reference value. This "tested" and "reference" status of each pair member is important because, as will be subsequently demonstrated, it affects the precise nature of various kinds of tests which are performed on each comparison-output signal by subsequent portions of the apparatus.

In accordance with a more specific aspect of the invention, each of the J comparators is a bi-state device which generates, as the associated comparison-output signal, one of two output logic levels. The first is generated when the associated second-pair-member reference value is greater than the associated first-pair-member tested value, while the second logic level is generated when the reference value is less than the tested value. As is the case throughout this specification whenever reference is made to first and second logic levels, the first level may in an actual implementation be a logic "one," while the second would become a logic "zero." For the example case where the reference value 13 is smaller than the tested value 187, the comparison-output signal C25 would thus be a logic level zero.

If the compared values become equal, each comparator is set so as to generate a predetermined one of either of its two possible output states. While the equality level so chosen need not, in all operational situations, necessarily be the same among all of the comparators, for the sake of convenience the equality level chosen in the preferred embodiment is the same for all J comparators. This particular uniform selection will later be demonstrated to be one aspect of the means by which the preferred embodiment comes to inherently possess, in many situations, an ambiguity-resolution capability.

In the depicted realization, the logic level "one" will be designated as the equality output state for purposes of apparatus description, although the choice of logic level "zero" would not significantly affect device operation and would still contribute to providing the overall filter with an inherent ambiguity-resolution capability. Thus if in the example the subregister-102 data value had also been a 13, then C25 would have been a logic "one" which, as further discussed below, would create an artificial priority in which the subregister-105 value 13 is treated as if larger than the subregister-102 value 13.

With respect to the overall FIG. 1 realization of these concepts, the selected unique-pair grouping consists of only those 21 pairs in which a lowerorder data value is the first pair member. Designating the individual first through seventh data values as $d_1$ through $d_7$ respectively, the FIG. 1 mechanization thus contains, for example, all of the pairs $(d_1, d_2)$ through $(d_1, d_7)$, but none of the pairs $(d_2, d_1)$ through $(d_7, d_1)$.

Given this particular selected grouping, it becomes convenient to arrange the pairs, together with their associated comparators, into a plurality of (R-1) subsets or clusters. The unique pairs in each cluster are all those for which a given unique one of the data values is the lower-order first-pair member. These clusters are given the respective ordinal designations of first through (R-1)st subset, in respective correspondence to the lower-order data value which is the first member of each pair in that cluster. The number of comparators in each of the mechanized subsets can be generally specified as (R-V), where V is the number corresponding to the ordinal identifier of the subject lower-order data value.

The comparator array of FIG. 1 thus contains (R-1) or six clusters. The first cluster contains the six comparators 112 through 117 which compare the members of the (R-V) or (R-1) and hence six unique pairs in which the Vth or first data value is the first member of the pair. Each of these comparators receives over data channel 111 from subregister 101 the first data value, which is then used as the first or "A" input at each of the devices. As its second or "B" input, each of these comparators respectively receives over channels 122 through 177 from respective subregisters 102 through 107 a unique one of the remaining second through seventh data values.

The second cluster likewise contains the five comparators 123 through 127 which compare the members of the (R-V) or (R-2) and hence five unique pairs in which the Vth or second data value is the first member of the pair. Each of these comparators receives over data channel 122 from subregister 102 the second data value, which is then used as the first or "A" input at each of these devices. As its second or "B" input, each of these comparators respectively receives over channels 133 through 177 from respective subregisters 103 through 107 a unique one of the remaining third through seventh data values.

In a similar fashion, the third cluster contains the four comparators 134 through 137 which compare the members of the (R-V) or (R-3) and hence four unique pairs in which the Vth or third data value is the first member s respectively receives over channels 144 through 177 from respective subregisters 104 through 107 a unique one of the remaining fourth through seventh data values.

The fourth cluster contains the three comparators 145 through 147 which compare the members of the (R-V) or (R-4) and hence three unique pairs in which the Vth or fourth data value is the first member of the pair. Each of these comparators receives over data channel 144 from subregister 104 the fourth data value, which is then used as the first or "A" input at each of the devices. As its second or "B" input, each of these comparators respectively receives over channels 155 through 177 from respective subregisters 105 through 107 a unique one of the remaining fifth through seventh data values.

The fifth cluster contains the two comparators 156 and 157 which compare the members of the (R-V) or (R-5) and hence two unique pairs in which the Vth or fifth data value is the first member of the pair. Each of these comparators receives over data channel 155 from subregister 105 the fifth data value, which is then used as the first or "A" input in each of the devices. As its second or "B" input, each of these comparators respectively receives over channels 166 and 177 from respective subregisters 106 and 107 a unique one of the remaining sixth and seventh data values.

The sixth and last cluster contains the one comparator 167 which compares the members of the (R-V) or (R-6) and hence one unique pair in which the Vth or sixth data value is the first member of the pair. This comparator receives over data channel 166 from subregister 106 the sixth data value, which is then used as the first or "A" input at this device. As its second or "B" input, the comparator receives over channel 177 from subregister 107 the final remaining seventh data value.

It may be noted that, for convenience in view of resulting required connection patterns in subsequent portions of the inventive apparatus, individual comparators, as well as the resulting associated comparison-output signals, have been numbered and labeled so as to correspond not only to the two data values which are compared by the given comparator and whose comparison causes the associated output signal to be generated, but also to the "tested" and "reference" status of these two data values. Thus each comparator and its associated output signal may in general be respectively designated as comparator 1VZ and output CVZ, in respective correspondence to the tested and reference-value nature of the lower-order Vth and higher-order Zth associated data signals.

As a result of the described pair selections, comparator arrangements and array interconnections shown in FIG. 1, each of the seven data values in input register 100 is compared with each of the other six data values, as is required in accordance with the invention.

3. Detector Array a. Generic Considerations

The inventive apparatus includes a detector unit which receives and processes the comparison-output signals generated by the previously-described comparator array. The processing involves the performance of specialized tests upon particular subsets of the results of the comparisons among all of the data signals.

Each of the subsets upon which the processing is performed is designated a "common-element subset" and consists essentially of all comparison-output results obtained from the comparison between a given one of the data signals on one hand and each of the other (R-1) data signals on the other. For example, with regard to the comparison-output signals generated by the comparison array presented in FIG. 1, the common-element subset for which the first data value is the common element consists of the (R-1) or 6 signals C12, C13, C14, C15, C16 and C17. Similarly, the common-element subset for which the fifth data value is the common element consists of the 6 signals C15, C25, C35, C45, C56 and C57.

The subsets which the invention requires for this testing make up a minimal subclass of at least (R-1) distinct common-element subsets. The tested subsets selected for the minimal subclass are distinct in that no two of such subsets have the same associated common-data element. From any given applied R-member data set, there exists R possible ones of such distinct common-element subsets, each corresponding to one of the R applied data values. The comparator array of the invention inherently generates all of the comparison-output signals which would be needed for all of these R possible distinct subsets. Any (R-1) ones of these R possible distinct subsets could be selected as a minimal subclass and sent to the detector array for the subject testing. The example embodiment presented in FIGS. 1 and 2 utilizes, as the chosen subsets of the minimal subclass, those common-element subsets associated with the first 6 data values. For convenience, these chosen subsets are respectively ordinally identified as the first through sixth, or more generally (R-1)st, common-element subsets. Thus, in addition to the previously-described first and fifth subsets, the chosen minimal subclass would include the second subset, which consists of the comparison-output results C12, C23, C24, C25, C26 and C27, as well as the third subset, which consists of the comparison-output results C13, C23, C34, C35, C36 and C37, together with the fourth subset, which would consist of the comparison-output results C14, C24, C34, C45, C46 and C47, and also the sixth subset, which would consist of the comparison-output results C16, C26, C36, C46, C56 and C67.

As an introduction to the description of the subset processing performed in general by the detector array and in particular by the below-described individual detectors, it is helpful to reiterate that a central purpose of the overall apparatus is, of course, to determine which of the R data values is the Mth-largest. For a given one of these values to in fact be such an Mth-largest, there must in general be exactly (M-1) of the (R-1) other values which are larger than the subject value. A separate test with respect to each data value of whether exactly (M-1) of the other data values are larger thus becomes a part of the basis of a particular technique for accomplishing the desired Mth-largest determination.

As noted above, the comparator array provides, by means of the comparator-output signals, indicators of the relative magnitude of each of the data signals with respect to each of the other data signals. After assembling, in the form of the common-element result subsets, these relative-magnitude indicators, the detector array then completes the realization of this particular Mth-largest technique by testing each of the selected subsets so as to determine whether the comparison-output signals together indicate that exactly (M-1) of the other (R-1) data signals are larger than the associated common element. The satisfaction of this "smaller-than (M-1)" condition by any one of the subsets means that the associated common element is a desired Mth-largest.

As an example of this subset-testing technique, consider the situation where it is desired to determine which of the data values is the fourth-largest, with M thus being equal to 4 and (M-1) being 3. If in the common-element subset associated with the first data value the comparison-output signals indicate that 6 of the other data values are larger, then the first data value cannot be the fourth-largest. If, however, in the common-element subset associated with the fifth value the comparison-output signals indicate that precisely 3 of the other 6 data values are larger than this fifth value, then the fifth value is in fact the fourth-largest.

In the more specific aspect of the invention where the comparator array includes individual bi-state comparison devices, the comparison results have been shown to be signals whose plural levels are the indicators of these (R-1) signals indicate that the associated data values, with which the common element was compared to produce the (M-1) signals, were larger than the common element.

However, before proceeding to describe with greater specificity the precise form of the (M-1) testing which is performed with respect to these levels as collected in a given subset, it is helpful to emphasize some important considerations concerning the relative-magnitude meaning conveyed by a given single one of such levels as generated by the preferred embodiment.

With respect to the individual comparison-output signals of a given common-element subset, the (M-1) test effectively reduces to the implied asking of two questions: the first is an initial threshold question of whether a given comparison-output signal indicates that the associated "other" data value is larger than the associated common-element which is being generally checked in that subset. The Mth-largest test is then completed by following this threshold test with a determination of whether there are (M-1) "yes" answers to the (R-1) individual "other-larger?" questions.

During such subset testing, a characteristic of the preferred embodiment's comparison-output signals which must be compensated for is that because a given one of the comparison-output signals must generally be utilized not only in two different subsets but also in a different way in each of these subsets, a single one of the levels assumed by any one of the comparison signals provides two different answers to this "other-larger?" question.

For example, it will be recalled that any given one of the bi-state devices 1VZ compares the first and second members of the associated unique ordered pair (V, Z) and generates a first logic level when the associated reference value Z is larger than the associated tested value V. As a result, assuming that the chosen minimal subclass of (R-1) subsets includes the common-element subset for which the tested value V is the associated common element, then in this subset, when the associated comparison-output signal CVZ becomes the first logic level, this level's meaning is that that particular other data value which was the reference value at comparator 1VZ is larger than this common element. As between the Vth and Zth values, therefore, with the Vth in the role of the common element, the first logic level provides a "yes" answer to the "other-larger?" question.

It will likewise be recalled that in the preferred embodiment's selected grouping of unique pairs upon which the comparators operate, only one of the two possible ordered chosen minimal subclass of (R-1) subsets includes the common-element subset for which the Zth value is the common element, there will be no comparator signal CZV, and the signal CVZ must be utilized as the indicator of the relative magnitude of the common element Z with respect to the Vth value as a particular one of the other (R-1) data values. It is thus CVZ which will have to be the source of the answer to the "other larger?" question in the situation where the Zth value appears in the role of the common element while the Vth value appears in the role of the "other."

CVZ in general becomes the first logic level only when the Zth value is larger than the Vth. This, however, is the same as saying that CVZ in general becomes the first logic level only when the Vth signal is not larger than the Zth. As between a "common-element" Zth value and an "other" Vth value, therefore, the first logic level gives a "no" "other-larger?" answer. The example first logic level's "other-larger?" meaning with respect to a common-element Zth value is thus opposite from its "other larger?" meaning with respect to the paired common-element Vth value. Thus in response to the effectively-asked (M-1) test question of "is the other data value larger?", the first logic level is the answer "yes" with respect to the subset in which the generating tested value is the common element, while this same logic level is the answer "no" with respect to that subset in which the generating reference value is the common element.

As an illustration of these concepts and in a further continuation of the more specific example begun above in connection with the description with the comparator array, consider a situation where the first data value, held in subregister 101, is 9 and the fifth data value is again 13. The preferred embodiment selects the one ordered pair in which the lower-order value is the first pair member. Thus (9, 13) is the selected pair, with the first data value (=9) as the Vth value and the fifth data value (=13) as the Zth data value. This pair is then compared at comparator 1VZ, i.e. 115, where 9 becomes the tested value while 13 is the reference. The comparator then generates comparison-output signal CVZ, i.e. C15. Because the second-pair-member reference value 13 is larger than the first-pair-member tested value 9, C15 will be the first-level logic "one." With respect to the tested value 9 as the common element of the first subset of comparison-output results, C15's logic one indicates that ts neither the "opposite" pair (13, 9), nor an associated comparator 151, nor a C51 comparison-output signal. As a result, C15 must be utilized in the fifth subset where the Vth=first data value is smaller than the subject Zth=fifth common element. Therefore, with respect to the reference value 13 as the common-element of this fifth subset, C15's same logic one must be interpreted as indicating that the other data value which is held in the first subregister is smaller than the subject fifth common element. As this represents a "no" answer to the "other-larger?" question, the same logic level's meaning in the fifth common-element subset is thus opposite from its meaning in the first subset.

In the preferred embodiment, therefore, the composite (M-1) test of "(M-1) of the other values larger?" cannot be implemented as simply determining whether (M-1) of the subset signals are the first logic level. Other embodiments, for example that presented and described in conjunction with FIG. 6, generate comparison-output signals whose nature is such that the (M-1) testing may in fact be not only simplified in this manner but also made the same for all subsets as a result. Because in contrast an individual one of the preferred embodiment's logic levels possesses different meanings in different contexts, a more intricate test must be formulated.

The threshold "other-larger?" test must thus be more particularly specified as checking for the presence of the first logic level only with respect to those subset signals for which the associated common element was the tested value, while checking in addition for the presence of only the second logic level with respect to those remaining subset signals for which the associated common element was the reference value. The composite test then becomes a determination of whether the number of "tested" first logic levels plus the number of "reference" second logic levels is (M-1). If so, the associated common element is the Mth-largest.

Once the form of the test has been thus specified, its application to the example common-element subsets generated by the FIG. 1 array is simplified by the nature of the subsets' signal labels. As noted previously, for any signal CVZ, the first digit V is the ordinal identifier of the tested value while the second digit Z is the ordinal identifier of the associated reference value.

Thus in the fifth subset, where the component signals are C15, C25, C35, C45, C56 and C57, it can be seen that the associated common fifth element was the tested value for only the two signals C56 and C57. These two signals would then be tested for the presence of the first logic level.

It may similarly be seen that in the remaining four signals C15, C25, C35 and C45, the common fifth element was the reference value. These four signals would then be tested for the presence of the second logic level.

If, in the follow-up composite test, the sum of (the number of the signals C56 and C57 which were the first logic level) plus (the number of the signals C15, C25, C35 and C45 which were the second logic level) were to be (M-1), i.e. three in the example, then the fifth data value would in fact be the Mth or fourth-largest.

In any given subset, the number of those result signals for which the associated common element was the tested value, as well as the complementary number of those result signals for which the associated common element was the reference value, may readily be determined in advance of subset testing. This may generally be accomplished by simply noting the tested or reference status of the associated common element in each of the associated result-generating selected compared pairs. In view of this predeterminability, and for the sake of generality, the number of such comparator signals in each subset for which the associated common element is the tested value may be designated as K, while the number of comparator signals in each subset for which the associated common element is the reference value may be designated as H.

In the general case, the quantity K and the complementary quantity H will vary from subset to subset. In addition, there are instances, especially for example with respect to the preferred embodiment, where the quantities K and H of a given subset are uniquely different from those of any other subset. For the various described forms of the preferred embodiment, the uniqueness of K and H with respect to a given subset follows from what may be considered a pattern, likewise unique, of tested and reference status relationships as between the associated common element and all of the other (R-1) associated data values of that subset.

As the first part of an explanation as to why such a unique pattern exists, it may be recalled that each subset in effect represents the compared results of having selectively paired the given common element with every other data signal of the subject R-unit data set. It may be recalled in addition that the preferred embodiment's selected grouping of ordered pairs consists of only those pairs for which the lower-order data value is the first member of the pair. As a result, the common element, in its pairing with the rest of the given data values, will appear as the first pair member in those pairs for which the other member of the pair is a higher-order element, while appearing as the second pair member in those pairs for which the other pair member is a lower-order element. Because, as may be further recalled, the first member of any such pair becomes, in the postselection comparison of the pair's elements, the tested value while the second member becomes the reference value, the given common element will thus assume the status of a tested value with respect to higher-order data values while assuming the status of a reference value with respect to lower-order data values. Because each data value, and hence each subset's commmon element, has a unique number of the other data values which are of respective higher and lower order, the associated status pattern of the given common-element subset is, therefore, unique. This unique status pattern will later be demonstrated to be an important part of the basis of the means by which the preferred embodiment in many instances possesses an inherent ambiguity-resolution capability.

Thus more specifically with respect to the figure-depicted embodiment, it is known that all (R-1) or 6 of the second through Rth or seventh data values are of higher order than the first. In the first common-element subset, therefore, all of the comparison-output signals should be those for which the first data value was the tested value. As can be seen from the first-digit-tested and second-digit-reference status-indicating labels of the first subset's comparison-output signals C12, C13, C14, C15, C16 and C17, the first data value was indeed the tested value for each of these higher-order signals.

Similarly, in the case of the fifth data value, it is known that only the two of the other six data values are of higher order, while four are of lower order. In the fifth common-element subset, therefore, only two of the comparison-output signals should be those for which the fifth data value was the tested value, while the remaining four signals should be those for which the fifth data value was the reference value. As may likewise be seen from the labels of the fifth subset's comparison-output signals C15, C25, C35, C45, C56 and C57, the fifth data value was in fact the tested value with respect to the two higher-order signals, while being the reference value with respect to the four lower-order signals.

b. Rank Detectors

As a preliminary to a yet more detailed description of the (M-1) testing, a more specific aspect of the invention will now be described. In accordance with this more specific aspect, the detector array includes a plurality of (R-1) Rank Detectors, each of which receives and separately processes those comparison-output signals which make up a unique one of the common-element subsets of the selected minimal subclass. These detectors appear in the FIG. 2 version of the preferred embodiment as the (R-1) or 6 elements 210 through 260. For the sake of convenience, these detectors are respectively ordinally identified as the first through (R-1)st or sixth Rank Detector, with any one detector being designatable as the Gth detector. In FIG. 2, element 210 is the first detector while elements 220 through 260 are the second through sixth detectors respectively.

Each of the subsets to which each of the Rank Detectors is responsive may now be specified as all those (R-1) comparison-output signals for which the associated common-data element is either the tested or reference value in the comparators which generate those signals. In the realized embodiment of FIG. 2, the unique subset received by a given Gth detector is, for the sake of convenience, that one having the same ordinal indentifier.

With reference to this ordinal identification and to the Vth and Zth components of any comparison-output signals's CVZ label, it thus becomes possible to further specify each rank detector as being responsive to that particular common-element subset which consists essentially of those (R-1) comparison-output signals for which the unique, correspondingly-identified Gth one of the first (R-1) data elements is either the Vth tested value or the Zth reference value.

With reference to the depicted embodiment, the first rank-detector 210 thus receives, from appropriate ones of the members of the FIG. 1 comparator array, those comparison-output signals for which the first data value is either the tested or reference value, these signals being the previously-described cluster consisting of C12, C13, C14, C15, C16 and C17.

The second rank detector 220 similarly receives, from appropriate ones of the members of the FIG. 1 comparator array, those comparison-output signals for which the second data value is either the tested or reference value, these signals being the previously-described cluster consisting of C12, C23, C24, C25, C26 and C27.

The third rank detector 230 likewise receives, from appropriate ones of the members of the FIG. 1 comparator array, those comparison-output signals for which the third data value is either the tested or reference value, these signals being the previously-described cluster consisting of C13, C23, C34, C35, C36 and C37.

The fourth rank detector 240 receives, from appropriate ones of the members of the FIG. 1 comparator array, those comparison-output signals for which the fourth data value is either the tested or reference value, these signals being the previously-described cluster consisting of C14, C24, C34, C45, C46 and C47.

The fifth rank detector 250 receives, from appropriate ones of the members of the FIG. 1 comparator array, those comparison-output signals for which the fifth data value is either the tested or reference value, these signals being the previously-described cluster consisting of C15, C25, C35, C45, C56 and C57.

Finally, the sixth rank detector 260 receives, from appropriate ones of the members of the FIG. 1 comparator array those comparison-output signals for which the sixth data value is either the tested or reference value, these signals being the previously-described cluster consisting of C16, C26, C36, C46, C56 and C67.

As has previously been described, in each of the subsets now received by the detectors, a predetermined K ones of the (R-1) comparison signals in each such subset are those for which the associated common element is the tested value, while a predetermined H ones of the (R-1) signals are those for which the associated common element is the reference value. With the Gth data element now having been designated, in the inventions's more particular aspects, as the common element in the Gth detector's subset, a more precise specification of the numbers H and K may now be set forth for the situation where the compared selected grouping of unique pairs consists of those for which the lower-order pair member appears in the first-member position. In these circumstances, K becomes equal to the quantity (R-G) while H becomes equal to the quantity (G-1).

These relationships are verified in the depicted embodiment where, for example, with respect to the first subset, K=(R-G)=(R-1)=6 and H=(G-1)=(1-1)=0, and where the first data value was thus the tested value for all six of the generating pairs while being the reference value for none of these pairs.

The relations are similarly verified by each of the remaining subsets where, for example, with respect to the fifth subset, K=(R-G)=(R-5)=2 and H=(G-1)=(5-1)=4. It may be observed from the associated signal labels that there are indeed two comparison-output signals for which the common fifth value was the tested value and four comparison-output signals for which the fifth value was the reference value.

The formal composite (M-1) test performed by each of the preferred embodiment's Rank Detectors upon the associated subset may now be specifically detailed as the determination of whether, in the associated subset, the sum of (the total number of situation presented in the following Table. The Table summarizes those aspects of the operation of the apparatus of FIGS. 1 and 2 which concern the fifth data value, the fifth common-element subset, and the fifth Rank Detector. With regard to the symbology utilized, "$d_i$" represents the ith data value from the ith storage subregister, "comp 1VZ ($d_i,d_j$)" represents the operation of comparator 1VZ upon the data pair consisting of $d_i$ and $d_j$, while "CVZ" represents the previously-described indicator of the result of the given comparison. It is desired to determine which data value is the fourth-largest.

EXAMPLE OF SYSTEM OPERATION

| R = 7 | | M = 4 | |
| --- | --- | --- | --- |
| $d_1 = 9$ | comp 115 | (9, 13) = C15 = logic 1 |
| $d_2 = 187$ | comp 125 | (187, 13) = C25 = logic 0 |
| $d_3 = 33$ | comp 135 | (33, 13) = C35 = logic 0 |
| $d_4 = 206$ | comp 145 | (206, 13) = C45 = logic 0 |
| $d_5 = 13$ | | |
| $d_6 = 12$ | comp 156 | (13, 12) = C56 = logic 0 |
| $d_7 = 12$ | comp 157 | (13, 12) = C57 = logic 0 |

K tested signals:
C56 = logic 0
C57 = logic 0
H reference signals:
C15 = logic 1
C25 = logic 0
C35 = logic 0
C45 = logic 0
Mth-largest test:
 (a) # of K which are first logic level = none
 (b) # of H which are second logic level = three
 (c) "none" plus "three" = 3 = (M-1)
  Therefore, the fifth data value 13 is the fourth-largest of the set (9, 187, 33, 206, 13, 12, 12).

In accordance with an even more specific aspect of the invention, the individual Rank Detectors may be prescribed to be conventional addressable memories. Such conventional memories have, of course, a plurality of memory locations, each of which is spsubset is utilized as the input memory address for that detector's memory. The memory is coded so that an appropriate representation for a first ranking logic level is stored at preselected ones of its memory locations, while appropriate representation for a second ranking logic level is stored at preselected other ones of its memory locations.

The manner in which each subset's comparison-output signals are ordered so as to form the address ensemble is not critical, as long as the associated address assignment is tailored to the way in which the K/H sum patterns manifest themselves in the given orderings. For convenience, the comparison-output signal ordering may be made to correspond to an ordinal arrangement of the non-common-element pair members in the given subset. Thus for the fifth subset, where the non-common-element data values are the first, second, third, fourth, sixth and seventh, the ordering would be C15, C25, C35, C45, C56, C57.

A key aspect of the use of such memories as Rank Detectors concerns the specification of which memory locations are to contain which ones of these first and second ranking levels. The assignment is a function of whether the associated comparison-output signals, the ordered ensemble of whose levels form a given address, satisfy the above-described K/H sum condition. The representation for the first ranking level is stored at only those memory locations for which the address is a logic-level pattern which satisfies the K/H condition. The representation for the second logic level is stored at the remaining memory locations, these being those whose addresses are logic-level patterns which do not satisfy the K/H condition. When each memory is coded in this manner, the first logic level representation appears as a memory's output only when the logic levels of the comparison-output signals in the associated subset satisfy the (M-1) test and thus only when the associated common element is the Mth-largest. For convenience, the first ranking logic level may be made a logic "one," while the second ranking level may be made a logic "zero."

Consider as an example the above-tabulated case. Because at the fifth subset, whose ordered members are (C15, C25, C35, C45, C56, C57), the ordered logic pattern (1, 0, 0, 0, 0, 0) satisfies the K/H test, the associated memory would be coded so that the memory location having the address (100000) stores the representation for the first ranking level.

Similarly, consider the situation where the R data values are such that the fifth subset's members assume the respective ordered levels (1, 0, 0, 0, 1, 0). This pattern could be generated where in the above example $d_6$ were 51 instead of 12. As this pattern does not satisfy the K/H sum test, the associated memory would be coded so that the memory location having the address (100010) stores the representation of the second ranking level.

Figure 3:
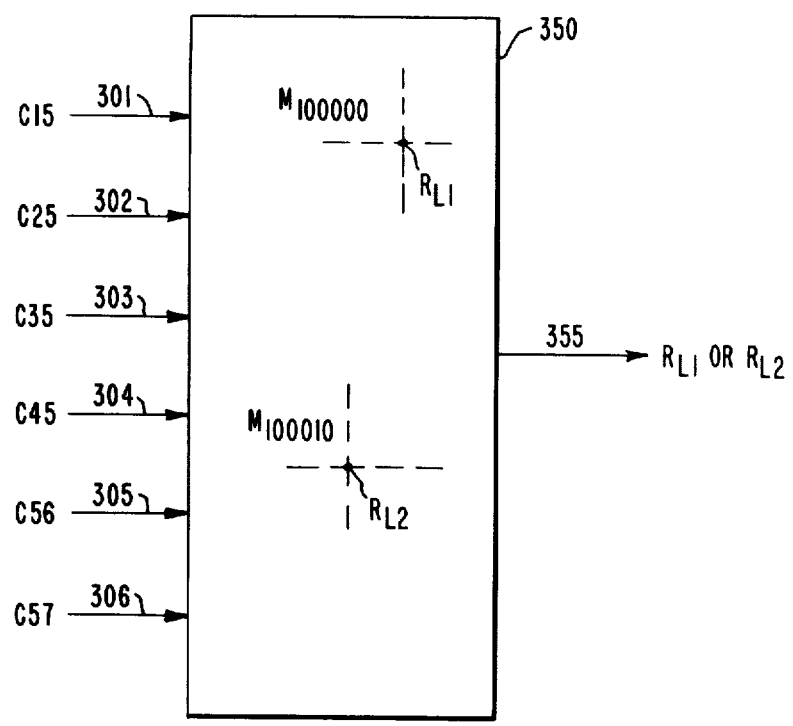
FIG. 3 shows a Read-Only Memory as an example mechanization of one of the Rank Detectors used in the FIG. 2 network for Mth-largest testing.

Actual hardware mechanizations of the preferred embodiment would in many instances include a Read-Only Memory (ROM) as each Rank Detector's addressable memory. A schematic representation of such a memory appears as the element 350 of FIG. 3. This ROM may be considered as an expanded form of the fifth Rank Detector 250. ROM 350 is thus shown to receive over input read lines 301 through 306 the respective ordered members of the fifth common-element subset as an access address. In correspondence to the preceding discussion concerning the example input addresses (100000) and (100010), element 350 is schematically shown to contain at memory locations $M_{(100000)}$ and $M_{(100010)}$ the representations $RL_1$ and $RL_2$ respectively. An accessed one of these locations would then cause to be transmitted over output channel 355 the stored one of the signals $RL_1$ or $RL_2$ as Detector 250's ranking-output signal.

c. Detector Output

After the (M-1) testing is performed, the overall detector array generates a detector-output signal indicative of which of the R applied data signals satisfies the (M-1) test condition. In the preferred embodiment where the testing is performed by the individual Rank Detectors, each detector generates its own ranking-output signal indicative in particular of whether the common element of the associated subset satisfies this (M-1) condition and is thus the Mth-largest. Where the above-described addressable memories are utilized as central components of these individual Rank Detectors, the accessed first and second ranking logic levels become the individual ranking-output signals, with the appearance of the first ranking level at a memory's output being the indication that the associated common element is the Mth-largest. Taken together, the individual ranking-output signals become the array's indicating detector-output signal.

The individual ranking indicators appear in the FIG. 2 mechanization on ranking-output channels 215-265 from Rank Detectors 210-260 respectively. The composite signal as carried by these ranking channels in ensemble thus becomes the indicating detector-output signal for the array as mechanized.

4. Output Controller

The inventive apparatus may also include an output-control unit which receives and further processes the detector-output signal. In the preferred embodiment where the detector signal is composed generally of the ensemble of the individual ranking-output signals, the control unit thus collectively receives and processes the outputs of the individual rank detectors.

A general requirement of the controller aspect of the invention is that the output unit be operatively associated with the input storage register. This operative association enables the controller to select from the input register and output from the overall apparatus any one of the applied data values which the output of the detector array indicates is the Mth-largest.

To derive this Mth-largest indication from the detector-array signal, the output control unit operates upon and interprets its received detector signal so as to determine which of the data values has satisfied the (M-1) test condition. In connection with this aspect of the controller's operation, it may be noted that in general there will be only one of the data values which is the actual Mth-largest, which will have comparison-output subset results that satisfy the (M-1) condition, and which will be indicated by the detector signal as the Mth-largest. It will later be demonstrated, however, that there are instances where more than one data value may satisfy the (M-1) test, and that any one of these values may be transmitted as the filter's output. This could occur, for example, where two or more members of the applied data set are equal and where alternative embodiments are utilized for the comparator and detector arrays. Because it may readily be configured to properly respond to any such multiple Mth-largest condition, the preferred embodiment's output controller accommodates these unusual situations and may in fact be utilized in conjunction with such alternative embodiments.

a. Output Decoder

In many instances it is convenient to perform the contoller's interpretation and selection functions separately. The preferred embodiment does separately realize this output unit by way of an output decoder and a distinct output-selection unit. It is the output decoder which thus receives the ranking-output signals and interprets them so as to determine which data signal has satisfied the (M-1) condition.

At this point it may be further noted that in the general case it is not necessary for the detector array to affirmatively test all R of the possible commonelement subsets, with a direct testing of only an (R-1) minimal subclass being sufficient. If none of the (R-1) tested subsets satisfy the (M-1) condition, then in general none of the (R-1) associated data values is the Mth-largest. When no one of (R-1) of the applied set's R members is the Mth-largest, then the only other possible target element is that value which was not directly tested. Therefore, the absence of an affirmative indication that any of the directly-tested values is the Mth-largest yields by default an indication that the untested remaining value is itself the Mth-largest. It is this selection-by-default concept which enables the inventive apparatus to perform its Mth-largest-determination function without having to affirmatively test all R possible subsets. A convenient consequence is that an equipment savings may be realized in many mechanizations of the preferred embodiment because only (R-1) instead of R Rank Detectors are required. Thus the composite detectoroutput signal condition in which none of the (R-1) individual ranking-output signals is "active" becomes the indication that the untested remaining value of the set is the desired Mth-largest.

After the detector signal has been interpreted, the decoder generates an output-selection command. The generated signal is unique in that at least R different ones of such signals may be produced. Each of these R signals is made to correspond to a different one of the input subregisters. The particular signal so generated is that which is characteristic of the subregister which holds the data value that the interpreted detector-output signal indicates is the Mth-largest.

In an actual mechanization, the input subregisters from which the members of each compared data pair are selected will be known and thus a direct and unique correspondence between a given subregister and the common element of a given subset may readily be established. When the signals of a given subset satisfy the (M-1) test, therefore, it will be straightforward to determine which subregister should be accessed to obtain for outputting purposes what is now known to be the desired Mth-largest value. The output decoder is configured in accordance with this unique subset-to-subregister correspondence so as to generate, as its output, the appropriate characteristic selection command.

The mechanized version of the output controller thus includes as a first subcomponent the output decoder which appears in FIG. 2 as element 270. This decoder receives over channels 215 through 265 each of the ranking signals. The generated output-selection command is then transmitted over selection channel 279.

In many instances it is convenient to realize this decoder unit by means of an addressable memory such as an ROM. When so realized, the individual logic levels carried by the ranking channel lines would become, as with the memories described in connection with the Rank Detectors, the ordered addresses of associated memory locations. The nature of the signal representations stored for output purposes at individual memory locations would generally be determined by the above-mentioned unique subset-to-subregister correspondence. In general, the output-selection signal characteristic of the ith subregister would be coded into that memory location whose address contains all second ranking logic levels except for a first ranking level in that ordered address position contributed by the ith detector. Thus, for example, assuming as in FIG. 2 that the ranking line order is (235, 225, 215, 245, 255, 265), the appearance at the decoder's input of the address (000010) would access a memory location having a stored output-selection signal representation uniquely characteristic of the fifth subregister.

For the situation where none of the (R-1) affirmatively-checked signals is the Mth-largest, the representation for the output signal characteristic of the subsregister holding the remaining untested value would be stored at that memory location accessed by the address having as all of its elements the second ranking logic level.

Noted above is the possibility that more than one of the checked data values will satisfy the (M-1) test condition and that thus more than one of the Rank Detectors will produce a first ranking logic level. In order to accommodate this situation where two or more of the resulting input address elements would be the first ranking logic level, the output-selection representation stored at any memory location accessed by such a "plural-first" address would be that characteristic of any one of the subregisters holding the associated Mth-largest value. Any such one could be chosen because any one would then be an Mth-largest. For example, again assuming the FIG. 2 ranking line order, the appearance at the decoder's input of the address (100011) would access a memory location whose stored output-selection signal representation could be made that which is characteristic of either the first, the fifth or the sixth subregisters.

For convenience, each of the stored representations could be the binary number which corresponds to the ordinal identifier of the proper input subregister.

b. Output Selector

The controller's separate output-selection unit receives the decoder's output-selection command and is that part of the controller which is operatively associated with the input register. The selection unit selects from the appropriate input subregister storage position and outputs from the overall apparatus that data value which, as indicated by the output-selection signal, satisfies the (M-1) condition.

As the second subcomponent of the mechanized version of the output controller, FIG. 2 contains the element 280 which is a schematic representation of a conventionally-realized electronic output-selection unit. This device receives over selection channel 279 the output-selection command from decoder 270. The operative association between the selection unit and the input register is by means of access channels 271 through 277, each respectively connected to a unique one of the first through seventh subregisters. The selected signal is then transmitted from the overall apparatus by way of output channel 285.

An actual hardware implementation of the selection unit could generally be achieved through the use of conventional components and straightforward design techniques. For example, unit 280 could be a multiplexer for which the above-described binary representation selection signal could be the output-select control input.

II. Network for Complete Mutual Comparisons with Serial Data

A. Overview

In the above-described filter, no particular presentation format for the subject set of R data signals was prescribed. Although it was stated that the input data could be serially-presented to an input storage device realized as a shift register, the only general format requirement for the applied data was that all elements of the R-unit set whose Mth-largest value was to be determined be present simultaneously in the input register at that one time when all of the comparisons were made. However, when the data is in fact serially-presented, alternative filter embodiments which still enable the Mth-largest value to be effectively determined but which do not require as many components then become possible. Set forth in this portion of the specification is such a reduced-hardware configuration.

As in the previously-described filter, the present filter performs a 'complete' comparison by causing each member of the applied data set to be compared with all other (R-1) members of the set. However, by taking advantage of the serially-presented nature of the input data, the filter described here significantly reduces the number of comparators required to generate the necessary complete comparisons. Instead of simultaneously producing all required comparisons by means of a parallel array of mutual comparators, the present system utilizes a sequential, partial-comparison concept, in which only one data value, namely the one most-recently received, is compared at any one time to all other (R-1) data values. The remaining elements of the complete comparison group required for the given applied R-unit set are obtained by retaining for subsequent subset-testing purposes the appropriate ones of the results of partial comparisons made prior to the presentation of the most-recent serial data element of the subject R-unit set.

Thus, included within the scope of the invention is the illustrative embodiment presented in Figures 4 and 5 in which a single string of comparators 412 through 417 is used to compare the last-received member of an R-unit, serially-presented data set with each of the other previously-received (R-1) members of that set. As each new data-stream element is received, a new partial group of comparisons is made. The comparison results are passed to the shift-register storage chains shown in FIG. 5, with the output sequence of each comparator being passed to a unique one of the chains. After all data values of a given seven-element set have been sequentially received into register 400, the FIG. 5 storage array will then contain the results of the pair-wise comparisons between all of the data values of that set.

The previously-described rank-detector array is designed to select the Mth-largest element of an R-unit data set by processing selected results of pair-wise comparisons between all elements of that set. Therefore, when the complete-comparison-result contents of the FIG. 5 array are passed to a rank-detector array such as the one shown in FIG. 2, the Mth-largest data value of the current subject set of R-serial data values held in the input register can be selected in accordance with procedures substantially identical to those utilized in the arrays of Figures 1 and 2 as given above.

B. Implementation Details

1. Serial Input Storage Register Input storage register 400 receives and stores a subject set of R-data signals. Because the individual signals of the set are presented to the apparatus serially, input register 400 is required to be a shift-register-type device which is capable of sequentially receiving and storing the serially-presented members of the R-signal set.

In order to accommodate the entire applied set, the shift register of the preferred embodiment contains R subregister storage positions, each of which sequentially receives and stores an individual one of the R serial data signals. In the mechanized version of this register shown in FIG. 4, the data set is assumed to contain seven elements, and thus the input register includes the seven subregister storage positions 401 through 407. The individual data signals are received sequentially at input 490 from external sources not shown and are carried over channel 495 into the first subregister 401. In accordance with the well-known operational nature of such shift registers, the value stored in subregister 401 is sequentially shifted, in response to conventional control signals from conventional control devices not shown, into subsequent subregisters 402 through 407 as later elements of the serially-presented input data stream are received.

The data signals stored in the individual subregisters of the FIG. 4 serial storage device may be accessed by means of subregister output lines 271b are through 277b. The nature of and purpose for these lines are the same as those of the access lines 271a through 277a which appear in FIG. 1 above.

To once again facilitate the subsequent description of other apsects of this particular inventive apparatus, it is convenient to apply ordinal designators to the serial subregister positions and to the associated serial data elements stored within them. These elements and positions are given the respective ordinal designations of first through Rth position and element. The first position holds the most-recently-received one of the R serial data signals, while the Rth position holds the earliest-received one of the signals. Each of the successively-identified positions after the first holds a successively-previously-received one of the data elements. Thus with respect to the FIG. 4 mechanization, subregister 401 becomes the first position, subregister 407 is the seventh, and intermediate registers 402 through 406, together with their currently-held data values, become the second through sixth respectively.

This designation scheme thereby defines a relative identification order among the stored serial data signals, with the first data signal being the lowest-order element, while the Rth data signal is the highest-order element. The ordinal identifiers thus correspond in reverse to the relative sequence of arrival at the apparatus.

2. Serial Comparator Array

A central feature of the inventive serial apparatus is the provision of a serial comparator unit which performs a "complete" comparison in that each of the subject R data values is compared with every one of the other (R-1) data values. The illustrated FIG. 4 array of comparators 412 through 417 represents a particular realization of a general serial configuration concept according to which the required complete comparison is performed in sequential stages with only some of the required comparisons being performed at any given stage.

In each of these stages, instead of all data-set members being compared, only a selected one of the values is compared with all other (R-1) set members. The stages are sequential as a consequence of having each data-stream value, and hence each member of a given R-unit set, serve in turn as the selected element. As will be described in greater detail below, these sequential, partial comparisons do in fact produce all elements of the required complete comparison set. The comparison becomes completed after that point in time when all R values in a given data set have been sequentially received and have undergone the specified partial comparison.

As a supplement to the discussion presented above concerning the ordinal identification of the various members of a given R-unit data set, the set members may be additionally designated as one most-recently-received element together with (R-uence of this particular selection, the operation of the composite serial comparison unit may be generalized as being the performance of the sequential partial comparisons on the basis of comparing the last-received set element with all (R-1) previously-received set elements.

More specifically, the sequential partial comparison is performed on a pair-wise basis with respect to a specially-selected partial grouping of unique pairs of the data values in a given applied set. This selected partial grouping contains selected ones of all possible unique ordered pairs which can be formed by pairing the one selected element of the set with all other (R-1) set elements. Each of the unique pairs selected for the partial grouping is one of the two possible ordered combinations of the one selected data element and a unique one of the other (R-1) set elements. As with the parallel network, one of the main reasons why the grouping is designated a "selected" one is that only one of the two possible ordered combinations is utilized in any given grouping. In accordance with ordinary mathematical-selection concepts, the total number Y of unique pairs which may be selected in this manner from a set of arbitrary size R is simply (R-1).

As a further supplement to the ordinal identifiers and time-of-arrival designators discussed above, the subsequent description will likewise be facilitated by a simple ordinal referencing with regard to the members of the selected unique pairs. The ordered members of each such selected unique pair are identified as a first member and a second member.

In FIG. 4, where R=7 and where the data-set element selected for the partial comparison is the most-recently received, the selected partial grouping is made to consist of only those Y=(R-1)=6 pairs in which the lowest-order, most-recently-received, first data value is the first member of the pair while a unique one of the remaining higher-order, previously-received data values is the associated second pair member.

The illustrated version of the preferred embodiment utilizes a corrresponding number Y=6 of discrete comparators as the realization of the required serial comparison unit. It is these discrete comparators which perform a given partial comparison by way of individual pair-wise comparisons between the members of each selected unique pair. A unique one of the selected pairs is presented to each of the Y comparators which then compares the first member of that pair to the second pair member.

The generalized serial comparison unit sequentially provides, as the output results of these partial comparisons, comparison-output signals indicative of the relative magnitude of the compared set elements. As the mechanized indicator of the result of each of the preferred embodiment's discrete, pair-wise comparisons, each of the Y comparators generates a distinct comparison-output signal.

In comparing the first pair member to the second, each comparator is in effect treating the first member as a "tested" value and the second as a "reference" value, with the resulting distinct comparison-output signal becoming more generally an indication of the relative magnitude of a particular tested value with respect to a particular reference value. As was discussed in relation to the mechanizations of FIGS. 1 and 2, this "tested" and "reference" status of each pair member is important because it affects the precise nature of the (M-1) ranking tests which are performed on the complete comparison set's common-element subsets.

In the version of the preferred embodiment which utilizes the Y, discrete, mutual-comparison devices, these devices may likewise be themselves ordinally identified as a second through Rth comparator. It then becomes possible to specify the unique data signal pair associated with each of the comparators as that pair having as a preselected one of its members the ordinally-identified first, most-recently-received data value, and as its preselected other member that one of the other previously-received (R-1) data signals whose ordinal designation is the same as that of the ordinal designation of the given mutual-comparison device. This particular identification scheme, in which there is no "first" comparator, has been chosen in order to more clearly establish the correspondence between a given comparator's ordinal designator and the unique data signal which is associated with that device. The FIG. 4 illustrative version of the preferred embodiment thus contains comparators 412 through 417 as the second through seventh comparison devices.

Each of the utilized discrete comparison devices has both a first, "A" input and a second, "B" input. For each of these comparators, it is convenient to apply the first member of the associated unique pair to the device's "A" input while applying to the "B" input the second member of the pair. Because in the preferred embodiment the pairs effectively chosen as the elements of the partial selected grouping are those in which the lower-order, first data element is the first member of the pair while a unique one of the remaining second through Rth elements is the respective second member of the pair, each of the comparison devices 412 through 417 receives as its "A" input over channel 411 from the first subregister 401 the most-recently-received, first data-set signal.

As noted above, it is convenient to arrange for the unique pair associated with each of the illustrated comparators to be that for which the second member of the pair has the same ordinal designation as the comparison device to which the given pair is applied. Thus as its "B" input, the second comparator device 412 receive-bregisters 403 through 407, the third through seventh data values as their B-input second elements of the associated unique pairs. Each of these comparators then compares the lower-order, first-input member of the associated unique pair to the higher-order, second-input member of that pair.

In accordance with a more specific aspect of the invention, each of the Y comparators is a bi-state device which generates, as the associated distinct comparison-output signal, one of two output logic levels. The first is generated when the associated higher-order second-pair member reference value is greater than the associated lower-order, first-pair member tested value, while the second logic level is generated when the reference value is less than the tested value. As implemented, the first level is a logic "one," while the second is a logic "zero."

If the compared values become equal, each comparator is set so as to generate a predetermined one of either of its two possible output states. While the equality level so chosen need not, in all operational situations, necessarily be the same among all of the comparators, for the sake of convenience the equality level chosen in the preferred embodiment is the same for all Y comparators. As with the parallel array, this particular uniform selection will later be demonstrated as one aspect of the means by which the preferred embodiment of the serial-comparison filter comes to inherently possess, in many situations, an ambiguity-resolution capability. In the illustrated, FIG. 4 realization, the logic level "one" will again be designated as the equality output state for purposes of apparatus description, although the choice of logic level "zero" would not significantly affect device operation and would still contribute to providing the overall filter with an inherent ambiguity-resolution capability.

In the bi-state version of the preferred serial embodiment, the resulting, sequentially-generated first and second logic levels produced by each of the bi-state comparators together become, as the output indicator of the relative magnitude of the given tested value with respect to the given reference value, an associated intermediate-comparison signal. Each such intermediate signal is ordinally identified as the Wth output, where W is the same as the ordinal designation for the generating bi-state comparator.

It may once again be noted that, for convenience in view of resulting required connection patterns in subsequent portions of the inventive serial apparatus, individual comparators, as well as the resulting associated comparison-output signals, have been numbered and labeled in FIGS. 4 and 5 so as to correspond not only to the two data values which are compared by the given comparator and whose comparison causes the associated output signal to be generated, but also to the "tested" and "reference" status of these two data values. Thus each comparator and its associated output may in general be respectively designated as comparator 1DF and output CDF, in respective correspondence to the tested and reference-value nature of the lower-order Dth and higher-order Fth associated data signals. As stated above, each output CDF also carries an intermediate W identification in correspondence to the ordinal identifier of the comparator producing that output.

As may be recalled from the previously-presented discussion concerning the (M-1) testing of common-element subsets, the determination of the Mth-largest value of a given R-unit data set requires more than just the comparison between the most-recently-received data value and all (R-1) previously-received remaining signals of the R-unit set. Needed in addition are the results of the comparisons between each of these (R-1) remaining values on hand and all of the other (R-2) set elements besides the most-recently-received. With respect to the illustrated embodiment in FIG. 4, it is thus not sufficient that the first data value from subregister 401 is compared with all of the previously-received second through seventh data values from the respective subregisters 402 through 407. The Mth-largest determination also requires, for example, the results of the comparisons between the fifth data value held in subregister 405 and all of the other data-set members. Although this fifth value is compared at comparator 415 with the first value held in the subregister 401, the previously-described detector array must also be supplied with the results of the comparisons between this fifth data value and the second, third, fourth, sixth, and seventh data values respectively held in subregisters 402, 403, 404, 406 and 407.

The illustrated structure produces these additional needed comparisons in the following manner. After a most-recently-received data value at subregister 401 is compared with all (R-1) previously-received members of a given R-unit data set, it is compared in turn with each one of the later-received members of subsequent R-unit sets when that value shifts to subsequent subregister positions. For example, a given data value, initially held in subregister 401 as the most-recently-received signal, is initially compared with the (R-1) previously-received values in subregisters 402 through 407. This initial data value is subsequently shifted into subregister 402 where it is compared by comparator 412 to the first subsequent data value in the data stream, with this first subsequent value being the new most-recently-received data element. When the given data value then shifts to subregister 403, it is compared by comparator 413 to the second subsequent data value, while the first subsequent data value follows by being shifted into subregister 402 and being itself compared by comparator 412 to the second subsequent value. This sequence of shift-plus-comparison-to-subsequent-values and shift-following continues until the given data value reaches subregister 407 where it becomes the Rth, earliest-received value of a subject R-unit data set and is then compared by comparator 417 to the final sixth subsequent data value which is now held in subregister 401 as the current most-recently-received data element.

With an individual data element being thus compared with all other both previously and subsequently-occurring set members, and with all elements of the data stream undergoing identical shifting and comparing, the FIG. 4 subnetwork does in fact generate all comparisons required for a complete comparison set. These comparisons will thus have been generated once all R elements of a given data set have been sequentially received and compared. However, because the elements of this complete set are produced neither simultaneously nor in a directly-utilizable order, the FIG. 4 array remains insufficient in itself to enable an Mth-largest determination to be made. The FIG. 5 storage array, described below, supplies the supplemental structure needed to collect the results required for the desired determination.

Before proceeding to an examination of the FIG. 5 array, it should be noted that the serial filter as thus far described is capable of processing either analog or digital data signals, with the principal resulting differences in hardware requirements between the two cases being the analog or digital components required for input register 400, for the comparators 412 through 417, and for the associated input and interconnection channels. In addition, just as with the other networks of this specification, although the example mechanization utilizes seven subregisters and six comparators, corresponding to a subject data set of size R=7, a data set of arbitrary size R could be processed by using an appropriate number of subregisters and corresponding comparators.

3. Serial Storage Array

The serial species of the inventive apparatus provides a serial storage unit to which are sent the comparison-output signals sequentially generated by the serial comparison unit. The storage unit receives and stores for later accession at least those ones of the comparison signals which are needed for the complete comparison set of a given group of data signals but which are generated prior to the processing time at which the last, most-recently-received first element of the subject data set is applied to the serial comparison unit.

In the preferred embodiment, the serial storage unit is realized in segmented form by means of a plurality of at least (R-2) shift-register result-storage devices. These are respectively identified as a second through at least (R-1)st result-storage device and appear in FIG. 5 as storage chains 502 through 506. Each of the chains sequentially receives and stores for later accession the comparison-output signals produced by the correspondingly-identified serial comparison device. Thus, for example, the second chain 502 sequentially receives the comparison-output signals produced by the second comparison device which in the illustrated version of the preferred embodiment is comparator 412. As this comparator produces output C12, it is thus more specifically the C12 signal sequence which is received by the second storage chain 502.

Each of the at least (R-2) result-storage devices is a shift-register-type element having a plurality of subregister storage positions. In general, the number of positions in each of the storage-register chains is at least equal to the quantity (R-Q), where Q is the integer corresponding to the ordinal designation for the given chain. The second result-storage chain is thus at least (R-2) positions long and stores the results of at least the previous (R-2) comparisons made by the second mutual-comparison device. Similarly, the (R-1)st result-storage device has at least one storage position which stores the results of at least that one comparison of the (R-1)st mutual-comparison device which was made in the set of comparisons immediately preceding those involving the current, most-recently-received data-set element.

With respect to the illustrated embodiment in FIG. 5, in which R equals 7, the second storage chain 502 thus contains at least the (7-2) or five subregister storage positions which are schematically depicted as elements 523, 534, 545, 556 and 567. Similarly, the (R-1)st or sixth storage chain 506 is required to contain at least the (7-6) or one subregister storage position schematically depicted as element 527.

As will become apparent from subsequent portions of the description, the (R-2) or (R-Q) array as thus far described stores a sufficient number of previously-generated comparison-output results so as to enable, when utilized in conjunction with the currently-produced partial comparison results obtained directly from the partial-comparison array itself, the Mth-largest determination to be made. Under the supervision of control signals produced in a conventional manner by conventional control devices not shown, such a direct utilization could be implemented where, for example, a delay is introduced between the time at which the currently-produced comparison results are utilized for the Mth-largest testing and the time at which the next serial data stream element is applied to the comparator array, an application which causes in most instances a change of comparison-output results.

In many situations, however, it is convenient to enlarge the storage array so that it in itself contains all the results of a complete comparison set needed for effecting the Mth-largest determination. This enlargement would entail including an additional storage chain as well as an additional storage position in each of the previously-described chains. The enlarged array would thus include (R-1) of the previously-described shift-register result-storage devices with each chain of the enlarged array being identified as a second through Rth result-storage device. The resulting number of subregister storage positions in each of the chains of the enlarged array would then become the quantity $(R-Q+1)$, where Q is again the interger corresponding to the ordinal designation for the given result-storage chain. As implemented in the FIG. 5 realization of this array, the additional elements of the enlarged array appear as column 501. The enlarged array thus includes, as the Rth storage chain, the chain 507 which has only the one subregister storage position 517, as required by the $(R-Q+1)$ or $(-7+1)$ relationship. Similarly, each of the second through sixth storage chains 502 through 506 respectively contain the additional preliminary subregister storage position schematically depicted as respective elements 512 through 516.

With the illustrated expanded array thus being adapted to contain all comparison results needed for the Mth-largest testing, none of the results need be obtained directly from the comparators themselves. It is in this context that the actual outputs take on an intermediate status, with the outputs not being utilized as final comparison-output results until they appear in the various subregisters of the storage chains. This intermediate status is thus the rational for the above-referred-to "intermediate" designation given to the comparison-output signals of a given comparator. Furthermore, the ordinal Wth identification given to each such intermediate signal becomes useful as an additional means of establishing a correspondence between the signals produced by a given comparator and the signals which are collected by a given storage chain.

The individual subregister storage positions in either the smaller or expanded versions of the array are given individual ordinal identifiers. In the case of the smaller version of the array, the positions are ordinally identified as the second through $(R-Q+1)$st positions, with the extra position in each chain of the expanded array being designated as the first position. For example, in the fourth storage chain 504 of FIG. 5, the subregister positions 514, 525, 536 and 547 are respectively identified as the first, second, third and fourth subregister positions of that chain. In general, the $(R-Q+1)$st position of any of the chains in either version of the array holds the earliest-received comparison-output signal, while the successive, lower-order positions respectively hold the successively-more-subsequently received comparison signals.

The comparison-output signal stored in a given subregister position is itself ordinally identified as the DFth comparison-output result, where D is the same as the ordinal identifier of the given position and F is the quantity ( (D-1) plus (the ordinal identifier of the given serial storage chain) ). It then follows from the nature of the storage and identification system that, with respect to any given R-unit set of data values as held in the serial input storage unit, and any so-identified, serially-generated and sequentially stored and shifted DFth signal is the comparison-output result which would have been obtained if the Dth and Fth ones of the R-unit set had actually been directly compared in a manner similar to that utilized in the parallel array of FIG. 1. (Of course, these values will in fact have to have been directly compared in order to obtain the given result. The actual direct comparison, however, will have been performed at that point in time when, in general, the given Dth signal was in the first subregister position and the associated Fth signal was in the $(F-D+1)$st subregister position.)

In the general case, where the first, most-recently-received data value may be either the first or second member of any one pair of the selected partial grouping of unique pairs, it is possible to specify the status of any stored DFth signal in one of the two following ways:

1. When the most-recent data value is the first member of the pair compared by the comparison means which generates the results in the storage chain in which a given DFth result appears, then in the effective pseudo-comparison producing that DFth result, the Dth signal would achieve the status of a tested value with respect to the stored result while the Fth signal would achieve the status of a reference value in relation to that stored result.

2. With respect to those chains containing results produced by a comparator in which the most-recent data value was the second member of the compared pair, the Dth signal would stand in the status of a reference value while the Fth signal would become the tested value with respect to the stored DFth result in the given storage chain.

Each such stored DFth result thus effectively becomes the comparison-output signal for the associated pseudo-compared tested and reference values. Furthermore, each of the selected common-element subsets collected by the detector array for (M-1) testing then becomes the (R-1) distinct pseudo comparison-output signals for which a given one of the R applied data values was in predeterminable intra-pair effect either the associated tested value or the associated reference value. It may parenthetically be recalled from the previously-presented discussion concerning the detector array that a given data value's status in relation to a given comparison result is important because it affects the precise nature of the Mth-largest, (M-1) testing performed by the Rank Detectors upon these comparison results.

In the illustrated version of the preferred embodiment as presented in FIG. 4, the most-recent data value is the first member of each selected unique pair. Therefore, with respect to any effective DFth comparison-output signal held in any subregister storage position in any one chain of either the general or expanded versions of the FIG. 5 array, the Dth signal thus takes on the status of the associated tested value while the Fth signal assumes the status of the associated reference value.

Within the FIG. 5 storage array, the subregister positions, as well as the associated comparison-output signals, have been identified and labeled so as to correspond to the positional identifiers of those two members of the current R-unit set whose direct comparison would have produced the result which is stored in that position and which is carried by the identified "C" output channel.

As an example of these relationships, consider the third storage chain 503 of FIG. 5. Subregister storage position 513 of that chain becomes the first position of the chain. The "D" for the result of that position is thus equal to one. Because the ordinal identifier of the given serial storage chain is three, F becomes the quantity ( (D−1)+3) or (0+3) and hence three. The effective comparison-output signal for that position thus becomes C13 which, as in the particular case of all of the first subregister storage positions, represents the output of the comparison which is actually performed by the serial storage array of FIG. 4 upon the data values which are in fact currently held in the first and third positions of the input register 400. Similarly, at element 536, which is the third position of the fourth chain, D becomes equal to three while F is the quantity (2+4) and hence 6. The associated comparison-output signal is thus C36 and would represent the outcome of a previously-performed comparison between the data values currently held in the third and sixth positions of the input register 400.

As a further clarification not only of the nature of the relationship between the serial comparator array of FIG. 4 and the ensemble of comparison results held in the storage array of FIG. 5, but also of the nature of the relationship between these arrays and the results in a complete comparison group, it is helpful to consider a particular arrangement of all of the results of the required comparisons in such a complete group.

For any given R-unit data cluster in a situation of serially-presented data, the complete comparison group required by a detector array for (M-1) testing may be viewed as containing R-1) specialized subgroups of comparison results. For the sake of consistency with previously-specified designations, these (R-1) subgroups will be respectively ordinally identified as the second through Rth subgroup. Each of these subgroups is categorized according to the relative positions in the R-cluster data stream of the respective members of the pairs of data values whose comparisons produce the results in that subgroup.

The second of these subgroups is specified as the one which contains the (R-1) results of the comparisons between adjacently-occurring cluster elements. The third subgroup is that which contains the (R-2) results of the comparisons between elements separated by one other cluster element. In the fourth subgroup are the (R-3), separated-by-two results and so forth until the Rth subgroup has the single result obtained by comparing the two separated-by-(R-2) elements of the subject cluster.

For example, with respect to the FIG. 4 illustrated version of the serial input register 400, where (R-1)=(7−1)=6, the second subgroup would contain the six results of the comparisons between the adjacently-occurring set elements held in positions 401 and 402, 402 and 403, 403 and 404, 404 and 405, 405 and 406, as well as between the elements of positions 406 and 407. The third subgroup would similarly contain the (7-2) or five results of the comparisons between the elements separated by olts of the comparisons between set elements separated by two other set elements and would thus contain the results of the comparisons between elements 401 and 404, elements 402 and 405, elements 403 and 406, as well as between elements 404 and 407. The fifth subgroup would contain the (7-4) or three comparison results obtained by comparing the serial set elements separated by three other intervening signals and would thus contain the results of the comparisons between elements 401 and 405, elements 402 and 406, as well as between elements 403 and 407. The sixth subgroup would contain the (7-5) or two results of the two comparisons between the two pairs of elements having four intervening set elements. This sixth subgroup would thus contain the results of the comparisons between elements 401 and 406, as well as between elements 402 and 407. As specified, the seventh subgroup would contain the single result obtained by comparing elements 401 and 407, which are the only two elements of the set which are separated by five other intervening elements.

It may readily be demonstrated that the ensemble of these subgroups contains the results of comparison operations upon all of the pairs of a specified selected, unique pair-wise grouping and hence represents a complete comparison set. For example, the Mth-largest testing of the data element stored in subregister 404 will require the results of all the pair-wise comparisons between that value and the other (R-1) set elements as stored in subregisters 401, 402, 403, 405, 406 and 407. As the elements in positions 401 and 407 are both separated from the 404 element by two other intervening set members, the described subgroup categorization means that the results of the 401-versus-404 and 404-versus-407 comparisons will be found in the fourth subgroup. Similarly, elements 402 and 406 are separated from element 404 by one intervening set member, and hence the required 402-versus-404 and 404-versus-406 results will be found in the third subgroup. Finally, because elements 403 and 405 are, with respect to element 404, adjacently-occurring, the 403-versus-404 and 404-versus-405 results will be found in the second subgroup.

The described subdivision of the complete comparison set is related to the string of comparators in that each comparator individually produces all of the comparisons required for a distinct one of the subgroups. For example, with regard to the value stored in subregister position 406, it is known that a complete comparison set must contain, as the results of two of the adjacent comparisons, both the result of the "forward" comparison between element 406 and the earlier-received element from subregister 407, and also the result of the 'backward' comparison between element 406 and the later-received value 405. The required "forward" comparison will have been produced when the 406 value was held in subregister 401 and the 407 value was held in subregister 402. When in these initial positions, the two adjacent values will have been compared by comparator 412. Similarly, when the position-406 value subsequently will have shifted to subregister 402, the 405 value will have shifted into position 401. In this situation, the required "backward" comparison will again have been performed by comparator 412. As comparator 412 can be shown to produce all such adjacent forward and backward comparisons, the element 412 thus generates, as the components of the second subgroup, all adjacently-occurring results of the complete comparison set. Likewise, because all separated-by-one elements of the data stream must pass through respective subregisters 401 and 403, comparator 413 produces the third subgroup by its action of sequentially comparing the values respectively held in these subregisters. In the same fashion, comparators 414 through 417 respectively generate the individual elements of the fourth through seventh subgroups.

However, although the comparators thus individually produce all comparisons required for a corresponding distinct one of the subgroups, and although the essentially simultaneous operation of the comparators causes the subgroups to be generated in parallel, the partial-comparison nature of the filter's single comparator string means that only one element of each subgroup is produced at any one time. The remaining elements are generated non-simultaneously in sequence as the members of the data stream shift through the linear input register. The storage chains of FIG. 5 may thus be viewed as a means for retaining those subgroup elements which are needed for the completion of a complete comparison set, and hence as a prerequisite to a given Mth-largest determination, but which are generated prior to the time when the most-recent data value is received and compared.

Because each of the chains receives the output of a unique comparator, and because in the expanded version of the array the number of subregister storage positions in each of the chains is made to be the same as the number of elements in the comparison subgroup generated by the associated comparator, each chain collects all of the elements required for that subgroup as the elements are produced.

In the implemented FIG. 5 embodiment, the second chain 502 receives the "adjacently-occurring" comparison results from comparator 412. This second chain has been specified to contain (R-1) or six positions so as to be able to store the (R-1) or six members of the "adjacently-occurring" second subgroup produced by this particular comparator. Chain 502 thus holds the results of comparisons of all adjacently-occurring data values presented to the input storage register 400. The third chain 503 likewise holds the results of the (R-2) or five "separated-by-one" comparisons produced by comparator 413. The remaining chains are similarly configured with the Rth or seventh chain 507 holding the results of the comparisons in the final, "separated-by-(R-2)," seventh subgroup produced by comparator 417.

With the comparators and corresponding storage chains respectively generating and collecting all elements for all subgroups as required for a complete comparison set, the FIG. 5 array thus assembles all comparison results needed for a given Mth-largest determination. It merely remains to select out the appropriate elements of the different storage subgroups and pass these results to a Rank-Detector network such as the one shown in FIG. 2.

As described previously, each Rank Detector requires as its inputs the results of all comparisons between a given data value and all the other (R-1) data values. In the FIG. 5 storage chain array, it may be observed that for any such given data value, all required "forward" comparisons will be stored in a column of subregister positions, while the results of all "backward" comparisons are presented in a "stair-step" sequence of subsequent chain elements to the left of that particular column which has provided the required "forward" comparison results.

In order to emphasize the correspondence between the sequentially-produced complete comparison results held in the members of the (R-1) chains on the one hand, and the simultaneously-produced complete comparison results generated by an array such as the one illustrated in FIG. 1 on the other, the FIG. 5 subregister outputs have been labeled the same as the comparator outputs in FIG. 1. Thus the label numbers at each output in the storage array are indicative of the data-set elements whose direct comparison would have produced the result stored in that particular subregister. For example, just as output C36 from comparator 136 of FIG. 1 will indicate the result of comparing the third and sixth elements of the seven-unit data set held in input register 100, so too will the output C36 from subregister 536 of the fourth storage chain 504 be indicative of the result which would have been obtained by directly comparing the third and sixth elements of the seven-unit data set held in register 400. As previously discussed, this particular result will in fact have been obtained from comparator 414 when the third element was held in the input register's first storage position and the sixth element was held in the input register's fourth storage position.

As a detailed summary of its constituent features, the serial storage array 500 may thus be seen to contain the six storage chains 502 through 507. Chain 502 receives the C12 comparison-output signal sequence from the comparator 412 of FIG. 4. This sequence is passed to and successively shifted through the chain's constituent shift-register storage positions 512, 523, 534, 545, 556 and 567. From these respective subregister positions may be accessed as effective comparison-output signals the results C12, C23, C34, C45, C56 and C67.

The 503 chain receives the C13 comparison-output sequence from comparator 413 of FIG. 4 and passes this sequence for successive shift-register transfer to and through the chain's constituent subregister positions 513, 524, 535, 546 and 557. From these respective subregisters may be accessed the effective comparison-output signals C13, C24, C35, C46 and C57.

Chain 504 similarly receives from comparator 414 of FIG. 4 the sequence of comparison-output signals C14 which is then shifted through the chain's constituent successive subregister positions 514, 525, 536 and 547. From these respective subregisters may be accessed the effective comparison-output signals C14, C25, C36 and C47.

Chain 505 receives the C15 comparison-output signal sequence from comparator 415 of FIG. 4 and passes this sequence for successive shift-register transfer to its successive subregister constituent elements 515, 526 and 537. From these constituent subregisters the effective comparison-output signals C15, C26 and C37 may respectively be obtained.

Chain 506 receives the C16 signal sequence from comparator 416 of FIG. 4 and passes this sequence to its two constituent subregister storage positions 516 and 527 for appropriate shift-register transfer. From these respective subregisters the effective comparison-output signals C16 and C27 may be accessed.

Finally, chain 507 receives the C17 signal sequence from comparator 417 and passes this sequence to its sole constituent subregister 517 from which may be accessed the effective, and in this case actual, comparison-output C17.

As soon as a complete set of R data values is present in the input register and thereafter for every sequentially-occurring cluster of R data values in this register, a complete set of comparisons will have been generated and stored. When the results of these complete comparisons are then sent to a rank-detection and Mth-largest-value-selection array such as the one shown in FIG. 2, the rank detection and Mth-largest-value selection may be performed in the same manner as for the previously-discussed filter of FIGS. 1 and 2. Upon utilizing the serially-stored results from FIGS. 4 and 5 in the detector array of FIG. 2, the generalized input register and associated subregister-access lines of FIG. 2 would then become in particular the input register 400 of FIG. 4 together with its associated subregister-access lines 271b through 277b.

4. Alternative Embodiment

The serial form of the invention prescribes that only a selected one of the subject R data values be compared at any given time to all other (R-1) members of the set. As discussed previously in connection with FIG. 4, the one element selected has been specified in the illustrated version of the preferred embodiment to be the last-received set member.

In an equivalent although slightly more cumbersome embodiment, the selected element may be the earliest-received, Rth element of the set which is then compared with all subsequently-received set elements. It will become apparent that, with this comparison arrangement, the required comparisons will in general not have been completed until the last-received element of the set reaches the (R-1)st storage position of the input register. The embodiment would be more cumbersome in that the input register would have to be provided with supplemental shift-register storage capability in order to retain for possible output-selection purposes the third through Rth elements of the set because these higher-order elements will have been shifted out of the (R-1)st and Rth positions by the time the last-received element arrives at the (R-1)st position. The supplemental positions will thus be needed so as to make available, at the post-Mth-testing selection time, all elements of the subject R-unit set.

III. Intermediate Configurations

It should be noted that the two basic filter configurations described thus far in this specification represent merely opposite ends of an ordinal-filter spectrum. The nature of the devices found at intermediate points of the spectrum would be a function of the presentation format of the data.

Thus at one end of the spectrum is a filter of the type described in connection with FIG. 1 which is adapted to processed data presented completely in parallel. At the other end of the spectrum is a filter of the type described in connection with FIG. 4 in which the data must be presented in a completely serial fashion. The intermediate filters, and in particular the intermediate comparator arrays, would be those which were specially configured to process the range of possible intermediate data format situations in which only some of the data values of a given set are presented in parallel while the remaining data values of that set are presented serially.

Such intermediate filters could be realized as appropriate intermediate combinations of simultaneous comparisons with respect to those data values presented in parallel, together with partial, sequential comparisons and temporary result storage with respect to those data values presented in series.

It should be further noted, however, that any such intermediate filter would remain merely a particular realization of the general invention of this specification because it would be simply a specially-tailored alternative apparatus for comparing each of the values in a given R-unit data set with each of the other (R-1) values of that set, as is taught and required by the invention.

IV. Equal-Data Processing

A. Generalized Problem Statement

In actual operational environments where the disclosed apparatus would be utilized to process "live" video data, there are instances where two or more of the applied signals in a given R-unit data set could be of equal magnitude. In such situations, the number of signal elements is not the same as the number of signal-set magnitudes. For example, in the data set (8,2,9,9,4), which contains two equal data values, there are five signal-set elements but only four distinct signal magnitudes. With respect to the ordinal-value filtering described in both this and the incorporated patent documents, this discrepancy presents a potential source of difficulty in two areas:

(1) descriptive terminology in view of intended filter operation, and (2) actual functioning of the apparatus in view of this intended operation.

B. Terminology

Throughout both this and the incorporated patent documents, expressions such as "Mth-largest," in the sense of the Mth-largest of the magnitudes present among the members of a given applied data set, have been utilized as designations for that set signal which is the focal point of filter operation and which is desired as the filter output. The use of such terminology has been convenient because, as will be further discussed below, the described apparatus are concerned to a significant extent with the processing of signal magnitudes, and because, as will also be further discussed, the instances where two or more members of a given set are of equal magnitude tend in general to be rare occurrences. However, the filter output operation more precisely intended is the determination or selection from the given applied R-unit data set of that set element which is of rank M in the sense of being that element which would occupy the Mth-position in an ordered-by-magnitude listing of all R of the set's signals.

In the normally-more-likely situation where none of the set elements are equal, there is no terminological inconsistency between "Mth-largest" and "Mth position" because the element in the ordered-by-magnitude Mth position does in fact have the Mth-largest magnitude. For example, given an applied set containing the values (8,2,9,7,4), the element the third position in the ordered-by-magnitude listing (9,8,7,4,2) is also the one which has the third-largest magnitude.

On the other hand, in those rare instances where two or more of the set's values are of equal magnitude, the presence of such equal values may be regarded as creating an ambiguity condition with respect to the use of the phrase "Mth-largest" in the sense that the potential then exists for a discrepancy between the element occupying the ordered Mth position and the element having the Mth-largest magnitude. For example, given an applied set containing the values (8,2,9,9,4) as in the previously-noted example, the value 8 is the third-position element in the set's ordered listing (9,9,8,4,2), while the value 4 is the third-largest set magnitude after the first-largest "9" and the second-largest "8."

In order to insure that the utilized terminology remains consistent with intended operation, the short-hand expressions such as "Mth" and "Mth-largest" are here specially defined to refer, in all cases, to that one of the applied data set's signals which would occupy the Mth position in an ordered-by-magnitude listing of the set's elements, and thus not necessarily to the Mth-largest of the data magnitudes which are present among the members of the given set.

It may be noted that as thus specially-defined, the use of the short-hand expressions is, in all cases, consistent with the theory of median operators. According to this theory, for a data set having an odd number R of elements, the desired median element is the "middle" value of the set, in the sense of occupying the middle, or more generally ((R+1)/2)nd, position in an ordered-by-magnitude listing of the set elements. It may also be observed that the median is thus generally that set value which has an equal number of other set elements both larger than and smaller than itself.

C. Apparatus Implications

1. Introduction

It will be demonstrated that, in addition to creating terminological difficulties, the equal-data ambiguity condition may at times create operational difficulties in which some embodiments of the inventive concept could select, as the filter's output, a dataset element other than the desired Mth-position/Mth-largest. The different embodiments will thus be analyzed to ascertain their ambiguity-resolution capabilities so as to determine which embodiments continue to operate as desired despite the presence of equal data values and which ones will require the inclusion of special processing features to prevent the occurrence of incorrect-output anomalies. Before proceeding with this examination, however, some general considerations concerning the relative importance of the ambiguity problem will be emphasized.

2. Relative Importance of the Ambiguity Problem

In an actual operational environment, where the disclosed apparatus would be utilized to process "live" data from an image of interest, equal-data ambiguities would in most instances be unlikely to present themselves at any significant rate of occurrence. In fact, such ambiguities are considered to be such rare occurrences as not to justify, in most instances, the extra expense of the specialized hardware precautions which may be required to completely resolve these ambiguities when they do in fact arise. Therefore, in many actual operational realizations of the disclosed concepts, any ambiguities which produce incorrect Mth-largest selections would simply be tolerated as a form of "noise" not significantly affecting the fundamental operation of the larger systems in which the disclosed ordinal filters are utilized.

To the thus insignificant extent to which such ambiguities do in fact occur, however, it will presently be demonstrated that several forms of the preferred embodiment will in many instances inherently resolve such ambiguities and select the proper Mth-positional element as is desired. In addition, for the sake of inventive completeness and for the sake of those instances in which an explicit ambiguity-resolution capability is desired, there will be presented below supplemental features and networks which enable the filters to function consistently even in those rare cases of equal-data ambiguities.

3. Particularized Problem Statement

As may be observed from previous portions of the present specification, the various forms of the preferred embodiment in effect perform the determination of which input signal occupies the Mth position by determining which signal's magnitude is the Mth-largest relative to the other signals of the set. More specifically, the preferred embodiment operates on the basis of a relative-magnitude count according to which that signal having (M-1) other signals magnitudinally larger than itself is taken to be the Mth-position/"Mth-largest" set member.

With a magnitudinal ranking thus being utilized as the indicator of positional ranking, it becomes apparent that an ambiguity condition, with its discrepancy between magnitudes and positions, creates the possibility that the preferred emmbodiment will focus on some undesired signal as its choice for the in-fact desire Mth-position element.

As a consequence of the above considerations, it may be observed in addition that, to the extent the invention either inherently possesses or may be supplemented with means by which operation based upon a relative-magnitude count continues to provide, despite the presence of an ambiguity, a correct indication of desired ranking position, any given ambiguity may be considered to be resolved.

4. Rearrangement Mechanics

As an aid in the subsequent description of the invention's ambiguity-resolution aspects, it will be helpful to preliminarily discuss the mechanics which would be involved in rearranging the elements of a given applied ambiguity set into an ordered-by-magnitude listing. Because it is apparent that the nonequal elements of an ambiguity set, as well as all of the elements of a nonambiguity set, will become properly arranged in relation to each of the other set members by simply ordering them according to actual relative magnitudes, this preliminary discussion will focus on the peculiarities involved in properly ordering the equal elements of a given ambiguity set.

With respect to any such equal values, the rearrangement may in effect be carried out in accordance with two guidelines:

(1) The first of the guidelines is that in relation to those set elements which are not of the same magnitude as the subject equal values, the "equals" as a group are placed into whatever "greater-than" or "less-than" positional relations are dictated by the relative magnitudes which are present.

Consider, for example, the ambiguity set $(0_{(a)}, 5_{(b)}, 9_{(c)}, 2_{(d)}, 8_{(e)}, 5_{(f)}, 5_{(g)})$, where the subscript designations correspond to the associated element's unordered input position. In accordance with the first ordering criterion, the set's equal elements $5_{(b)}$, $5_{(f)}$ and $5_{(g)}$ will as a group be assigned lower ordered pl which are less than these equals.

After the nonequals are properly ordered amongst themselves, the first stage of the reordering process will yield the following arrangement:

$(0_{(a)}, 2_{(d)}, —, —, —, 8_{(e)}, 9_{(c)})$,
(1st) (2nd) (3rd) (4th) (5th) (6th) (7th)

where the numeral subscripts indentify the associated element's ordered position, and where the 3rd, 4th and 5th positions are to be occupied by the equals.

(2) The second of the guidelines is that as among the equals themselves, it is clearly immaterial which particular one of the values is placed into any given one of the remaining available positions.

In view of this immateriality, it becomes permissible to utilize an arbitrary scheme for assigning the equals to the available locations. One such arbitrary assignment scheme would be to make the assigned ordered positional sequence correspond to the positional relations as they exist between the equals in the unordered input set.

$5_{(b)}$, having been presented, relative to the other equals, in the lowest-order input position, would be placed into that available ordered-set position of lowest order, which in the example is position 3. $5_{(g)}$, having been presented, relative to the other equals, in the highest-order input position, would be placed into that available ordered-set position of highest order, which in the example is position 5. $5_{(f)}$, being of intermediate input order relative to the other equals, would be placed into that available ordered-set position of intermediate order, which in the example is position 4.

As a consequence of the second step, the net result of the reordering process would be as follows:

$(0_{(a)}, 2_{(d)}, 5_{(b)}, 5_{(f)}, 5_{(g)}, 8_{(e)}, 9_{(c)})$.
(1st) (2nd) (3rd) (4th) (5th) (6th) (7th)

If the desired filter output were the "fourth-largest" input signal, then in accordance with the special definition, $5_{(f)}$, as the occupant of the fourth position in the ordered-by-magnitude listing, would be selected as the output.

From the standpoint of proper filter operation, it may be further observed that when a given one of the equal values becomes the specially-defined Mth value, there will be no effective difference in filter output if any one of the other data-set values which are equal to the specially-defined Mth is instead chosen as the actual output. With respect to the present example, therefore, the practical results would have been the same if either $5_{(b)}$ or $5_{(g)}$, neither of which is the "true" fourth-largest but both of which are magnitudinally the same as this fourth-largest, had instead been selected as the filter output.

As a final prelude to the subsequently-presented ambiguity-resolution discussion, it may be noted that it follows from the above two-stage reordering technique that a given manipulation of elements will be an accurate and acceptable rearrangement scheme as long as it preserves, as between any one of the equals on one hand and all of the non-equals on the other, the proper relative positional ordering, with the equals themselves being positionally ordered arbitrarily.

D. Basic Resolution Schemes

As noted above, ambiguity resolution may be achieved by setting up a means by which filter operation based on magnitudinal ranking continues to select the appropriate positionally-ranked value despite the presence of an equal-value-induced discrepancy between set magnitudes and set positions. In conjunction with the present invention, there will be described three approaches to the realization of this type of ambiguity resolution. Two of the approaches are in effect related to manipulations with respect to the magnitudes of any of those signals which are in fact equal, while the third approach relates to magnitude-to-position transformations involving the magnitudinally-derived ranks of the equal signals.

1. Inherent Ambiguity Resolution a. Mechanization Requirements

In many instances, the invention of the present specification inherently possesses an ambiguity-resolution capability. This is especially the case where at least the following three conditions are satisfied:

(1) The invention is configured in accordance with the requirements of the preferred embodiment (in either its parallel or serial forms);

(2) each of the data signals is presented in digital format; and (3) appropriate ones of the components utilized for the realization of the preferred configuration are adapted to accept and process signals in such digital format.

With regard to the preferred-embodiment condition, the particular preferred features relied upon for ambiguity inherency include:

(a) that the comparisons be performed on a pair-wise basis, with the comparison unit being realized by means of a plurality of individual bi-state comparators;

(b) that the ordered pairs selected for comparison are only those for which the lower-order data value of the pair appears as the first member of the pair; and (c) that for all of the utilized comparators, the same output logic level be selected for generation upon the occurrence of a condition of equality between the members of the associated compared pair.

b. Requirement Rationales

Presented here will be an explanation as to why an apparatus mechanized in accordance with the above-stated requirements and conditions inherently resolves any occurring ambiguity.

i. Bi-State Comparators

The use of bi-state comparators inherently provides ambiguity resolution on an intra-pair basis. That is, as between the two data signals which compose a given pair, the inherent operation of the bi-state devices causes the signals, when in fact equal, to be in effect magnitudinally differentiated, and performs this differentiation without disturbing true intra-pair inequalities of magnitude.

The comparators do this by generally providing a transformation capability in which a three-possible-state input condition is mapped into a two-possible-state output condition. The input states relate to the relative magnitude of the pair's signals, and consist of the two possible conditions of intra-pair inequality together with the situation of intra-pair equality. When the compared signals are equal, the comparators are configured so as to produce an output which is the same as that which would have been generated if the compared signals had instead been unequal. The transformation thus performed for output-indication purposes is the effective conversion of the equal state into a nonequal state.

Consider, for example, the situation where the previously-described predetermined level chosen for generation upon the occurrence of an intra-state equality is the first logic level. In the example preferred embodiment, however, the first logic level is generated when the second member of the pair is larger than the first. By thus generating the same first level when the two signals are equal, with this first-level output indicating for all practical purposes that the compared signals are not equal, the comparator in effect designates the second member of the given equal pair as being larger than the first. By means of this artificial designation, a magnitudinally-differentiating artificial priority of one signal over the other is thereby effectuated. In subsequent filter processing involving the generated comparison-output signal, therefore, the second member of the pair will be treated as if possessing a higher relative magnitude than the other pair member.

At this point it may for convenience be recalled that in the comparison of the first pair member to the second, the first has been designated the "tested" value while the second has been designated the "reference." Thus in relation to the artificial magnitude differentiation action, the intra-pair ambiguity resolution may in the context of this example also be described as the artificial designation of the associated reference value as being larger than the associated tested value.

Because from the standpoint of positional ordering it is immaterial which of the equal signals is deemed in this fashion to be larger, and because each bi-state device continues to generate the appropriate output logic level when the compared signals are not in fact equal, the generated magnitude-indicating output level may be used by the remainder of the filter for accurate magnitude-count-based intra-pair positional ranking. The inherent bi-state operation of any such comparator thus achieves artificial resolution of any ambiguity condition as between the two members of any equal-member pair upon which it operates.

The intra-pair action of individual bi-state comparators thereafter gives rise to ambiguity resolution as between all the members of a given R-unit set when there is global inter-comparator uniformity in the selection of equality-state output levels and when in addition the lower-order value is the first member of the pair compared.

ii. Output Uniformity

From the discussion above it is known that the first, tested member of a given equal pair is made smaller or larger than the second, reference member of that pair depending upon which of the output states is chosen to be generated by the associated comparator upon the occurrence of a condition of equality between the subject pair members. When the equality-to-output assignment is made the same at each of the utilized comparators, then all first, tested members of all of the equal pairs present in the subject selected grouping are artificially assigned the same relative-magnitude status with respect to the second member of the associated pairs. As a result, in each of the common-element subsets for which one of the equal values is the associated common element, the equal common element will take on one relative-status relationship with respect to those other equal data-set members with respect to which it is the tested value in the pairs of that subset, while taking on the opposite relative-status relationship with respect to those other data-set members for which it is the reference value in the pairs of that subset.

Thus, as a continuation of the above example in which the first output logic level was preselected for generation upon the occurrence of an equality condition, any equal common element will be deemed to be smaller than any other equal member of the applied data set with respect to which it is the tested pair member. This same element will similarly be deemed to be larger than any other equal member of the associated data set with respect to which it is the reference pair member.

It will be apparent to those skilled in the art that analogous and effectively-similar results would be achieved with respect to the opposite assignment in which an equal state was made to give rise to an indication that the associated tested value is larger than the associated reference value.

iii. Lower-Order Member as First

As was explained above in conjunction with the description of the Detector Array, the number K of tested values, together with the complementary number H of reference values, in each common-element subset is unique when the ordered pairs chosen for comparison purposes as the members of the selected grouping consist of only those pairs for which the lower-order pair member is the ordered first member of each such pair. This tested/reference uniqueness, when coupled with the condition that all of the individual bi-state comparators be set so as to generate the same one of the two possible output states upon the occurrence of the condition of equality, yields the result that the number of other equal data values with respect to which an equal common-element takes on the assigned smaller/larger relative status relationship is likewise unique. If the "number smaller"/"number larger" with respect to all of the other equal values is unique, then both the intra-set relative-magnitude count and the resulting intra-set magnitudinal rank with respect to all of those other equal values will similarly be unique. The consequential uniqueness in intra-equal magnitudinal rank means that all of the equals have been differentiated. It is apparent that at the same time there has been no distortion of true relative-magnitude differentials between the equals on one hand and any other in-fact-nonequal signals of the given set on the other. Because the ensemble treatment brought about by the bi-state comparators, plus the output-state uniformity, plus the lower-order-first pair selection, does not in its net effect violate the previously-described ordering criteria concerning nondistortion with respect to nonequals and permissable arbitrary differentiation with respect to equals, the ensemble treatment is acceptably accurate. Because in addition the ensemble treatment causes all values to be magnitudinally differentiated, the discrepancy between the number of magnitudes and the number of positions is eliminated, and both ambiguity resolution as well as proper overall filter operation is assured, subject only to subsidi were only those in which the lower-order member was the second member of the pair. Thus the more-generally stated prerequisite to inherent ambiguity resolution is that there be uniformity not only in the equality-to-output assignments but also in the intra-selected-pair, first-and-second member status of the lower-order data values.

iv. Digital Data and Components

It is apparent that a central factor in the achievement of inherent ambiguity resolution is the uniqueness in the number of tested and reference status relationships within each common-element subset. It may be noted in addition that an important reason for the uniformity in equality-to-output assignments is to bring about a coupling between the equality differentiation on one hand and this relational uniqueness on the other, so as to thereby achieve intra-equal uniqueness of rank.

There are instances, however, where the ordinary operation of typical analog bi-state comparators can cause the relational uniqueness to break down. Such devices commonly have a tolerance zone which creates a situation in which approximately-equal input signals may cause one comparator to produce one of the output logic levels while causing a different comparator to generate the other of the two possible logic levels. The use of digitial data with its quanitized signal levels insures that a condition of equality will be well-defined, while the use of digital bi-state comparators provides protection against the generation of inconsistent output results from comparators having equal inputs. With the digital data and processing thus insuring that any equal states are both well-defined and consistent from comparator to comparator and thus from subset to subset, the tested/reference relational uniqueness is preserved and ambiguity inherency is assured.

c. Parallel/Serial Equivalencies

The above-presented single description of inherent ambiguity resolution applies to both the serial as well as the parallel versions of the preferred embodiment. This can be seen from a comparison of the two types of networks. With regard to the serial version of the invention, it may be observed from the illustrated serial-storage array of FIG. 5 that in general not only are the collected comparison results the same as those produced by the parallel array, but also that the status relationships between the effectively-compared signals are similiarly the same. From this it is apparent that the same unique status pattern which exists in the common-element subsets as produced by the parallel version of the preferred embodiment also exists in the common-element subsets as produced by the serial version of the invention. The two versions, therefore, may be shown to be substantially identical in their ambiguity-resolution properties.

2. Value De-Equalization

One of the ways in which the above-described inventive apparatus may be provided with an explicit ambiguity-resolution capability relates to the modification of the previously-described comparison devices together with a possible modification of the previously-described input storage units. The modifications involve incorporating into these devices subsystems for de-equalizing the input data values. As will be further explained below, this de-equalization establishes an artificial priority among at least any mutually-equal ones of the applied data values. The resulting artificial priority is established by causing any such equal values to assume, for comparison purposes within the apparatus, mutually-unequal magnitudes. This assumption, however, is performed in a manner which does not produce errors in the overall system's Mth-largest determination processing. It will become apparent that this artificial priority is established without requiring, in the comparison and detection devices, intra-apparatus differences in the way the various signals are processed. The establishment of this kind of artificial priority thus contrasts with the "inherent" schemes where such differentials were central to the ambiguity-resolution capability.

Once the artificial priority is established by the described de-equalization, any ambiguity is resolved and the overall apparatus will then properly determine which of the applied data signals is the Mth-largest, with this proper determination being accomplished in spite of the presence of equal elements among the members of the applied data set.

In the situation where the applied data signals are presented in digital format having "B" bits of significance, the value de-equalization subsystems may include a supplemental-resolution mechanism which supplies a set of ambiguity-resolution bits to each of the R applied data signals. For ambiguity resolution to occur, each of the R sets of resolution bits is different from every one of the other (R-1) sets. Each such set would be X bits in length so that each of the resulting intra-apparatus supplemented digital data signals is (B+X) bits in length. In order to properly process such digital signals, the comparison devices would be adapted to compare digital data values of (B+X) bits in length.

For example, with respect to the mechanizations presented in FIGS. 1 and 4, where the presented data values might be of eight bits in length, each subregister storage position of the registers 100 and 400 could be adapted to store data values of 11 bits in length. The extra three bits would be the supplemental ambiguity-resolution set for the digital data value stored in that subregister. The supplemental bits would be the elements of least significance in the given data word. In accordance with the requirement that each of the sets be mutually-different, the three-bit set of a given subregister could be made to correspond to the ordinal identifier of that subregister. Thus, for example, the supplemental bits at the first subregister position 101 of FIG. 1 could be binary 001, while the supplemental resolution set for the fourth subregister 104 could be binary 100. The associated comparators would then be adapted to compare digital data values of 11 bits in length.

It is apparent that the digital values as thus supplemented have been de-equalized because each of the values now has in its positions of lesser significance a binary value which is different from that of every other digital data word. In view of the fact that the actual data value occupies the eight more-significant bit positions of the composite word, the supplemental resolution bits cannot distort true relative-magnitude differentials. With true differences thus preserved and with any values which are equal as presented being magnitudinally differentiated, the described de-equalization treatment complies with the previously-stated ordering standards. With all of the values thus magnitudinally differentiated, any possible discrepancy between the number of magnitudes and the number of positions is eliminated, and the remainder of the apparatus will be able to accurately determine for output purposes which of the input data values is the desired Mth-largest.

It may be noted alternatively that a structural simplification would involve merely the use of comparators adapted to compare supplemented digital data values. It is thus not strictly necessary in all instances that the input subregisters be provided with supplemental storage capability, just as it would not consequentially be necessary that the associated input register-to-comparator interconnection channels be provided with a supplemental bit-carrying capability. In this alternative configuration, the supplemental bit inputs at the comparators would then simply be set to reflect an appropriate unique ambiguity resolution set for the associated digital data word.

FIG. 9 shows a supplemented comparator of this type. In the figure, eight-bit data busses 920 and 930 carry two of the input data values to the more-significant bit positions a and a' through h and h' of comparator 912's respective "A" and "B" inputs. Respectively applied to the less-significant bit positions i, j, k and i', j', k', are the ambiguity-resolution sets 925 and 935. The respective sets are shown to be binary 001 and binary 010, which could respectively serve as the above-described subregister-correspondence sets for an example situation in which comparator 912 was substituted for the "ordinary" comparator 412 of FIG. 4 and in which the data contents of the first and second input subregisters were applied to the "A" and "B" inputs. In order to provide full ambiguity-resolution capability for the entire network not only of FIG. 4 but also that of FIG. 1 and below-described FIG. 6, analogous substitutions with appropriate resolution sets would be made for sustantially all of the remaining comparators.

In the situation where the members of the R-unit applied data set are analog signals, the value de-equalization subsystem may include a dither mechanism which adds non-signal-distorting random noise to each of the applied analog data signals. In order for this dithering to accomplish de-equalizing ambiguity resolution, the noise addition should be at some point in the apparatus which is before the signal flow point at which pair-wise comparison is performed. In order to then carry out the required comparison, the comparison devices themselves would be adapted to compare analog data signals.

The noise thus added to the signals would have an amplitude significantly less than the actual signal levels, while still being of sufficient amplitude to cause a differentiation between any of those input data signals which would otherwise register as being equal. With true inequalities thus being preserved, and with equal values thus being differentiated, valid ambiguity resolution will be achieved in the manner previously described.

FIG. 10 schematically shows a mechanism for accomplishing dither de-equalization. It should be parenthetically noted that although only one such mechanism will be described, and although the discussion will focus only on the data being applied to subregister 101 of FIG. 1, it is clear that in order to achieve ambiguity resolution, the illustrated unit would in general be incorporated into substantially all of the input data channels of whatever comparator array is to be provided with the resolution capability.

Element 1020 is a conventional, low-level noise generator whose output is carried over channel 1025 to analog adder 1001. This adder also receives, over channel 1091a from input 1081, one of the applied data values. This could The resulting signal which appears on channel 1091b for transmission to an appropriate input subregister will with high statistical probability be unequal to any other data signal of the subject applied and dithered set.

3. Rank Transformation a. Overview

A third technique for resolving ambiguities involves the utilization of tri-state comparison devices which generate as their third output state an explicit indication of the occurrence of magnitudinal equality between the compared input signals. Such tri-state comparators could be substituted for the bi-state devices utilized in the networks of FIGS. 1 and 4 and will also be shown to be utilized as the comparators in the "nonreduced" network presented in FIG. 6.

The tri-state output from such comparators is fed to specially-configured detection units, an example of which is shown in FIG. 8. The network of FIG. 8 determines the associated common-element's rank by counting both the number of comparison results which indicate that the common element is smaller than the signal with which it was compared, and the number of comparison results which indicate that the associated common element is larger than the signal with which it was compared, while at the same time also tabulating the number of those results which indicate that a condition of equality has occurred. In the event of a nonzero equality count, the network alternately trades this count off to both the "greater-than" and "smaller-than" counts, with the resulting traded-off accumulation being utilized as the final ranking of the given common element. The net effect of the trade-off is that for this associated common element, the network generates a ranking which is the same as the rank of the "Mth-most" positionally-ranked data value of the equal elements to which the given common element is equal. If the resulting transformed rank is equal to M, the FIG. 8 detector will produce an affirmative indication that the associated common element is an Mth-largest.

b. FIG. 6 Generalities

The comparator array of FIG. 6 is similar to the networks of FIGS. 1 and 4 in that it causes each member of an applied R-unit data set to be compared with every other member of that set. However, in addition to the use of tri-state comparators for each of the devices 612 through 667, the network is unique in that no advantage is taken of once-made comparisons, the network instead performing a separate comparison of both of the ordered combinations possible between each of at least (R-1) of the applied-set elements and all other (R-1) set elements.

In view of the readily-apparent similarities between the network of FIG. 6 and those of FIGS. 1 and 4, the applicable comments made concerning the relevant portions of those networks are here incorporated by reference. This is especially the case with respect to the input storage register 600 whose basic characteristics are essentially the same as those of input register 100. In particular, the input and output lines 691 through 697 and 271c through 277c serve the same respective purposes as lines 191 through 197 and 271a through 277a of FIG. 1. Subregisters 601 through 607 similarly correspond to subregisters 101 through 107.

The incorporations and correspondences permit the discussion presented in the following subsections to be more specifically focused on the unique aspects of both the comparator array of FIG. 6 and the analog tri-state comparator of FIG. 7, as well as on the unique aspects of the tri-state detector apparatus of FIG. 8.

c. Mechanization Details i. Non-reduced Comparator Array

In contrast with the array of FIG. 1 in which only one of the two possible ordered combinations of all of the presented data values was directly compared, the array of FIG. 6 includes a sufficient number of mutual comparison devices to separately compare both of the ordered combinations possible with each of at least (R-1) of the presented data elements on one hand and all other (R-1) data elements on the other. The array is designated a "nonreduced" one in that it represents the more general situation of which the array described in conjunction with FIG. 1 is a special case. The Mth-largest determination scheme of the present invention has been stated to require the comparison of each of the data values with every other data value in the presented set. The FIG. 6 array is the general case in which each of at least (R-1) of these data values is separately and explicitly compared to every other data value. The FIG. 1 array is specialized in that output conversion-type interpretations are utilized to eliminate the necessity for what are in effect redundant comparisons and thereby make possible a reduction in the number of comparators utilized to effectuate the complete comparison operation.

It may be additionally noted that although the FIG. 6 array will be described in conjunction with the use of tri-state comparison devices, it is apparent that bi-state devices the same as those utilized in the arrays of FIGS. 1 and 4 could easily be employed with analogous and readily adaptable results. In particular, the use of bi-state devices in the array of FIG. 6 would enable the output of this latter array to be fed directly to a detector array such as the one utilized in FIG. 2.

In comparing the arrays of FIGS. 1, 2, 4 and 6, it is apparent that a potentially-advantageous feature of the nonreduced, redundant-comparison nature of the FIG. 6 array is the consequential non-necessity for devising a special (M-1) test at each detector so as to be able to properly interpret the "reversed" comparison results which would otherwise be applied to the given detector. The Mth-largest test at each detector in the bi-state case could be made the same in view of the fact that it follows from the FIG. 6 array that in each of the common-element subsets, each data value will uniformly appear as a given one of the tested and reference values with respect to all other (R-1) data values.

It may be further noted that the bi-state version of the FIG. 6 array could also be configured to achieve inherent ambiguity resolution by making the equality-to-output assignment in the cluster of comparators for which a given data value is the tested value correspond to the resulting pattern of assignments which appear at the corresponding common element subset of the array of FIG. 2. For example, in FIG. 2 at detector 250, the equality assignment could be such that the common fifth element would be deemed, in an equality situation, to be larger than the first through fourth data values, while being deemed to be smaller than the sixth and seventh data values. In the corresponding situation of the FIG. 6 comparators 651 through 657, the equality-state setting could be such that the equality state would produce a second logic level at comparators 651 through 654 while producing a first logic level at comparators 656 and 657.

It may more generally be observed that ambiguity inherency is brought about when there is inter-cluster uniqueness in both the number K of bi-state comparators which are configured to generate one kind of logic level (this being the first logic level in the context of this example) upon the occurrence of the equality condition, as well as in the complementary number $H=((R-1)-K)$ of remaining bi-state comparators within each given cluster which are configured to generate, upon the occurrence of an equality condition, the other of the logic levels. (The designators K and H have been utilized in view of the assignment-pattern correspondences possible between the arrays of FIGS. 1 and 4 on one hand on the array of FIG. 6 on the other.)

For purposes of detailed description, the FIG. 6 network will thus be taken to include a plurality of tri-state mutual-comparison devices. In accordance with the requirements of the invention, these tri-state devices are arranged into at least (R-1) clusters of tri-state devices. Each of these clusters has (R-1) tri-state devices. The requirement that there be (R-1) clusters each having (R-1) devices yields a total minimum required device count of $(R-1)^2$ tri-state devices. In the depicted case where $R=7$, these considerations yield a cluster count of 6 and an intra-cluster device count also of 6. In FIG. 6, these 6 clusters are shown to include the comparators 612 through 617, 621 through 627, 631 through 637, 641 through 647, 651 through 657, and 661 through 667.

It will become advantageous to parenthetically note here some additional considerations regarding terminology. Throughout this specification, expressions such as "preselected" and "predetermined" are utilized with reference to various entities such as values, positions and statuses. As so utilized, these expressions are intended to indicate that, even though any one of the available entities is employable, only one actually is or would be used in the given described preferred embodiment or in other given operational mechanizations.

Each device of each of the described clusters is responsive to a unique predetermined ordered pair of two given elements from the applied R-unit set. The ordered members of each such unique pair are identified as a first member and a second member, where for each of the (R-1) devices of each such cluster a unique preselected one of the applied data values is a predetermined one of the described first and second members. That is, each such comparator may be configured to receive the preselected data value as either its first or second input. (For convenience, all of the comparators of a given cluster in the preferred embodiment are configured so that the intra-pair predetermined first-and-second member status of the common element of each of the clusters is the same for all of the tri-state comparators of that cluster.) At the same time, for each device of each of these clusters, a unique one of the (R-1) data values other than the preselected one is the predetermined complementary other one of the first and second pair members. The unique preselected one of the applied data values thereby becomes an associated common-data element for the given cluster, and no two of the required (R-1) clusters have the same common-data element.

As realized in the example mechanization presented in FIG. 6, each of the devices 612 through 617 of the first cluster is seen to receive over data channel 611 the data value held in subregister 601, with this data value thus becoming the preselected, common-data element of that cluster.

Similarly, each of the comted, common-data element the data value stored in subregister 603. Each of the devices 641 through 647 of the fourth cluster receives over data channel 644 as the associated preselected, common-data element the data value stored in subregiser 604. In an analogous fashion, the data value stored in subregister 605 is passed over data channel 655 to each of the devices 651 through 657 of the fifth cluster where that data signal becomes the preselected common-data element of that cluster. Finally, the data value stored in subregister 606 is passed over data channel 666 to each of the devices 661 through 667 of the sixth cluster where the subject data element then becomes the associated preselected common-data element of that cluster.

In the mechanized version of the array shown in FIG. 6, each of the common-data values is predetermined to be, in the associated cluster, the first member of the associated pair, which for mechanization purposes is utilized as the "A" input at each of the illustrated comparison devices. Analogous results would be produced by making each of the common-data values the second member of the associated pair, in which case the subject data value would be transmitted to the "B" input of each of the devices shown. Analogous results would likewise be obtained in intermediate-type situations in which the common-data value was utilized as the first, "A" input at some of the clusters while being utilized as the second, "B" input at the remaining clusters. The only recited preferred-embodiment requirement in this regard is that there be no "mixing" of input types for a subject common element within a given cluster.

Within each of the clusters of FIG. 6, the remaining input not utilized by the associated common-data element, where in the depicted embodiment the remaining input at each device is the second, "B" input, is utilized to receive a unique one of the (R-1) data values other than the given preselected common element. Thus, at the first cluster the comparators 612 through 617 respectively receive over channels 622 through 677 the second through seventh data values, respectively held in subregisters 602 through 607, as their second, "B" inputs. The devices 621 through 627 of the second cluster similarly receive as their second, "B" inputs over channels 611 and 633 through 677, the data values held in the first and third through seventh subregisters. The individual devices 631 through 637 of the third cluster receive, as their second inputs, over channels 611 and 622 as well as over channels 644 through 677, the first, second and fourth through seventh data values. The devices 641 through 647 of the fourth cluster receive, as their "B" inputs, over channels 611 through 633 and 655 through 677, the data values held in the first through third and fifth through seventh subregisters. In the fifth cluster, each of the devices 651 through 657 receives, over data channels 611 through 644 and 666 and 667, the data values held in subregisters 601 through 604 and 606 and 607, the received values becoming the "B" inputs. Finally, the individual elements 661 through 667 of the sixth cluster receive, as their second, "B" inputs, over respective channels 611 through 655 and 677, the first through fifth and seventh data values.

At each comparator, the first member of the associated pair is compared to the second member of the pair, with each of the devices thus treating the associated first member as a "tested" value and the associated second member as a "reference" value. As a result of these described configurations, each of the at least (R-1) of the data values in the R-unit set assumes the uniform status of a predetermined one of the described tested and reference values which is then pair-wise compared with each of the other (R-1) applied set members, and each of these other members appears in the complementary status of the predetermined other one of the tested and reference values. With respect to the illustrated mechanization, in which each of the common-data elements is the first-pair-member, "A" input at each of the comparators, the common element thus becomes the tested value at each of the comparators and is pair-wise compared to each of the other six members of the applied set which themselves appear in the status of a reference value for each of the subject comparisons.

It has been noted already that for purposes of the present ambiguity-resolution discussion, each of the comparison devices of the FIG. 6 array will be taken to be a tri-state comparison device. With respect to each performed pair-wise comparison, these tri-state comparison devices are mechanized so as to provide a first comparison logic level when the associated tested value is less than the associated reference value, while providing a second comparison logic level when the associated tested value is greater than the associated reference value. These comparison devices differ from the bi-state devices in that they produce a third comparison logic level when the two compared values are magnitudinally equal.

The generated first, second and third comparison logic levels together become a distinct comparison-output signal indicative of the relative magnitude of the associated tested value with respect to the given reference value. In the example array of FIG. 6, the comparison-output signals are seen to appear as the "C##" series of signals adjacent each of the comparators. As with the comparison-output signals of the arrays of FIGS. 1, 4 and 5, the numerical portion of each of the comparison-output signal labels has been formulated to correspond not only to the ordinal identifiers of the signals whose comparison produced that output signal, but also to the tested and reference status of those signals in the associated comparison. It may be noted in addition that the element numbers for all of the utilized comparators have also been chosen with the same considerations in mind.

Thus, comparator 612 produces the output signal C12 as the result of the comparison of the first and second data values. The first-position appearance of the numeral "1" indicates that the first data value is the tested value in the associated comparison, with the second-appearing second data value being the reference value in the associated comparison. Comparators 613 through 617 similarily produce comparison-output signals C13 through C17 which are likewise indicative of the first-and-third through first-and-seventh, tested and reference status of the signals which were utilized to produce those output signals.

Similarly comparison signals C21 through C27 from devices 621 through 627, signals C31 through C37 from devices 631 through 637, signals C41 through C47 from devices 641 through 647, signals 651 through 657 from devices 651 through 657 as well as signals C61 through C67 from devices 661 through 667 correspond to and identify both the associated compared signals and their comparison status.

As a result of these generalized considerations regarding the preferred embodiment, each of the selected common-element subsets which will then be fed to a rank-determination detector array becomes the ensemble of the (R-1) distinct comparison-output logic-level signals for which a given unique one of the R applied data values was the associated predetermined one of the described tested and reference values, while each of the other (R-1) data values in that subset was the associated predetermined other one of the described tested and reference values. All (R-1) of these signals will be produced by a given one of the previously-noted clusters, and the common-data element of that cluster will become the common-data element of the given subset. With respect to the example mechanization, in which the common-element of the cluster is not only of uniform status but is also the first pair member and hence the "A" input at each of the comparison devices in each cluster, the common-element at each subset will appear in the uniform status of a tested value, while each of the other six data values will appear in the status of reference values within each of those subsets.

It will be noted here that just as the array of FIG. 6 could be mechanized utilizing bi-state devices instead of tri-state devices, so too could the arrays of FIGS. 1 and 4 be mechanized utilizing tri-state devices instead of the bi-state devices which were described in conjunction with the previously-presented discussion of those arrays. Such tri-state devices would function the same in those arrays as the tri-state devices just described do in conjunction with FIG. 6. In addition, the tri-state rank-detector network to be described below may, with appropriate adjustments, be utilized to process not only the outputs of the FIG. 6 array but also the tri-state outputs which would be produced by the arrays of both FIG. 1 and FIGS. 4 and 5.

ii. Tri-State Comparators

The hardware realization of comparators which achieve the above-described tri-state operation is generally considered to be well within the ordinary skill of the art. The output produced by such devices as realized may typically be in one of three formats:

First, the output could be carried on three separate bi-state output lines, any one of which becomes activated only upon the occurrence of a predetermined one of the three possible output states. Thus, for example, a typical tri-state comparator could be configured as having "a," "b" and "c" output lines, only one of which would be activated at any given time. The "a" line could be mechanized to become activated when the first member of the compared pair was larger than the second. An activated "a" line, in conjunction with inactive "b" and "c" lines, would then serve as the second comparison logic level. The "b" line could be mechanized to become activated upon the occurrence of a condition of equality between the first and second members of the compared pair, while the "c" output line could be mechanized to become activated only when the second member of the compared pair is larger than the first. An activated "b" line, in conjunction with inactive "a" and "c" lines, would then serve as the third comparison logic level, while the activation of only the "c" line would serve as the first logic level.

Second, a tri-state device could alternatively be configured so as to generate on a single output line the appropriate one of three possible output logic or voltage levels. Thus, for example, the generation of a positive one-volt signal could be used to indicate, as the second comparison logic level, that the first member of the pair compared is larger than the second. A zero-voltage output, as the third logic level, could be utilized to indicate that the two pair members are equal, while a negative one-volt potential on the output line could be used to indicate, as the first logic level, the condition in which the second member of the pair is larger than the first.

As a third alternative, the output signal could be in the form of a two-bit binary signal composed of bi-level voltages appearing on two comparator-output lines. In an analogy to conventional two-bit binary numbers, the tri-state device could be configured to produce on the two output lines any one of four signal representations, with an appropriate correspondence being established between the three possible relative-magnitude input conditions and the generated output representations. Thus, for example, the device could be configured to generate high logic levels, such as logic "ones," on both lines as a first-comparison-logic-level indication that the first member of the pair is less than the second member of the pair. The occurrence of a high logic level on only one of the lines and a low logic level on the other line could be utilized to signal, in third-comparison-logic-level fashion, that the members of the compared pair are magnitudinally equal, and the generation of a low logic level, such as a logic "zero," on both of the output lines could be used as the second-comparison-logic-level-indication that the first member of the pair is larger than the second.

Whatever the particular nature of the output indictors thus generated, the "C##" output channels which would emanate from individual tri-state comparators in each of the arrays of FIGS. 1, 4 and 6 are here defined to be configured in a manner compatible with the type of output structure possessed by the given type of tri-state comparator utilized. Thus, for example, with respect to comparator 612 of FIG. 6, output channel C12 would as appropriate include either three separate signal-indication lines to carry the output generated by the first-described type of tri-state comparator, or a single line capable of carrying the three output voltage levels from the second type of tri-state device described, or would alternatively include two output lines capable of carrying the binary signal representation produced by the third-described type of tri-state comparator.

For purposes of description, tri-state comparators may be more generally classified, whatever the nature of their generated outputs, according to whether they are configured to process data in either digital or analog format. In the digital case, the realization of tri-state comparators is considered to be within the ordinary skill of the art to an extent which renders unnecessary an explicitly more-detailed discussion of the manner in which such devices would be mechanized. In fact, such comparators are commercially available, as for example the SN5485 logic circuit produced by Texas Instruments.

In the analog situation, however, despite the fact that the construction of such analog comparators is still considered to be within the ordinary skill of the art, the analog tri-state comparator of FIG. 7 will be explicitly described. In the FIG. 7 device, signals received at the "A" and "B" inputs are respectively carried over lines 775 and 795 to internal processing elements. These elements include summation devices 710 and 720, both of which receive as one of their inputs the "A" data value carried by lines 775. As their second inputs, the adders receive over lines 785 a "delta" voltage derived from conventional voltage source 780. In the example mechanization, the positive value of this voltage is applied to summation device 710 while the negative value is applied to adder 720. The results of the summations are respectively carried by output lines 715 and 725. These summation signals are then respectively applied to the "A" inputs of bi-state comparators 730 and 740. As "B"

inputs, both of these comparators receive the "B" input data signal on lines 795. The bi-state output results $T_{\phi 1}$ and $T_{\phi 2}$, which together compose the tri-state comparison-output signal, then appear on lines 735 and 745. Because of the bi-state nature of the output signals carried on the dual-component output channel, the FIG. 7 device is thus of the above-described third-alternative variety.

The following table shows the four possible output patterns together with the relative-magnitude significance of each:

| OUTPUT | SIGNIFICANCE |
|--------|--------------|
| 00     | A > B        |
| 01     | A = B        |
| 10     | A = B        |
| 11     | A < B        |

It may be observed that when the signals supplied at the "A" and "B" inputs differ by an amount which is less than the value of the delta voltage generated by source 780, the opposite-polarity offset at adders 710 and 720 will be sufficient to cause the comparison results from devices 730 and 740 to be opposite as well. Thus the appearance of a "01" or "10" outcome on lines 735 and 745 will signify that the applied signals are within the delta voltage of each other and will be deemed to be equal. If the applied signals are not within delta of each other, the opposite-polarity offsets will have no affect on the subsequent comparisons, and the resulting signals carried on the comparator output lines will be the same. The offset voltage is made large enough to counteract the inconsistent-output tendencies which the analog bi-state comparators 730 and 740 would otherwise tend to exhibit with respect to approximately-equal input signals falling within the tolerance zones of the respective devices.

iv. Tri-State Rank-Detector Array

In those situations where tri-state comparators are utilized, the individual detectors of an array such as the one shown in FIG. 2 will have to be configured so as to process common-element subsets composed of tri-state as opposed to bi-state comparison-output signals. Although the individual detectors themselves must generally be different from those utilized in the array of FIG. 2, the tri-state array retains basic similarities to the network of FIG. 2, thus making possible the continued utilization of post-detection units similar to not only the output decoder 270, but also the output selection unit 280, including its associated selection and output channels.

Thus, as with the bi-state detector array, the tri-state array will in the preferred embodiment contain at least (R-1) individual tri-state rank-detectors, each of which is responsive to a unique one of the common-element subsets. The nature of such subsets as generated by an apparatus of the type described in conjunction with FIG. 6 is in its fundamental aspects similar to the nature of those described in conjunction with the apparatus of FIGS. 1 and 4, and thus the appropriate elements of the previously-presented discussions are included in the information which has already been incorporated from those subsections. In particular, with reference to the operation of the individual tri-state rank-detectors, each of these detectors generally performs upon the associated subset the previously-described Mth-largest testing and generates a ranking-output signal indicative of whether the associated common value satisfies the likewise-previously-described (M-1) condition and is thus the Mth-largest.

By analogy to the detector array of FIG. 2, the tri-state array must thus contain at least six tri-state detectors so as to be able to process the outputs of an example array such as the one presented in FIG. 6 where the number of data values presented for analysis is seven.

With reference to the network of FIG. 8, an example internal configuration for an individual one of such tri-state detectors will now be described. It may be preliminarily noted that the individual comparison-output signals of the associated subset are received at inputs 801 through 806 from which they are passed into input-interface unit 800. Unit 800 is a schematic representation of a conventional network appropriately configured so as to receive the type of signal being generated by whichever variety of tri-state comparator is being utilized in the generating comparator array. Thus, for example, unit 800 may be a multiplexer adapted to decode the two-bit, binary signal indications of pair-member relative magnitude as generated by the example comparator of FIG. 7. Unit 800 would operate under the control of conventional switch-cycle controller 880 which transmits over channel 885 the appropriate conventional control signals for the input unit 800. A requirement for the remainder of the particular example network which is to be described, however, is that at any given time only one of the subset's comparison-output signals be transmitted from input unit 800 over output line 808 to the remainder of the detection apparatus.

Included among the principal elements of the remainder of the apparatus are first, second and third alterable counting devices, each of which is responsive to the individual logic-level results of the unique common-element subset associated with the given detector. The first of these devices registers how many of the subset results are the first logic level. A required operational characteristic of this counting device is that its accumulated registration be step-wise inreaseable upon the receipt of a signal which will be termed the first alteration command. In addition to its registration function, the first counting device produces as its output a signal designated as the smaller-count output signal which is indicative of the current status of the number registered within the counting device.

In a similar fashion the second counting device registers how many of the applied subset results are the previously-described second logic level. As with the first counting device, the resulting registration is likewise step-wise increaseable upon the receipt of a signal which will be designated the second alteration command. Once more as with the first counting device, the second device produces an output signal which in this case will be designated the larger-count output signal. This larger-count signal is indicative of the number registered by the second counting device.

The third of the counting devices also performs a registration, this time of the number of the applied subset results which are the previously-described third logic level. Although as with the first two counting devices the registered number of the third counting device is simialrly alterable, the particular operational requirement in this case is that this registered number be step-wise decreaseable upon the receipt of a below-described third alteration command. The third device produces an output signal which will be designated the equality-count output signal and which indicates the resulting registered number.

As mechanized in the example array of FIG. 8, the three counting devices include the counters 810, 820 and 830 which respectively receive over intermediate lines 811, 821 and 831 the affirmative indications of equality respectively produced by comparators 809, 819 and 829. Each of these comparators receives at its "A" input a sequential one of the subset's comparison-output signals as received at nodes 801 through 806 and transmitted over channel 808. For purposes of illustration, the signal which input unit 800 generates for transmission over line 808 will, independent of the precise nature of the type of tri-state comparator utilized, be considered to itself be of a tri-state form. The first state will be the voltage level zero and will be generated when the comparison-output signal in question is the previously-described first logic level which thus indicates that the first member of the associated compared pair is smaller than the second. The second of the line-808 levels will be a signal of voltage level one and will be generated when the subject comparison-output signal is the likewise previously-described second logic level, thus indicating that the first member of the associated pair is larger than the second. The third of the line-808 logic levels will be a voltage level of two volts and will be generated when the associated comparison-output signal achieves the previously-described third logic level, thus indicating that the members of the associated compared pair are equal.

The three comparators 809, 819 and 829 are shown to receive as their respective "B" inputs the voltage levels generated by conventional devices 807, 817 and 827 and carried to the respective comparators by lines 806, 816 and 826. The levels produced by these devices will be the same as the respective levels being tested for on channel 808. Thus device 807 will generate a voltage level zero, while devices 817 and 827 will respectively generate voltage levels of one and two volts.

As a result of these device settings and interconnections, comparator 809 will become activated when the signal carried on line 808 is the first of its voltage states, while devices 819 and 829 will become activated when the signal carried come incremented if that applied logic level is the first of the tri-state output levels, while counters 820 and 830 will become respectively incremented if the applied logic level is either the second or third. Once channel 808 has been cycled through all of the remaining input nodes, counter 810 will have tabulated the number of other data values in the given common-element subset which are larger than the associated common-element. Similarly, counter 820 will have accumulated the number of those other subset signals which are smaller than the associated common-element. Finally, counter 830 will have accumulated the number, if any, of those other subset signals which are equal to the given common element. Conventional indications, which may, for example, be three-bit binary numbers, of the resulting accumulated counts respectively appear on output channels 815, 825 and 835.

The overall tri-state detector also includes an Mth-condition subunit which determines whether the accumulated logic levels indicte that the associated common-element is in fact an Mth-largest. Following this determination, the unit produces an output signal which is itself indicative of the results of the described determination.

More specifically, the required Mth-condition subunit is configured to be responsive both to the smaller-count signal and to the larger-count signal. The subunit processes these two signals so as to determine whether the relative relation between the registered smaller count and the registered larger count indicates that the associated common-data element is an Mth-largest data signal. This determination is a unique and predeterminable function both of the desired rank M and, in the preferred embodiment, of that particular one of the pair members which is configured to be the member predetermined as the common element in the tri-state comparison-device cluster which produces the subset of results to which the subject rank-detector is responsive. The Mth-condition subunit then produces what will be designated as a first Mth logic level when this Mth-largest condition is satisfied, with a second Mth-logic level being generated otherwise.

Presented in conjunction with the description of the detector array of FIG. 2 was a detailed discussion of the precise nature of the Mth-largest test which is performed there upon the results of a given subset. As previously described, that test must in general be tailored to the subset because of the different relative-magnitude meanings carried by the various levels of a given comparison-output signal. Those meanings were shown to be a function of the relative status of the associated common-element within each of the compared pairs. In contrast with the FIG. 2 tailoring requirements, and despite the existence of alternative configurations which are possible with respect to an array of the type presented in FIG. 6 (many of these alternatives being a function of whether the common data value of a given cluster is configured to be the tested or reference pair member at each comparator of that cluster), it is straightforward to formulate the criteria for the specified Mth-largest test at a subject Mth-condition subunit. For the example situation actually shown in FIG. 6, the resulting Mth-condition test at each of the detectors is the same and would simply be a determination of whether (M-1) of the generated comparison-output signals are the first logic level, with the remainder being the second logic level. With reference to the FIG. 2 tailoring discussion, this Mth-condition sameness becomes a consequence of the following considerations:

(1) all of the common elements at each of the clusters have the same tested status within all of the associated compared pairs; as a result, (2) the relative-magnitude meaning of each of the first two logic levels of all the comparison-output signals is the same within each of the common-element subsets; and hence, (3) the Mth test at all detectors in effect reduces to the same relative counting of the number of first logic levels versus the number of the second of such levels.

In the even more direct situation where the number R of data values is odd and it is the median which is the desired Mth=((R+1)/2)nd largest, the test becomes the determination of whether the number of first-level output signals is equal to the number of second-level output signals.

In addition to generating the described Mth logic levels, the Mth-condition subunit also produces what will be designated as first and second deficiency logic levels. The alternative conditions under which these first and second deficiency levels are generated are a function of the counts which the above-described smaller and larger-count signals must assume when the given Mth-condition is satisfied. These Mth-condition counts will be labeled as "Mth-levels." With respect to the described example situation in FIG. 6, the Mth-level for the smaller-count signal will be (M-1), while the Mth-level for the larger-count signal will be (R-M).

In terms of these described Mth levels, the first deficiency level may thus be more precisely stated as being generated when a predetermined one of the registered smaller and larger-count signals falls short of its associated Mth level by an amount which is less than the corresponding amount by which the predetermined other one of the registered smaller and larger-count signals falls short of its own Mth level. The second deficiency logic level is produced otherwise.

These requirements may be clarified with reference to the example embodiment of FIG. 8 where for convenience it will be assumed first, that it is desired to determine which of the applied data values is the median and second, that the signal predetermined for the described "short-fall" test is the smaller-count signal. In this situation, a desired median value will have an equal number of other data values both larger than and smaller than itself. As previously described, the Mth-condition test reduces to a determination of whether the smaller-count signal is equal to the larger-count signal. In a similar fashion, the deficiency-production conditions become simply a test of whether the smaller-count signal is larger than the larger-count signal.

In FIG. 8, comparator 840 performs these determinations and signal generations. The comparator respectively receives as its "A" and "B" inputs, over channels 815 and 825, the smaller and larger-count indication signals as accumulated and generated by smaller and larger counters 810 and 820. When these input signals satisfy the median Mth condition by being equal, a logic "one" signal, as the first Mth logic level, is transmitted onto output channel 845. A logic "zero" signal, as the second Mth logic level, is transmitted otherwise.

Comparator 840 also produces the first and second deficiency logic levels, which respectively appear on output channel 848 as logic "one" and "zero" signals. In accordance with the above-described operational stipulations, the comparator is configured to produce the first deficiency logic one when the A-input accumulated smaller count is larger than the B-input accumulated larger count. The second deficiency logic zero is produced otherwise.

It is apparent that intra-subset tested/reference status uniformity of the given common element is an important prerequisite to the utilization of a detector whose rank-determination operation is based in significant part upon a simple count of logic levels. It is thus consequentially apparent that the absence of such uniformity in the subsets produced by the comparator arrays of FIGS. 1 and 4 will prevent the direct utilization with those arrays of the same simple-count-type of detector. Therefore, should it be desired, for ambiguity resolution or other purposes, to employ FIG. 8 type tri-state comparators in the networks of Figures 1 and 4, some form of signal conditioning will be required. However, such conditioning is relatively easy to implement and once implemented will enable the same type of rank detector, together with the same type of relative-count, Mth-condition test, to be utilized in conjunction with the tri-state versions of the arrays of FIGS. 1 and 4.

For use with those arrays, the tri-state detector is thus provided with a subset-conditioning mechanism which is responsive to the individual logic-level results of the unique common-element subset applied to the given detector. This conditioning mechanism converts predetermined ones of the subset results from first and second logic levels to second and first logic levels respectively. By means of this conversion, the subset-conditioner causes the tested/reference comparison status of the associated common element to become effectively the same for all of the results in that subset.

Within the example mechanization of FIG. 8, such compensating conversion could be achieved by including within input-interface unit 800 an inversion subunit. Of the several forms possible for such a subunit, one could be the schematically-depicted conversion apparatus 895. This apparatus, easily realized by means of conventional devices and ordinary design techniques, would convert appropriate ones of the applied comparison-output signals so that the effective status of all of the subset signals was the same.

Which of the signals would require such conversion would be readily predeterminable in advance of actual Mth-condition testing, just as the tailored Mth-largest test required for the subsets from FIGS. 1, 4 and 5 was also readily ascertainable. Consider, for example, the fifth common-element subset of those arrays, whose component signals were C15, C25, C35, C45, C56 and C57. With reference more particularly both to the previously-presented discussion of the common fifth data element's tested and reference status in that subset, as well as to the likewise-previously-presented Mth-largest system-operation example, it can be seen that conversion will be required either for the "reference" signals C15, C25, C35 and C45 or for the "tested" signals C56 and C57. In the illustrated situation where the signals on line 808 are zero and one volts when the reference signals are respectively greater than and less than the associated tested value, the conversion would be accomplished by changing any zero-volt signal into a one-volt signal while changing any applied one-volt signal into a zero-volt signal.

As an alternative, subset-conditioning could also be accomplished by the insertion of inversion devices at the input nodes of unit 800. An example of one such device is shown schematically as elements 897a and 897b. For the situation where the input relative-magnitude-indicating tri-state signals are of the above-described two-bit binary type, an actual mechanization of an individual element of one such inversion device could be as shown in FIG. 11. By means of inverters 1110 and 1120, the first and second tri-state output signals received from a comparator such as the one shown in FIG. 7 are converted to their complementary logic levels. The FIG. 11 apparatus would have the effect of converting a "00," "tested-larger" signal into a "11," "reference-larger" signal and vice-versa. An equality indication would remain essentially unaffected by the FIG. 11 unit's action of converting "01" into "10" and vice-versa.

In general, it may be seen that in the case where it is the "reference" signals which are converted, then the Mth-condition test could become a determination of whether (M-1) of the signals are the first logic level. If alternatively it were the "tested" signals within the subset which were converted, then the Mth-condition test could conversely become the determination of whether (M-1) of the subset signals were the second logic level. The Mth-condition relational test in this case may thus be seen to be a unique and predeterminable function of both the desired rank M and the conditioning conversion applied to the subset of results to which the given rank-detector is responsive.

In addition to the Mth-condition subunit, the general tri-state detector includes an equality-condition subunit which is responsive to the previously-described equality-count signal generated by the third counting unit. The equality subunit determines whether the equality count is zero and generates a first equality logic level when the equality count is in fact zero, while generating a second equality logic level when the equality count is not zero. This subunit in effect provides an indication of whether any of the data values in the applied R-unit set are equal to the associated subject common element of the given tri-state detector.

As mechanized in the example embodiment of FIG. 8, this subunit is realized by means of comparator 850. Comparator 850 receives over channel 835 as its "A" input the equality count accumulated by counter 830. As its "B" input, comparator 850 receives over channel 846 an appropriate "zero-count" indication from conventional signal generator 847. When the equality count on channel 835 is zero, comparator 850 is configured to generate a logic level "one," as the first equality logic level, in response to the condition of equality between its "A" and "B" inputs. A logic level "zero," as the second equality logic level, is generated otherwise. These equality logic levels appear on output channel 855.

Another of the subunits generally contained within the tri-state detector is an alteration subunit. This device receives and causes to be interpreted all of the various logic levels produced by both the Mth-condition and equality-condition subunits. The output signals then generated by the alteration subunit in effect cause any non-zero equality count to be alternately stepwise traded off to the smaller-counting first counter and the larger-counting second counter. For each non-zero equality count thus traded off, the equality counter itself is decreased in count. The net result of this trade-off operation will be seen to be a conversion of the actual magnitudinal rank of the associated common element into that rank possessed by that one of the other data values to which the given common element is equal and which itself possesses, among the mutually-equal values in question, the Mth-most positional rank in the sense of being that rank which is closest to the Mth, if not actually being the Mth. It will become apparent that such a transformation is consistent with the rearrangement mechanics discussed above, according to which the equal values are effectively interchangeable among the positional ranks available to them.

To accomplish these objectives, the alteration subunit processes its received signals and first generates as its output a predetermined one of the above-noted first and second alteration commands, thereby increasing by one the registered count of that one of the first and second alterable counters which produces the predetermined count signal which was tested as a prerequisite to the generation of the above-described first and second deficiency logic levels. However, this increasing is performed only upon the joint occurrence of three particular logic levels. These three levels are the second equality logic level, the second deficiency logic level and the second Mth-logic level.

In the FIG. 8 example situation where the first counting unit is the one with respect to which the described deficiency testing is referenced, the specified predetermined count signal will be the smaller count signal and the alteration command consequentially generated upon the joint logic-level occurrence will be the first alteration command. (It may be recalled that the first alteration command has been designated as that which causes an increase in the registered count of the first alterable counter and which in turn causes a step-wise increase in the smaller-count signal.) In the context of this example, then, the joint-occurrence condition becomes the situation where the equality count is nonzero, where the first counter is deficient from its associated Mth level by an amount which is greater than the amount by which the larger-count signal is deficient from its own Mth level, and where the mutual relation between the smaller and larger-count signals does not satisfy the Mth-largest ranking condition.

In an alternative situation defined by the joint occurrence of the previously-described second equality logic level, the first deficiency logic level, and the second Mth logic level, the alteration subunit generates the predetermined other one of the described first and second alteration commands and thereby increases by one the registered count of that one of the first and second alterable counters which produces the other count signal which was not the one with respect to which the deficiency testing was referenced.

In the FIG. 8 example situation where the first alteration command was predetermined for generation above, the second alteration command will be generated in this alternative situation. As a result, the registered count of the second alterable counting means will be increased by one when the second-stated joint-occurrence conditions are satisfied. In the context of the example, the meaning of these latter-presented joint-occurrence conditions is first, that there is a nonzero equality count; second, that the larger-count signal is deficient from its Mth level by an amount which is greater than the amount by which the smaller-count signal is deficient from its Mth level; and third, that the relative relation between the existing counts generated by the described first and second alterable counters still does not satisfy the Mth-largest condition.

The two above-described alternatives together consequentially encompass at least the following compound situation:

(a) the equality count is nonzero, thus indicating that the associated common-element is equal to at least one other data value of the applied R-unit set;

(b) the registered counts of the first and second counters together do not satisfy the Mth condition; and at least in addition (c) the registered count of one of the first and second counters is more deficient from its associated Mth level than is the other of the counters.

In this compound situation, the registered count of the more-deficient counter is step-wise increased.

Another compound situation presents the case where the equality count is again nonzero but where in contrast the registered smaller and larger counts do satisfy the Mth condition while at the same time being equally deficient from their respective Mth levels. In this situation, a preselectable, although arbitrary, one of the described first and second counters may be incremented. Thus more specifically, as a third alternative, the alteration subunit generates a preselected one of the described first and second alteration commands and thereby increases by one the registered count of a preselected one of the described first and second alterable counters, with this particular type of increasing being performed in the preferred embodiment upon the joint occurrence of the following three conditions:
(1) the described second equality logic level,
(2) the second deficiency logic level, and
(3) the described first Mth logic level.

In the preferred embodiment, it is the second alteration command which is thusly preselected.

It may be observed that in the situation where the count signals are equally deficient as described, the relative relation between them may satisfy the Mth-largest condition and cause the generation of the previously-described first Mth logic level even though an intra-subset condition of equality is present and even though the rank trade-off has not been completed. As will be further discussed below, such premature Mth-largest indications are inhibited from being transmitted from the detector apparatus, thus providing operational processing time during which required additional transformations may be performed.

The last of the signals generated by the alteration subunit is the previously-mentioned third alteration command which causes the registered count of the described third alterable counter to be decreased by one. This generation and resulting decrease is performed upon the occurrence of the described second equality logic level, this representing the situation where intra-subset equalities have been determined to exist. By means of this generation and decrease action, the registered equality count is step-wise decreased whenever the registered count of either one of the described first and second counting devices is step-wise increased in accordance with the above-described generation functions of the alteration subunit.

As a consequence of all of the functions and operational conditions specified to this point, the step-wise increasing of the first and second counters, as well as the step-wise decreasing of the third counter, continues until the registered equality count becomes zero, at which point the rank transformation of the equality state into the smaller and larger states will have been accomplished.

As mechanized in the example embodiment of FIG. 8, the alteration subunit includes the device ensemble 860 which operates in conjunction with switch-cycle controller 880. It will become apparent that this alteration subunit will not begin its alteration functions until at least two conditions are satisfied. The first is that there must be presented an intra-subset condition of equality, with this condition being communicated to the alteration subunit by means of the equality logic signal generated by comparator 850 and carried to the alteration subunit by channel 855. As a second prerequisite to alteration operation, the switch-cycle controller 880 must transmit over channel 887 an enablement command. This command will possess two characteristics. First, it will not be generated until all of the comparison-output signals applied to all of the input nodes 801 through 806 have been sampled and processed by the input-state and accumulation-counter subnetwork. Secondly, once such input processing has been completed, the generated alteration-enablement command on line 887 will generally be a pulse-like command which at any one time will induce, as the alteration response on the part of the alteration subunit, an alteration of only a single count.

Within ensemble 860, the described precondition signals carried on channels 855 and 887 are received by conventional pulse-trigger generator 866. When enabled by the existence of the second equality logic level on channel 855, the trigger will produce a pulse in response to each of the commands generated by the cycle controller 880. Each pulse then generated by the trigger is transmitted over line 868 to equality counter 830 where a step-wise count decrease is effectuated.

Channel 868 also carries the triggered-pulse output to a conventional switching subunit schematically represented as element 865 and having switch terminals "i" and "ii." When the switch is commanded to be connected to terminal "i," a pulse emanating from the trigger is carried over line 861 to the first counting unit 810 where a step-wise count increase takes place. Similarly, when the switching unit is alternatively connected to terminal number "ii," the pulse output of the trigger generator 866 is carried over channel 862 to the second counter 820 where a step-wise count increase is likewise effectuated.

It is the combination of logic levels generated, as generally described above, by Mth-condition comparator 840 which serves as the control input to alterable switch 867 and which thereby determines which of the terminals of the switching subunit will receive any generated pulses. The comparator-840 logic levels are received at conventional OR gate 863 which then transmits its well-known combinations of output levels by way of schematic channel 864 to the switching subunit 865.

At this point a few of the alternative implementations which are possible with respect to the example apparatus of FIG. 8 will be noted. In the course of this description, it may be recalled that when in the preceding paragraphs various signals and units were designated as "preselected" and "predetermined," what is intended is simply that, at any one time in an actual mechanization, only an appropriate single one of the various signals and units enumerated would be chosen for realization.

The first observation concerning alternatives will focus on Mth-condition commmparator 840. It is apparent that the Mth-condition operation will be a function of the nature of the rank of that value which is desired as the filter output. In the illustrated situation where it is desired to output the median value of the applied data set, the Mth-condition functions have been noted to be easily realizable by configuring the comparator 840 to be sensitive merely to the condition in which the counts on input channels 815 and 825 are equal. In addition, although the signal on output channel 848 is made to be a function of whether the value appearing at the "A" input of device 840 is larger than the value appearing at the "B" input, the device could alternatively be configured to respond to the converse relative relation. Similarly, it is not critical which of the output logic levels typically generated by conventional comparators of this type is chosen for generation in response to the various conditions tested for by the unit 840. As a consequence of these alternative possibilities, it is likewise not critical which of the counters 810 and 820 is chosen to be incremented when the smaller and larger counts are equally deficient from their above-described Mth levels. Other alternative settings and configurations will be readily apparent to those skilled in the art.

Utilizing the components, conditions, and settings as illustrated, OR gate 863 transmits onto schematic output line 864 a logic level zero only when the count carried on channel 825 and received at input "B" of comparator 840 is larger than the count received at input "A." In this situation, switching subunit 865 will be configured so that a logic level zero causes the switch to move to its first position, thereby causing an increment pulse to be transmitted, as the first alteration command, to counter 810, thus increasing the count received at the "A" input of comparator 840. In all other situations, that is, where either the "A" and "B" inputs of comparator 840 are equal or the "A" input is greater than the "B" input, a logic level one will appear on line 864 causing switch 865 to shift to its second terminal. This will bring about the generation of the second alteration command which will then cause counter 820 to be incremented. As a result, the signal received at the "B" input of comparator 840 will be stepwise increased.

As the final element of the tri-state detector being generally described, an output unit, conventionally mechanized in FIG. 8 as AND gate 870, will be utilized to generate for an output decoder such as element 270 of FIG. 2 the final indication of whether or not the associated common-element qualifies as an Mth-largest data signal. The output unit 870 receives over channel 845 the described first and second Mth logic levels produced by the Mth-condition subunit and also receives over channel 855 the described first and second equality logic levels produced by the equality-condition subunit. The output device more specifically produces, on output channel 875 as a ranking-output signal suitable for processing in the previously-described fashion by an output decoder such as element 270, a first ranking logic level upon the concurrence of the first Mth logic level and the first equality logic level, with a second ranking logic level being produced otherwise. Because the first Mth logic level is generated when the relative relation between the smaller-count and larger-count signals satisfies the specified Mth-largest condition and because in addition the first equality logic level is produced only when there are no intra-set equalities or when any such equalities have been transformed as described, the production by the output device of the described first ranking logic level thus indicates that the subject common-data value is an Mth-largest element of the applied R-unit data set.

As noted above, an overall ordinal value detector has been specified to contain at least (R-1) such tri-state rank-detectors, each of which will produce such a ranking-output signal. The ensemble of these signals will become the detector-output signal described in greater detail in conjuntion with the detector array of FIG. 2 and transmitted to an output decoder such as the unit 270 of that previous figure.

Among the fundamentally-equivalent alternative configurations made apparent by the disclosed tri-state detector network is the replacement of Mth-condition comparator 840, of equality-condition comparator 850 and of output gate 870 by a Read-Only Memory (ROM). With reference to the above-presented detailed discussion concerning the manner in which such memories would themselves be configured to operate as bi-state detectors, it would be straightforward to analogously configure them to receive the counts on channels 815, 825 and 835 as the ordered elements of a memory input address. Stored at each memory location could be a four-bit binary word. The particular word stored at given location would be that whose various bits reflect the relational characteristics inherent in the count components of the location's address. A first bit could thus be made indicative of whether the address count signals are such as to make the associated common element an Mth-largest, while the second, third and fourth bits could respectively indicate that the first and second counts are equally deficient from their associated Mth levels, that one is more deficient than the other, and that the equality count is or is not zero. Upon being outputted from the ROM, the first bit could be directly used as the detector output, while the other three bits could be received by an appropriately-configured alteration unit which in response would then generate the appropriate alteration commands.

In view of this alternate arrangement, devices 840, 850 and 870, just as the equivalent ROM, may thus more generally be considered as elements of a count-condition subunit 890. This subunit would respectively receive over channels 815, 825 and 835 the smaller-count signal, the larger-count signal, and the equality-count signal. This particular subunit would process these three inputs so as to effectively perform three determinations, each of which is a function of the presence or absence of two conditions:

The first dual-condition determination is that of whether an Mth-largest relative relation exists between the registered smaller and larger counts, and whether in addition the registered equality count is zero. As the detector's ranking-output signal, the subunit would produce an Mth-largest signal indicative of the outcome of this determination. When an affirmative-indication Mth-largest signal is generated by this subunit, the ranking signal would indicate in turn that the associated common-data element is an Mth-largest of the applied R-unit signal set and that there are neither "original" nor "nontransformed" equals present. As discussed previously, the test of whether the specified Mth-largest relative relation exists is a unique, predeterminable function not only of the desired rank M, but also either of the applied conditioning conversion in the case of a "reduced" comparator array or of the common-element pair status in the case of a "nonreduced" array.

The second of the dual-condition determinations performed by the count-condition subunit is first the ascertainment of whether one of the registered smaller and larger counts is deficient from its associated Mth level to an extent which is greater than the extent to which the other count is deficient and if so, which count is it that is thus more deficient, together with the determination of whether the registered equality count is nonzero. The subunit then produces a deficiency-alteration signal indicative of the outcome of this compound determination.

As the third of its dual-condition determinations, the subunit determines whether both the registered smaller and larger counts are equally deficient from their respective associated Mth levels, and also whether the registered equality count is again nonzero. The subunit produces an equality-alteration signal indicative of the outcome of this determination. It may be noted that the operational cases encompassed by this third determination are somewhat more general than those discussed above in connection with the description of the alteration unit. Contributing significantly to this greater generality is the independence of this determination from an explicit ascertainment of whether the Mth-condition is satisfied.

In the context of the overall count-condition subunit, the first and second Mth logic levels produced by the previously-described Mth-condition comparator 840 become components of both the deficiency-alteration and equality-alteration signals. Similarly, the previously-described first and second deficiency logic levels as mechanized become components of the deficiency-alteration signal. The first and second equality logic levels generated by equality comparator 850 may likewise be seen to be components both of the deficiency signal and of the equality-alteration signal.

As another consequence of the alternative arrangement, the alteration subunit 860 may itself be more generally considered as an example of a count-transfer subunit which receives the general deficiency-alteration and equality-alteration signals. When the received deficiency-alteration signal indicates that one of the counts is more deficient than the other and that the equality count is nonzero, the count-transfer subunit generates that one of the first and second alteration commands which will cause the more-deficient counting unit to be stepwise incremented. This general count-transfer subunit alternatively generates, when the equality-alteration signal indicates not only that the equality count is nonzero but also that the first and second counts are equally deficient, a preselected one of the first and second alteration commands. (As previously noted, the command thusly preselected in the illustrated embodiment is the second.) In either the deficiency or equality case, the count-transfer unit also generates the third alteration command which causes the registered equality count to be stepwise decreased whenever the registered count of either one of the first and second counting devices is increased.

It may be noted that with the ranks of all detected equal commmon elements thus being coverted to the rank possessed by the Mth-most of the associated equal values, it is apparent that several of the detectors may generate affirmative indications that the associated common element is the Mth-largest. As has been previously noted, however, subsequent portions of the filter apparatus in general and the output decoder in particular will be configured to be capable of processing such multiple-Mth indications by generating signal directives in accordance with which any one of the affirmatively-indicated common elements may be chosen as the outputted Mth-largest. As has also previously been noted, this effective action, in which a data value magnitudinally equal to the true Mth-position element is selected for filter output instead of the actual Mth-position occupier, is for all practical purposes acceptable, especially in view of the lack of operational differences between the equal signals concerned. Thus with reference to the ranking-output signals generated by the tri-state detectors, the simultaneous production by a plurality of these tri-state units of a plurality of the described first ranking logic levels acceptably indicates that any of the corresponding common-data elements satisfies the Mth-largest condition and that any one may thus be utilized as the Mth-largest output from the overall filter.

The net consequence of the operation of the described tri-state comparators, of the tri-state detectors, and of the subsequent portions of the filter is that any ambiguity condition will be resolved, and the overall apparatus will be enabled to properly determine which of the applied data signals is the Mth-largest, in spite of the presence of the equal elements among the members of the applied set.

As a clarification of the tri-state, rank-transformation operation of FIGS. 6, 7 and 8, consider the example situation presented in the following Table, in which the symbols utilized carry the same meanings as those of the previously-presented Table:

| TRI-STATE AMBIGUITY RESOLUTION | | | |
|---|---|---|---|
| R = 7 | | M = 4 | |
| $d_1 = 16$ | comp 651 | (33, 16) | $= C51 = 00$ |
| $d_2 = 108$ | comp 652 | (33, 108) | $= C52 = 11$ |
| $d_3 = 33$ | comp 653 | (33, 33) | $= C53 = 01$ |
| $d_4 = 75$ | comp 654 | (33, 75) | $= C54 = 11$ |
| $d_5 = 33$ | | | |
| $d_6 = 33$ | comp 656 | (33, 33) | $= C56 = 01$ |
| $d_7 = 33$ | comp 657 | (33, 33) | $= C57 = 01$ |

When the resulting comparison-output signals C51 through C57 are applied to detector input nodes 801 through 806, the initial accumulated counts in counters 810, 820 and 830 will respectively become 2, 1 and 3. At comparator 840, where because of the desired median output the target Mth-count levels will be the same and equal to 3, the accumulated larger-count "1" is deficient from the Mth-level to an extent which is greater than that of the smaller-count "2." As a result, larger counter 820 will be incremented, making the resulting counts 2, 2 and 2 respectively. Although the smaller and larger counts are now equal and hence satisfy the desired Mth-condition relative relation, the continuing nonzero nature of the equality count will inhibit output gate 870 from sending out an Mth-largest indication.

With the counts now being equally deficient, counter 820 will be incremented. The resulting 2, 3 and 1 counts will cause counter 810 to be incremented, with the final accumulated counts thereby respectively becoming 3, 3 and 0. As this satisfies the Mth-condition and the equality count has become zero, an Mth-largest indication will be generated.

The actual third-largest magnitudinal rank of the fifth data value has thus been transformed into the fourth-largest positional rank, which is the Mth-most (here identically fourth) positional rank of the third, fourth, fifth and sixth positional ranks available to the equal values. It may be observed that an identical transformation would result with respect to the other equal values $d_3$, $d_6$ and $d_7$.

V. Operational Advantages

When the number R of inputs is odd and M is made equal to the quantity (R+1)/2, the networks of FIGS. 1 through 8 become median filters which output that data value which has an equal number of other subject input data values both greater than and less than itself. A special advantage of such a median filter implemented as described in these example mechanizations is its ability to generate the median value at real-time data rates. This is an exceptionally-valuable feature in the above-referred-to operational environments such as image processing.

Another advantage is that each of the disclosed networks may easily be adapted, through an application of suitable control means and techniques, both well-known in the art, to operate interatively upon a succession of R-unit data sets so as to generate a corresponding series of Mth-largest output signals.

This adaptation would be especially straightforward where the data is serially presented. In such a situation, each of the successive R-unit data sets whose Mth-largest value is to be determined would be a corresponding one of the successive, R-unit clusters of data stream elements as held at a given point in time in either the serial version of the FIG. 1 or FIG. 6 input registers 100 and 600 respectively, or in the required serial register 400 of FIG. 4.

This successive-processing capability is likewise an exceptionally-valuable feature in an operational environment such as image processing where the presented succession of R-unit data sets may represent pixel information from selected portions of a real-time, "live" video image.

IV. Claims

The preceeding description has presented in detail merely exemplary preferred embodiments of the basic ordinal-value-filter invention. It will be apparent to those skilled in the art that numerous other alternative embodiments encompassing many variations may readily be employed without departing from the spirit and scope of the invention as set forth in the appended claims, in which:

What is claimed is:

1. An apparatus for determining which one of a set of R applied data signals is the Mth-largest, this apparatus comprising:
   (A) Input Storage Means, for receiving and accessibly storing the subject set of R data signals;
   (B) Comparison Means, responsive to these stored data signals,
      (1) for comparing each of the R data signals with every other data signal in the set, and
      (2) for providing, as the output results of these comparisons, comparison-output signals indicative of the relative magnitude of the compared signals;
   (C) Detector Means, responsive to these comparison-output signals,
      (1) for testing at least (R-1) selected common-element subsets,
         (a) where each of the subsets consists essentially of all comparison-output results obtained from the comparison between a given one of the data signals and each of the other (R-1) data signals, and where the common-data element of each of the at least (R-1) subsets is different from that of any of at least (R-2) other selected subsets,
         (b) this testing being so as to determine, for each of at least (R-1) of such subsets, whether the comparison-output signals indicate that the associated common data element is smaller than exactly (M-1) of the other (R-1) data signals, thus making such a signal the desired Mth-largest, and
      (2) for generating a detector-output signal indicative of which of the R applied data signals satisfies this (M-1) condition.

2. An apparatus according to claim 1 in which:
   (A) said R data signals can be associated in a selected grouping of unique pairs, this selected grouping containing selected ones of all possible unique ordered pairs which can be formed from an R-member set, with each of the unique pairs selected for the subject grouping being one of the two possible ordered combinations of two given elements from the applied R-unit set, with only one of these two ordered pairs being used in the subject grouping, and with the ordered members of each such selected unique pair being identified as a first member and a second member, with the total number J of such ordered unique pairs in the selected grouping being a precisely predeterminable function of the total group size R; and in which
   (B) said Comparison Means includes: a plurality J of mutual-comparison means,
      (1) with each of said J means being responsive to a unique one of said J unique pairs,
      (2) with each of said J means being:
         (a) for comparing the first member of the associated unique pair to the second member of the pair, each of these J comparison means thus treating the associated first member as a tested value and the associated second member as a reference value, and
         (b) for providing, for each such pair-wise comparison, a distinct comparison-output signal indicative of the relative magnitude of the tested value with respect to the reference value.

3. An apparatus according to claim 1 in which:
   (A) the individual signals of said R-member data set are presented to the apparatus serially;
   (B) said Input Storage Means includes:
      serial storage means, for sequentially receiving and storing the serially-presented members of said R-signal data set; and
   (C) said Comparison Means includes:
      (1) serial comparison means, for performing the comparison of each of the R data signals with every other data signal in the set by sequentially comparing a selected one of said set elements with all other set members, with this sequential comparison thereby sequentially producing comparison-output signals indicative of the relative magnitude of the compared signals, and with the comparison between each of the set elements and every other set member thereby being completed after all R elements of a given data set have been sequentially received and compared; and
      (2) serial storage means, responsive to said sequentially-generated comparison-output signals, for receiving and accessibly storing at least those of these comparison-output signals that result from all sequentially-produced but previously-made comparisons between the elements of a given set.

4. An apparatus according to claim 3 in which:
   (A) said R serial data signals can be associated in a selected grouping of unique pairs, this selected grouping containing selected ones of all possible unique ordered pairs which can be formed by pairing said selected one of said elements with all other (R-1) set elements, with each of the unique pairs selected for the subject grouping being one of the two possible ordered combinations of the one selected data element with each of the other (R-1) set elements, with only one of these two ordered pairs being used in the selected grouping, and with the ordered members of each such selected unique pair being identified as a first member and a second member, with the total number Y of such ordered unique pairs in the selected grouping being (R-1); and in which
   (B) said serial comparison means includes: a plurality of Y mutual-comparison means,
      (1) with each of said Y means being responsive to a unique one of said Y unique pairs,
      (2) with each of said Y means being:

(a) for comparing the first member of the associated unique pair to the second member of the pair, each of these Y comparison means thus treating the associated first member as a tested value and the associated second member as a reference value, and (b) for providing, for each such pair-wise comparison, a distinct comparison-output signal indicative of the relative magnitude of the tested value with respect to the reference value.

5. An apparatus according to claim 4 in which:

(A) the members of said serially-presented, R-signal data set are identified as one most-recently-received set element and (R-1) previously-received set elements, and said selected one of said set elements is the most-recently-received;

whereby said serial comparison means performs said comparisons by comparing the last-received set element with all (R-1) previously-received set elements; and whereby the previously-made comparisons stored in said serial-storage means are sequentially produced when, prior to the time when the subject R-unit set is present in said serial storage means, the (R-1) previously-received set elements were themselves in sequential turn both the most-recently-received and compared with previously-received set elements; and in which (B) the individual members of said R-signal set are given the ordinal designations of first through Rth data signal, with the ordinal identifiers corresponding in reverse to the relative sequence of arrival at the apparatus, where the earliest-received data signal is designated the Rth data signal and the most recently-received data signal is designated the first data signal; and in which (C) the Y mutual-comparison means are identified as a second through Rth comparison means, with the unique data signal pair associated with each of said means having as a preselected one of its members said first, most-recently-received data value and as its preselected other member that one of said other previously-received (R-1) data signals whose ordinal designation is the same as the ordinal designation of the given mutual-comparison means, and with the associated comparison-output signal being identified both by an ordinal designation which corresponds to the ordinal designation for the mutual-comparison means which generates that output signal, as well as by the tested and reference-value-nature of the data elements whose comparison produces that output signal; and in which (D) said serial storage means includes:

(1) at least (R-2) shift-register result-storage means,
 (a) identified as a second through at least (R-1)st result storage means,
 (b) each of said means being: for sequentially receiving and accessibly storing the correspondingly-identified comparison-output signals;

(2) each of said at least (R-2) result-storage means having a plurality of subregister storage positions,
 (a) with the number of positions in each means being at least equal to (R-Q), where Q is the integer corresponding to the ordinal designation for the given result-storage means, whereby said second result-storage means is at least (R-2) positions long and thus stores the results of at least the previous (R-2) comparisons made by said second mutual-comparison means, and whereby said (R-1)st result-storage means has at least one storage position which stores the results of at least the one, most-recently-made previous comparison of said (R-1)st mutual-comparison means, (b) with these at least (R-Q) positions being individually ordinally identified as second through (R-Q+1)st positions, with the (R-Q+1)st position holding the earliest-received comparison-output signal, while the successive, lower-order positions respectively hold the successively-more-previously-received data values, and with the comparison-output signal stored in a given position being ordinally identified as the DFth comparison-output result, where D is the same as the ordinal identifier of the given subregister storage position and F is the quantity ((D-1) plus (the ordinal identifier of the given serial storage means));

whereby for any given R-unit set of data values held in said serial input storage means, any so-identified, serially-compared and stored DFth signals are the results which would have been obtained if the Dth and Fth ones of said R-unit set had actually been directly compared:

(i) with the Dth signal as the tested value and the Fth signal as the reference value in those ones of said DFth signals for which the selected, most-recently-received data value was the preselected first member of the pair associated with the comparison means which generated that signal, and (ii) with the Dth signal as the reference value and the Fth signal as the tested value in those ones of said DFth signals for which the selected, most-recently-received data value was the preselected second member of the pair associated with the comparison means which generated that signal, and (iii) with each such stored signal thus effectively becoming a comparison-output signal for the associated tested and reference values, and (iv) whereby, each of said selected common-element subsets becomes the (R-1) distinct comparison-output signals for which a given one of the R applied data values was effectively the associated intra-pair predeterminable ones of said tested and reference values, while each of the other (R-1) data values were effectively the associated intra-pair predeterminable other ones of said tested and reference values.

6. An apparatus according to claim 5 in which:

(A) said serial-storage means includes (R-1) of said shift-register result-storage means, these (R-1) means being identified as a second through Rth result-storage means; and (B) each of said (R-1) result-storage means includes (R-Q+1) of said subregister storage positions, with these (R-Q+1) positions being identified as a first through (R-Q+1)st subregister storage position.

7. An apparatus according to either of claims 2 or 4 in which:
each of said mutual-comparison means includes:
Bi-state comparison means,
(1) for generating a first logic level when the associated second-pair-member reference value is greater than the associated first-pair-member tested value,
(2) for generating a second logic level when said second reference value is less than said first tested value, and
(3) for generating a predetermined one of said first and second logic levels when said second reference value is equal to said first tested value, with said bi-state-generated first and second logic levels together becoming the associated comparison-output signal from the given mutual-comparison means.

8. An apparatus according to claim 7 in which said Detector Means includes:
a plurality of (R-1) rank-detector means;
(1) each of said rank means being responsive to a unique one of said common-element subsets of said comparison-output signals, where the results of which each of these subsets essentially consists are all of the (R-1) comparison-output signals for which the associated common-data element is either the tested value or the reference value, where a predetermined K ones of the (R-1) comparison signals in a given such subset are those for which the common element is the tested value and a predetermined H ones of the (R-1) signals are those for which the common element is the reference value;
(2) each of said rank means being:
(a) for determining whether, in the associated subset, the sum of (the total number of those ones of said K tested signals which are said first logic level) plus (the total number of those ones of said H reference signals which are said second logic level) is exactly (M-1), and
(b) for generating a ranking-output signal indicative of whether the associated common element satisfies this (M-1) condition and is thus the Mth-largest.

9. An apparatus according to claim 8 in which:
(A) each of said rank-detector means includes an addressable memory having a plurality of memory locations, with each of these locations being specified and made accessible by an applied unique memory address;
(B) with the first and second logic levels of an ordered combination of the comparison results in the associated common-element subset together forming an input memory address for said memory;
(C) with said memory being coded so that the representation for a first ranking logic level is stored at preselected ones of its memory locations, while the representation for a second ranking logic level is stored at preselected other ones of its memory locations;
(D) with the memory locations containing said first logic level being all those whose comparison-logic-level memory addresses satisfy said K/H sum condition, and with the locations containing said second logic level being those whose comparison-level addresses do not satisfy said sum condition; and (E) with any of said first ranking logic level representations, upon being addressed and outputted, providing the ranking-output-signal indication that the associated common data value is the Mth-largest.

10. An apparatus according to claim 9 in which said addressable memory is a read-only memory.

11. An apparatus according to claim 1 further comprising:
Output-Control Means,
responsive to said detector-output signal, and operatively associated with said input storage means,
(1) for interpreting said detector-output signal so as to determine which of the data signals has satisfied the (M-1), Mth-largest condition, and
(2) for selecting from said input storage means and outputting from the overall apparatus any one of the data values which, as indicated by said detector-output signal, satisfies the Mth condition.

12. An apparatus according to claim 7 in which:
(A) the presence of equal data elements among the members of said applied set thereby establishes an ambiguity condition;
(B) the members of said R-unit applied data set are identified as a first, lowest-order element through Rth, highest-order element;
(C) said selected grouping consists essentially of only those of said pairs for which the pair-to-pair first-and-second-member status of the lower-order data value is uniform;
(D) the members of said R-unit applied data set are digital data signals;
(E) said input storage means is adapted to store data signals presented in digital format;
(F) each of said bi-state comparison means is adapted to compare digital data signals; and
(G) the predetermined logic level generated by each of said bi-state comparison means upon the occurrence of a condition of equality between the associated second reference value and the associated first tested value is the same for all of said bi-state comparison means;
whereby, at each bi-state means, a three-possible-state input condition is converted into a two-possible-state output condition, with the equal-state input being assigned to a unique one of the two output states;
whereby, upon the occurrence of an ambiguity condition in which the two members of a given pair are equal, a predetermined member of the pair is thus artificially assigned, within the apparatus, a higher relative ranking than the other pair member, thereby resolving any ambiguity condition as between the two members of any given unique pair having equal members;
whereby, because the intra-selected-pair first-and-second-member status of the lower-order data values is uniform, there is established, in each set of comparisons of each of the data values with each of the other data values, a unique, tested-and-reference-status relationship pattern for each data value with respect to every other data value;
whereby each of said common-element subsets for which a given one of the equal data values is the associated common element contains, upon the occurrence of an ambiguity condition, a unique pattern of said equality-produced predetermined levels and hence an associated unique artificial relative priority pattern in which unique ones of any equal data values are arbitrarily assigned higher and lower relative rank with respect to any remaining mutually-equal data values;

whereby, upon the occurrence of an ambiguity condition, none of the associated common-data elements is accorded, in the (M-1) testing of all of said subsets, mutually-equal rank, thereby resolving any ambiguity condition as between all members of the applied R-unit data set, thus enabling the overall apparatus to properly determine which of the applied data signals is the Mth-largest, in spite of the presence of equal elements among the members this applied set.

13. An apparatus according to claim 1 in which the presence of equal data signals, among the R members of said applied data set in said Input Storage Means, establishes an ambiguity condition for which the apparatus further comprises:

value de-equalization means,
operatively associated with at least one of said input storage means and said comparison means,
for establishing an artifical priority among at least any mutually-equal elements of said applied set, this artificial priority being established by causing any such equal data values to assume, for comparison purposes within the apparatus, mutually-unequal magnitudes, with this assumption being in a manner which does not produce errors in the overall system's Mth-largest determination function, and with the artificial priority being established without requiring, in said comparison means and said Detector Means, intra-apparatus signal-processing differentials;

whereby any ambiguity is resolved, thus enabling the overall apparatus to properly determine which of the applied data signals is the Mth-largest, in spite of the presence of equal elements among the members of this applied set.

14. An apparatus according to claim 13 in which:
(A) the members of said R-unit applied data set are digital data signals having B bits of significance;
(B) said value de-equalization means includes:
supplemental-resolution means,
for supplying a set of ambiguity-resolution bits to each of said R applied digital data signals, where all R of said ambiguity-resolution sets are mutually different, where each such set is X bits in length, and where each of the resulting intra-apparatus supplemented digital data signals is (B+X) bits in length; and
(C) said Comparison Means is adapted to compare digital data values of (B+X) bits in length.

15. An apparatus according to claim 13 in which:
(A) the members of said R-unit applied data set are analog signals;
(B) said value de-equalization means includes:
dither means,
for adding non-signal-distorting noise to at least (R-1) of said applied analog data signals, this addition being at a point in the apparatus which is before the point at which the signals are pair-wise compared; and
(C) said Comparison Means is adapted to compare analog data signals.

16. An apparatus according to either of claims 2 or 4 in which:
each of said mutual-comparison means includes:
tri-state comparison means, (1) for providing a first comparison logic level when said first-pair-member tested value is less than said second-pair-member reference value,
(2) for providing a second comparison logic level when said tested value is greater than said reference value, and
(3) for providing a third comparison logic level when said tested value is equal to said reference value,
said first, second and third comparison logic levels together becoming the associated distinct comparison-output signal from the given mutual-comparison means;
whereby each of said common-element subsets becomes a collection of relative-magnitude-indicating logic levels.

17. An apparatus according to claim 16 in which:
(A) said Detector Means includes:
at least (R-1) tri-state rank-detector means,
(1) each of said tri-state rank means being responsive to a unique one of said common-element subsets,
(2) each of said tri-state rank means being:
(a) for performing said Mth-largest t
(B) each of said tri-state rank-detector mean including:
(1) subset-conditioning means,
responsive to the individual logic-level results of said unique common-element subset,
for converting predetermined ones of said results from first and second logic levels to second and first logic levels respectively, so as to make the tested/reference comparison status of the associated common-element effectively the same for all of the results in the subset;
(2) first alterable counting means,
responsive to the conditioned individual logic-level results of said unique, common-element subset,
(a) for registering how many of these subset results are said first logic level, said registration being stepwise increasable upon receipt of a first alteration command, and
(b) for producing a smaller-count output signal indicative of the resulting registered number;
(3) second alterable counting means,
responsive to the conditioned individual logic-level results of said unique, common-element subset,
(a) for registering how many of these subset results are said second logic level, said registration being stepwise increidual logic-level results of said unique, common-element subset,
(a) for registering how many of these subset results are said third logic level, said registration being stepwise decreasable upon receipt of a third alteration command, and
(b) for producing an equality-count output signal indicative of the resulting registered number;
(5) count-condition means,
responsive to the smaller-count signal, to the larger-count signal, and to the equality-count signal,
(a) for determining whether both
(i) an Mth-largest relative relation exists between the registered smaller and larger counts, this relational test being a unique, predetermined function of both the desired rank M and the conditioning conversion applied to the subset of results to which the given rank-detector means is responsive, and (ii) the registered equality count is zero, and for producing, as the ranking-output signal, an Mth-largest signal indicative of the outcome of this determination, with an affirmative indication by said Mth-largest signal being indicative in turn that the associated common-data element is an Mth-largest of the applied R-unit signal set;

(b) for determining whether both (i) one of the registered smaller and larger counts is more deficient from its associated Mth level than is the other count and, if so, which one is thus more deficient, and (ii) the registered equality count is nonzero, and for producing a deficiency-alteration signal indicative of the outcome of this determination;

(c) for determining whether both (i) the registered smaller and larger counts are equally deficient from their respective associated Mth levels, and (ii) the registered equality count is nonzero, and for producing an equality-alteration signal indicative of the outcome of this determination;

(6) count-transfer means, responsive to said deficiency-alteration signal and to said equality-alteration signal, (a) for generating, when said deficiency-alteration signal indicates that one of said counts is more deficient than the other and that said equality count is nonzero, the one of said first and second alteration commands that will cause the more-deficient counting means to be stepwise incremented, (b) for generating, when said equality-alteration signal indicates that said counts are equally deficient and that said equality count is nonzero, a preselected one of said first and second alteration commands, (c) for generating, concurrently upon the generation of either of said first and second alteration commands, said third alteration command, whereby the registered equality count is stepwise decreased whenever the registered count of either one of said first and second counting means is increased;

whereby said stepwise increasing of said first and second means and said stepwise decreasing of said third means continues until said registered equality count becomes zero;

with the ensemble of ranking-output signals from said at least (R-1) tri-state rank-detector means becoming said detector-output signal;

where the simultaneous production by a plurality of said tri-state rank-detector means of a plurality of said affirmative Mth-largest signals indicates that any of the corresponding common-data elements satisfies the (M-1) condition and is thus an Mth-largest;

whereby any ambiguity condition, established by the presence of equal data signals among the R members of said applied data set, is resolved, thus enabling the overall apparatus to properly determine which of the applied-set signals is the Mth-largest, in spite of the presence of such equal elements.

18. An apparatus according to claim 17 in which:

(A) said count-condition means includes:

(1) Mth-condition means, responsive both to the smaller-count signal and to the larger-count signal, (a) for performing the determination of whether the relative relation between the registered smaller count and the registered larger count indicates that the associated common-data element is an Mth-largest data signal, and for producing, as a component of said deficiency-alteration and said equality-alteration signals, a first Mth logic level when this Mth-largest condition is satisfied, a second Mth-logic level being produced otherwise; and (b) for producing, as a component of said deficiency-alteration signal, a first deficiency logic level when a predetermined one of the registered smaller and larger-count signals falls short of its associated Mth level by an amount which is less than the corresponding amount by which the predetermined other one of the smaller and larger-count signals falls short of its own Mth level, a second deficiency logic level being produced otherwise; an (2) equality-condition means, responsive to said equality-count signal, (a) for determining whether this equality count is zero and (b) for generating, as a component of said deficiency-alteration signal and of said equality-alteration signal, a first equality logic level when the equality count is zero, with a second equality logic level being generated otherwise; and in which (B) said count-transfer means includes: alteration means, responsive to said first and second Mth logic levels, to said first and second deficiency logic levels, and to said first and second equality logic levels, (a) for generating a predetermined one of said first and second alteration commands and thereby increasing by one the registered count of that one of said first and second alterable counting means which produces said deficiency-tested predetermined count signal, this increasing being performed upon the joint occurrence of said second equality logic level, said second deficiency logic level, and said second Mth logic level, (b) for generating a predetermined other one of said first and second alteration commands and thereby increasing by one the registered count of that one of said first and second alterable counting means which produces said other deficiency-tested count signal, this increasing being performed upon the joint occurrence of said second equality logic level, said first deficiency logic level, and said second Mth logic level, whereby, when said equality count is nonzero and the registered counts of said first and second counting means together do not satisfy said Mth condition, and at least when in addition the registered count of one of said first and second means is more deficient than the registered count of the other of said means, the registered count of the more deficient means is stepwise increased;

(c) for generating a preselected one of said first and second alteration commands and thereby increasing by one the registered count of a preselected one of said first and second alterable counting means, this increasing being performed upon the joint occurrence of said second equality logic level, said second deficiency logic level, and said first Mth logic level, whereby, when said equality count is nonzero and the registered counts of said first and second counting means together do satisfy said Mth condition while at the same time being equally deficient from their respective Mth levels, the registered count of a preselected one of said first and second means is stepwise increased; and (d) for generating said third alteration command and thereby decreasing by one the registered count of said third alterable counting means, this decreasing being performed upon the occurrence of said second equality logic;

whereby the registered equality count is stepwise decreased whenever the registered count of either one of said first and second means is increased;

whereby said stepwise increasing of said first and second means and said stepwise decreasing of said third means continues until said registered equality count becomes zero; and in which (C) said count-condition means further includes: output means, responsive to said first and second Mth logic levels and to said first and second equality logic levels, for producing, as said Mth-largest ranking-output signal, a first ranking logic level upon the concurrence of said first Mth logic level and said first equality logic level, with a second ranking logic level being produced otherwise, the production of said first ranking logic level thus indicating that the subject common-data value is an Mth-largest element of said applied R-unit data set;

where the simultaneous production by a plurality of said tri-state rank-detector means of a plurality of said first ranking logic levels indicates that any of the corresponding common-data elements satisfies the (M-1) condition and is thus an Mth-largest.

19. An apparatus according to claim 1 in which:
said Comparison Means includes:
a plurality of tri-state mutual comparison means, (1) with said plurality of tri-state means being arranged into at least (R-1) clusters of tri-state means, with each of these clusters having (R-1) tri-state means, whereby said comparison means includes at least $(R-1)^2$ of said tri-state means;

(2) with each means of each of said clusters being responsive to a unique, predetermined ordered pair of two given elements from the applied R-unit set;

(3) with the ordered members of each such unique pair being identified as a first member and a second member, where for each of the (R-1) means of each such cluster, a unique preselected one of said applied data values is a predetermined one of said first and second pair members, while a unique one of the (R-1) data values other than the preselected one is the predetermined complementary other one of said first and second pair members, the unique preselected one of said applied data values thereby becoming an associated common-data element for the given cluster, where no two of said at least (R-1) clusters have the same common-data element;

(4) with each means of each of said clusters being for comparing the first member of the associated unique pair to the second member of the pair, each of said tri-state means thus treating the associated first member as a tested value and the associated second member as a reference value;

(5) whereby, each one of at least (R-1) of said data values in the R-unit set is separately pair-wise compared with each of the other (R-1) applied set members;

(6) each of said tri-state comparison means being for providing, for each such pair-wise comparison:

(a) a first comparison logic level when said tested value is less than said reference value, (b) a second comparison logic level when said tested value is greater than said reference value, and (c) a third comparison logic level when said tested value is equal to said reference value, said first, second and third comparison logic levels together becoming a distinct comparison-output signal indicative of the relative magnitude of the tested value with respect to the reference value.

20. An apparatus according to claim 19 in which:

(1) the intra-pair predetermined first-and-second-member status of the common element of each of said clusters is the same for all tri-state means of that cluster, (2) whereby, in the separate pair-wise comparison of each of said at least (R-1) data values with each of the other (R-1) applied set members, each of said at least (R-1) data values assumes the uniform status of a predetermined one of said tested and reference values while each of said other (R-1) values assumes the complementary status of the predetermined other one of said tested and reference values;

(3) whereby, each of said selected common-element subsets becomes the (R-1) distinct comparison-output logic-level signals for which a given unique one of the R applied data values was the associated predetermined one of said tested and reference values, while each of the other (R-1) data values was the associated predetermined other one of said tested and reference values, with all (R-1) of said signals being produced by a given one of said clusters and with the common-data element of the given cluster becoming the common-data element of the given subset.

21. An apparatus according to claim 20 in which:
(A) said Detector Means includes:
at least (R-1) tri-state rank-detector means, (1) each of said tri-state rank means being responsive to a unique one of said common-element subsets, (2) each of said tri-state rank means being:
 (a) for performing said Mth-largest testing of the associated subset, and
 (b) for generating, as a component of said detector-output signal, a ranking-output signal indicative of whether the associated common value satisfies said (M-1) condition and is thus the Mth-largest;
(B) each of said tri-state rank-detector means including:
 (1) first alterable counting means,
  responsive to the individual logic-level results of said unique, common-element subset,
  (a) for registering ed number;
 (2) second alterable counting means, responsive to the individual logic-level results of said unique, common-element subset,
  (a) for registering how many of these subset results are said second logic level, said registration being stepwise increasable upon receipt of a second alteration command, and
  (b) for producing a larger-count output signal indicative of the resulting registered number;
 (3) third alterable counting means, responsive to the individual logic-level results of said unique, common-element subset,
  (a) for registering how many of these subset results are said third logic level, said registration being stepwise decreasable upon receipt of a third alteration command, and
  (b) for producing an equality-count output signal indicative of the resulting registered number;
 (4) count-condition means,
  responsive to the smaller-count signal, to the larger-count signal, and to the equality-count signal,
  (a) for determining whether both
   (i) an Mth-largest relative relation exists between the registered smaller and larger counts, this relational test being a unique, predetermined function of both the desired rank M and the pair member chosen as the one predetermined for the common element in the comparison-means cluster which produces the subset of results to which the given rank-detector means is responsive, and
   (ii) the registered equality count is zero, and for producing, as the ranking-output signal, an Mth-largest signal indicative of the outcome of this determination, with an affirmative indication by said Mth-largest signal being indicative in turn that the associated common-data element is an Mth-largest of the applied R-unit signal set;
  (b) for determining whether both
   (i) one of the registered smaller and larger counts is more deficient from its associated Mth level than is the other count and, if so, which one is thus more deficient, and
   (ii) the registered equality count is non-zero, and for producing a deficiency-alteration signal indicative of the outcome of this determination;
  (c) for determining whether both
   (i) the registered smaller and larger counts are equally deficient from their respective associated Mth levels, and
   (ii) the registered equality count is non-zero, and for producing an equality-alteration signal indicative of the outcome of this determination;
 (5) count-transfer means,
  responsive to said deficiency-alteration signal and to said equality-alteration signal,
  (a) for generating, when said deficiency-alteration signal indicates that one of said counts is more deficient than the other and that said equality count is non-zero, the one of said first and second alteration commands that will cause the more-deficient counting means to be stepwise incremented,
  (b) for generating, when said equality-alteration signal indicates that said counts are equally deficient and that said equality count is non-zero, a preselected one of said first and second alteration commands,
  (c) for generating, concurrently upon the generation of either of said first and second alteration commands, said third alteration command,
   whereby the registered equality count is stepwise decreased whenever the registered count of either one of said first and second counting means is increased;
   whereby said stepwise increasing of said first and second means and said stepwise decreasing of said third means continues until said registered equality count becomes zero;
 with the ensemble of ranking-output signals from said at least (R-1) tri-state rank-detector means becoming said detector-output signal;
 where the simultaneous production by a plurality of said tri-state rank-detector means of a plurality of said affirmative Mth-largest signals indicates that any of the corresponding common-data elements satisfies the (M-1) condition and is thus an Mth-largest;
 whereby any ambiguity condition, established by the presence of equal data signals among the R members of said applied data set, is resolved, thus enabling the overall apparatus to properly determine which of the applied-set signals is the Mth-largest, in spite of the presence of such equal elements.

22. An apparatus according to claim 21 in which:
(A) said count-condition means includes:
 (1) Mth-condition means, responsive both to the smaller-count signal and to the larger-count signal,
  (a) for performing the determination of whether the relative relation between the registered smaller count and the registered larger count indicates that the associated common-data element is an Mth-largest data signal, and for producing, as a component of said deficiency-alteration and said equality-alteration signals, a first Mth logic level when this Mth-largest condition is satisfied, a second Mth-logic level being produced otherwise; and
  (b) for producing, as a component of said deficiency-alteration signal, a first deficiency logic level when a predetermined one of the registered smaller and larger-count signals falls short of its associated Mth level by an amount which is less than the corresponding amount by which the predetermine other one of the registered smaller and larger-count signals falls short of its own Mth level, a second deficiency logic level being produced otherwise; and (2) equality-condition means,
  responsive to said equality-count signal,
  (a) for determining whether this equality count is zero, and
  (b) for generating, as a component of said deficiency-alteration signal and of said equality-alteration signal, a first equality logic level when the equality count is zero, with a second equality logic level being generated otherwise; and in which (B) said count-transfer means includes:
alteration means,
responsive to said first and second Mth logic levels, to said first and second deficiency logic levels, and to said first and second equality logic levels,
  (a) for generating a predetermined one of said first and second alteration commands and thereby increasing by one the registered count of that one of said first and second alterable counting means which produces said deficiency-tested predetermined count signal, this increasing being performed upon the joint occurrence of said second equality logic level, said second deficiency logic level, and said second Mth logic level,
  (b) for generating a predetermined other one of said first and second alteration commands and thereby increasing by one the registered count of that one of said first and second alterable counting means which produces said other deficiency-testedgistered counts of said first and second counting means together do not satisfy said Mth condition, and at least when in addition the registered count of one of said first and second means is more deficient than the registered count of the other of said means, the registered count of the more deficient means is stepwise increased;
  (c) for generating a preselected one of said first and second alteration commands and thereby increasing by one the registered count of a preselected one of said first and second alterable counting means, this increasing performed upon the joint occurrence of said second equality logic level, said second deficiency logic level, and said first Mth logic level,
  whereby, when said equality count is nonzero and the registered counts of said first and second counting means together do satisfy said Mth condition while at the same time being equally deficient from their respective Mth levels, the registered count of a preselected one of said first and second means is stepwise increased; and
  (d) for generating said third alteration command and thereby decreasing by one the registered count of said third alterable counting means, this decreasing being performed upon the occurrence of said second equality logic level;
  whereby the registered equality count is stepwise decreased whenever the registered count of either one of said first and second counting means is increased;
  whereby said stepwise increasing of said first and second means and said stepwise decreasing of said third means continues until said registered equality count becomes zero; and in which (C) said count-condition means further includes:
output means,
responsive to said first and second Mth logic levels and to said first and second equality logic levels,
for producing, as said Mth-largest ranking-output signal, a first ranking logic level upon the concurrence of said first Mth logic level and said first equality logic level, with a second ranking logic level being produced otherwise, the production of said first ranking logic level thus indicating that the subject common data value is an Mth-largest element of said applied R-unit data set;
whereby the simultaneous production by a plurality of said tri-state rank-detector means of a plurality of said first ranking logic levels indicates that any of the corresponding common-data elements satisfies the (M-1) condition and is thus an Mth-largest.

23. An apparatus according to claim 1 in which:
(A) said Comparison Means includes:
a plurality of bi-state mutual-comparison means,
  (1) with said plurality of bi-state means being arranged into at least (R-1) clusters of bi-state means, with each of these clusters having (R-1) bi-state means, whereby said comparison means includes at least $(R-1)^2$ of said bi-state means;
  (2) with each means of each of said clusters being responsive to a unique, predetermined ordered pair of two given elements from the applied R-unit set;
  (3) with the ordered members of each such unique pair being indentified as a first member and a second member, where for each of the (R-1) means of each such cluster, a unique preselected one of said applied data values is a predetermined one of said first and second pair members, while a unique one of the (R-1) data values other than the preselected one is the predetermined complementary other one of said first and second pair members, the unique preselected one of said applied data values thereby becoming an associated common-data element for the given cluster, where no two of said at least (R-1) clusters have the same common-data element;
  (4) with each means of each of said clusters being for comparing the first member of the associated unique pairalues in the R-unit set is separately pair-wise compared with each of the other (R-1) applied set members;
  (6) each of said bi-state comparison means being for providing, for each such pair-wise comparison:
    (a) a first comparison logic level when said tested value is less than said reference value,
    (b) a second comparison logic level when said tested value is greater than said reference value, and
    (c) a predetermined one of said first and second logic levels when said tested value is equal to said reference value, said first and second comparison logic levels together becoming a distinct comparison-output signal indicative of the relative magnitude of the tested value with respect to the reference value.

24. An apparatus according to claim 23 in which:
(1) the intra-pair predetermined first-and-second-member status of the common element of each of said clusters is the same for all tri-state means of that cluster;
(2) whereby, in the separate pair-wise comparison of each of said at least (R-1) data values with each of the other (R-1) applied set members, each of said at least (R-1) data values assumes the uniform status of a predetermined one of said tested and reference values while each of said other (R-1) values assumes the complementary status of the predetermined other one of said tested and reference values;
(3) whereby, each of said selected common-element subsets becomes the (R-1) distinct comparison-output logic-level signals for which a given unique one of the R applied data values was the associated predetermined one of said tested and reference values, while each of the other (R-1) data values was the associated predetermined other one of said tested and reference values, with all (R-1) of said signals being produced by a given one of said clusters and with the common-data element of the given cluster becoming the common-element of the given subset.

25. An apparatus according to claim 24 in which:
(A) the presence of equal data elements among the members of said applied set thereby establishes an ambiguity condition;
(B) the members of said R-unit applied data set are digital data signals;
(C) said input storage means is adapted to store data signals presented in digital format;
(D) each of said bi-state comparison means is adapted to compare digital data signals;
(E) for the bi-state comparison means in each of said clusters, a number K, unique to each cluster, of said means are configured to generate, when the associated tested value is equal to the associated reference value, a predetermined one of said first and second logic levels, while the complementary unique number $H=((R-1)-K)$ of the remaining means in the given cluster are configured to generate, upon the occurrence of the equality condition, the predetermined other one of said first and second logic levels;
whereby any applied ambiguity is resolved.

26. An apparatus for determining which one of a set of R applied data signals is the Mth-largest, this apparatus comprising:
(A) Input Storage Means,
(1) for receiving and accessibly storing the subject set of R data signals,
(2) this storage means having R subregister storage positions, each for receiving and accessibly storing a unique one of said R data signals, with these positions and the associated data elements stored within them being given the respective ordinal designations of first through Rth positions and elements, thereby defining a relative positional identification order among the stored data signals, with the first data signal being the lowest-order element while the Rth data signal is the highest-order element;
(B) a plurality of J Bi-State Comparison Means,
(1) with the number J of said means being $(R^2-R)/2$ or equivalently $((R)^2$ minus $(R)$ minus (the sum of the integers 1 through (R-1))),
(2) said J means being associated in a plurality of (R-1) subsets, respectively ordinally designated as a first through (R-1)st subset, with the number of comparison mean in each such subset being (R-V), where V corresponds to an ordinal identifier a defined below;
(3) each comparison means of each of said comparison subsets receiving, as first and second inputs, a unique pair of data signals, with:
(a) the first input being that data signal whose ordinal identifier is the same as that of the given subset, where V is the number corresponding to the ordinal identifier of this subject first-input data signal, and with
(b) the second input being a unique one of the higher-order data signals, there being, for any Vth first-input data signal, (R-V) such higher-order signals and thus (R-V) comparison means in any given Vth one of said comparison subsets;
(4) with each of said J means being:
(a) for comparing the lower-order first-input member of the associated unique pair to the higher-order second-input member of the pair, each of these J comparison means thus treating the associated first member as a tested value and the associated second member as a reference value, and
(b) for generating, for each such pair-wise comparison:
(i) a first logic level when the associated second-pair-member reference value is greater than the associated first-pair-member tested value,
(ii) a second logic level when said second reference value is less than said first tested value, and
(iii) a predetermined one of said first and second logic levels when said second reference value is equal to said first tested value, with the logic level selected as said predetermined one being the same for all J of said bi-state comparison means;
said bi-state-generated first and second logic levels together becoming an associated distinct comparison-output signal indicative of the relative magnitude of the tested value with respect to the reference value, each such distinct output being ordinally indentified as the VZth output, in respective correspondence to the tested and reference-value nature of the lower-order Vth and higher-order Zth data signals whose comparison produced that output;
whereby each of the R data signals in the set is compared with each of the other (R-1) data signals in the set;
(C) a plurality of (R-1) Rank-Detector Means,
(1) each respectively ordinally identified as a first through (R-1)st Rank-Detector Means;
(2) each Gth one of said rank means being responsive to a unique common-element subset of said comparison-output signals, where each of these subsets consists essentially of all (R-1) comparison-output signals for which the unique, correspondingly-identified one of the first (R-1) data elements is either the Vth tested value or the Zth reference value, where K of the (R-1) comparison signals in each such subset are those for which the Gth data element is the tested value and H of the (R-1) signals are those for which the Gth data element is the reference value, with K being equal to (R-G) and H being equal to (G-1);

(3) each of said Rank Means being:
  (a) for determining whether, in the associated subset, the sum of (the total number of those ones of said K tested signals which are said first logic level) plus (the total number of those ones of said H reference signals which are said second logic level) is exactly (M-1), and
  (b) for generating a ranking-output signal indicative of whether the associated common element satisfies this (M-1) condition and is thus the Mth-largest;

(D) Output-Decoding Means,
responsive to all of said ranking-output signals,
  (1) for interpreting said ranking signals so as to determine which data signal has satisfied the (M-1) condition, with said Rth data signal being deemed as satisfying the (M-1) condition when all of said (R-1) ranking-output signals indicate that no one of the associated first through (R-1)st common elements has satisfied the (M-1) condition; and
  (2) for generating a unique output-select command characteristic of the subregister storage position which holds the (M-1) condition-satisfaction signal;

(E) Output-Selection Means,
responsive to said output-select command, and operatively associated with said input storage means,
  for selecting from the appropriate subregister storage position of said input storage means and for outputting from the overall apparatus that data value which, as indicated by said output-select signal, satisfies the (M-1) condition, this data value being the desired Mth-largest.

27. An apparatus for determining which one of a set of R serially-applied data signals is the Mth-largest, this apparatus comprising:

(A) Serial Input-Storage means,
  (1) for sequentially receiving and accessibly storing the subject set of R serial data signals;
  (2) this storage means having R subregister storage positions, each for sequentially receiving and accessibly storing an individual one of said R serial data signals, with these positions and the associated data elements stored within them being given the respective ordinal designations of first through Rth positions and elements, with the first position holding the most-recently-received one of said R data signals while each successively-identified position holds successively-previously-received ones of said data elements, and with said Rth position holding the earliest-received one of said R data signals, thereby defining a relative indentification order among the stored data signals, with the first data signal being the lowest-order data signal while the Rth data signal is the highest-order data signal;

(B) a plurality of Y of Bi-State Comparison Means,
  (1) wIth the number Y of said means being (R-1);
  (2) said Y means being given the respective ordinal designations of second through Rth bi-state means;
  (3) each of said comparison means receiving, as first and second inputs, a unique pair of data values from said serial input storage means, with:
    (a) the first input being said most-recently-received first data signal, and
    (b) the second input being that one of said (R-1) previously-received higher-order data signals whose ordinal designation is the same as the ordinal designation of the given bi-state means;
  (4) with each of said Y means being:
    (a) for comparing the lower-order, first-input member of the associated unique pair to the higher-order, second-input member of the pair, each of these Y comparison means thus treating the associated first member as a tested value and the associated second member as a reference value, and
    (b) for generating, for each such pair-wise comparison
      (i) a first logic level when the associated second-pair-member reference value is greater than the associated first-pair-member tested value,
      (ii) a second logic level when said second reference value is less than said first tested value, and
      (iii) a predetermined one of said first and second logic levels when said second reference value is equal to said first tested value, with the logic level selected as said predetermined one being the same for all Y of said bi-state comparison means, and
  with said bi-state, sequentially-generated first and second logic levels together becoming an associated intermediate-comparison signal indicative of the relative magnitude of the tested value with respect to the reference value, each such intermediate signal being ordinally identified as the Wth output, where W is the same as the ordinal designation of the generating bi-state means; whereby, once all R data signals have been sequentially received and sequentially compared, each of the R data signals in the subject set has been compared with each of the other (R-1) signals of the set;

(C) a plurality (R-1) of Serial-Result-Storage Means,
  (1) identified as a second through Rth result-storage means,
  (2) each of said means being: for sequentially receiving and accessibly storing the sequentially-generated, correspondingly-identified, intermediate-comparison signals;
  (3) each of said (R-1) result-storage means having a plurality of serial subregister storage positions,
    (a) with the number of positions in each means being (R-Q+1), where Q is the integer corresponding to the ordinal designation for the given result-storage means, whereby said second result-storage means is (R-1) positions long and thus stores the results of the previous (R-1) comparisons made by said second bi-state comparison means, and whereby said Rth result-storage means has one storage position which stores the result of the one, mostrecently-made previous comparison of said Rth bi-state comparison means;

(b) with these positions being individually ordinally designated as first through (R-Q+1)st positions, with the first position being the one which holds the most-recently-received comparison signal while the successive higher-order positions respectively hold the successively-more-previously-received comparison signals, with the (R-Q+1)st position holding the earliest-received intermediate comparison signal, and with the intermediate signal stored in a given position being ordinally identified as the DFth comparison-output signal, where D is the same as the ordinal identifier of the given subregister storage position and F is the quantity ((D-1) plus (the ordinal identifier of the given serial storage means));

whereby, for any given R-unit set of data values held in said serial input-storage means, any so identified, serially-compared and stored DFth output signal is the result which would have been obtained if the Dth and Fth ones of said R-unit set had actually been directly compared with the Dth signal as the tested value and the Fth signal as the reference value;

(D) a plurality of (R-1) Rank-Detector Means,
(1) each respectively ordinally identified as a first through (R-1)st rank detector means;
(2) each Gth one of said rank means being responsive to a unique common-element subset of said comparison-output signals, where each of these subsets consists essentially of all (R-1) comparison-output signals for which the unique, correspondingly-identified one of the first (R-1) data elements is either the Dth tested value or the Fth reference value, where K of the (R-1) comparison signals in each such subset are those for which the Gth data element is the tested value and H of the (R-1) signals are those for which the Gth data element is the reference value, with K being equal to (R-G) and H being equal to (G-1);
(3) each of said rank means being:
(a) for determining whether, in the associated subset, the sum of (the total number of those ones of said K tested signals which are said first logic level) plus (the total number of those ones of said H reference signals which are said second logic level) is exactly (M-1), and
(b) for generating a ranking-output signal indicative of whether the associated common element satisfies this (M-1) condition and is thus the Mth-largest;

(E) Output-Decoding means,
responsive to all of said ranking-output signals,
(1) for interpreting said ranking signals so as to determine which data signal has satisfied the (M-1) condition, with said Rth data signal being deemed as satisfying the (M-1) condition when all of said (R-1) ranking-output signals indicate that no one of the associated first through (R-1)st common tested values has satisfied the (M-1) condition; and
(2) for generating a unique output-select command characteristic of the input subregister storage position which holds the (M-1) condition-satisfaction signal;

(F) Output-Selection Means,
responsive to said output-select command, and operatively associated with said serial input storage means, for selecting from the appropriate input subregister storage position of said input storage means and for out-putting from the overall apparatus that data value which, as indicated by said output-select signal, satisfies the (M-1) condition, this data value being the desired Mth-largest.

* * * * *